(12) United States Patent
Machida

(10) Patent No.: US 7,412,498 B2
(45) Date of Patent: Aug. 12, 2008

(54) DATA PROCESSING APPARATUS, DATA PROCESSING METHOD, AND STORAGE MEDIUM STORING COMPUTER-READABLE PROGRAM

(75) Inventor: Haruo Machida, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 1019 days.

(21) Appl. No.: 10/767,626

(22) Filed: Jan. 30, 2004

(65) Prior Publication Data

US 2004/0205169 A1    Oct. 14, 2004

Related U.S. Application Data

(62) Division of application No. 09/560,969, filed on Apr. 28, 2000, now Pat. No. 6,718,378.

(30) Foreign Application Priority Data

Apr. 30, 1999    (JP) .................... 11-124828

(51) Int. Cl.
*G06F 15/177* (2006.01)
*G06F 12/00* (2006.01)

(52) U.S. Cl. ..................... 709/220; 709/221

(58) Field of Classification Search .......... 709/220, 709/221, 226, 229, 249; 715/810, 843
See application file for complete search history.

(56) References Cited

U.S. PATENT DOCUMENTS

| | | | |
|---|---|---|---|
| 4,864,516 A * | 9/1989 | Gaither et al. ........... 715/500.1 |
| 5,164,770 A * | 11/1992 | Furuichi et al. ............. 399/11 |
| 5,452,416 A * | 9/1995 | Hilton et al. ................ 715/783 |
| 5,481,335 A * | 1/1996 | Furuichi et al. .............. 399/9 |
| 5,537,550 A | 7/1996 | Russell et al. ............... 709/224 |
| 5,548,722 A * | 8/1996 | Jalalian et al. .............. 709/220 |
| 6,076,106 A | 6/2000 | Hamner et al. ............. 709/223 |
| 6,091,508 A | 7/2000 | Love et al. ................. 358/1.15 |
| 6,219,701 B1 | 4/2001 | Hirata et al. ................ 709/223 |
| 6,392,665 B1 * | 5/2002 | Argabright et al. .......... 715/723 |
| 6,411,974 B1 | 6/2002 | Graham et al. ............. 715/531 |
| 6,421,385 B1 * | 7/2002 | Uenoyama et al. ....... 375/240.2 |
| 6,597,469 B1 | 7/2003 | Kuroyanagi ............... 358/1.15 |
| 6,642,943 B1 | 11/2003 | Machida ..................... 345/763 |
| 7,002,702 B1 * | 2/2006 | Machida .................... 358/1.15 |
| 7,119,920 B2 * | 10/2006 | Takahashi .................. 358/1.15 |

FOREIGN PATENT DOCUMENTS

JP    08-235097    9/1996

* cited by examiner

*Primary Examiner*—Zarni Maung
(74) *Attorney, Agent, or Firm*—Fitzpatrick, Cella, Harper & Scinto

(57) ABSTRACT

In order to easily verify the details including a use state of devices of a network each time function processing is to be executed, a CPU sequentially acquires log information of each function of each device notified from another PC, when each device is to be operated in accordance with the function set by the other PC, and sequentially stores the log information of each acquired function and manages the stored log information. In response to a request for the log information of each function from the other PC, the corresponding log information among the managed log information is notified to the other PC via the network.

9 Claims, 45 Drawing Sheets

FIG. 6

| | THE NUMBER OF REGISTERED FUNCTIONS | ~601 |
|---|---|---|
| | COMMENT | ~602 |
| 1 | SCANNER | ~603a |
| | PRINTER | ~603b |
| | COPYING MACHINE | ~603c |
| | COMMENT | ~603d |
| ⋮ | ⋮ | |
| N | SCANNER | ~604a |
| | FAX MODEM | ~604b |
| | FAX | ~604c |
| | COMMENT | ~604d |

VIRXXX OPQRS

INDICATED COMBINATION IS NOT EFFECTIVE

OK

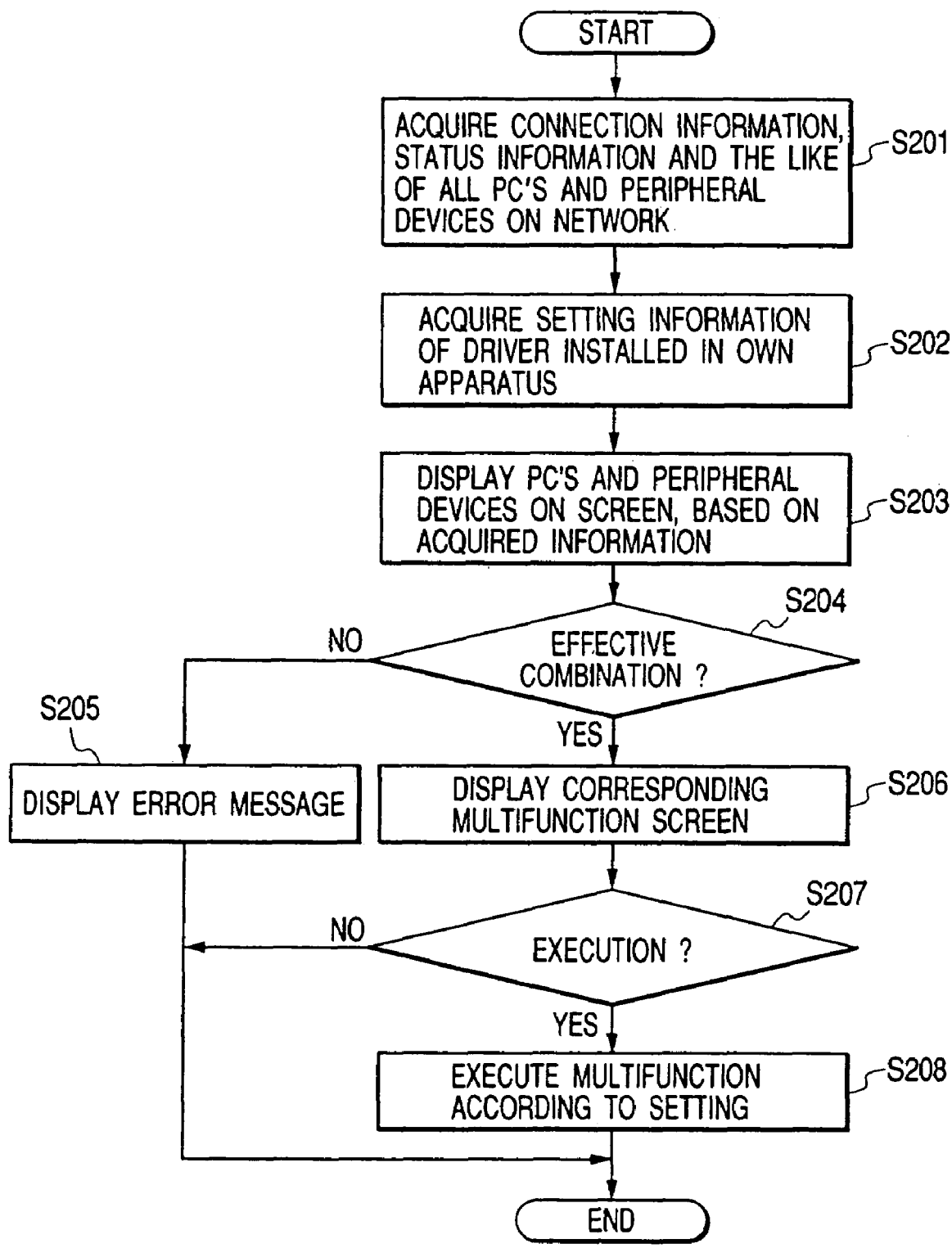

FIG. 10

| | | |
|---|---|---|
| PRINTER DRIVER NAME | | ⎫ |
| VERSION INFORMATION | | ⎬ 801 |
| COMMENT | | ⎭ |
| PAGE SETTING | ORIGINAL SIZE | ⎫ |
| | OUTPUT SHEET SIZE | |
| | PRINTING DIRECTION | ⎬ 802 |
| | PAGE LAYOUT | |
| | MAGNIFICATION | |
| | STAMP | ⎭ |
| FINISH | PRINTING METHOD | ⎫ |
| | BINDING DIRECTION | ⎬ 803 |
| | SHEET DISCHARGE METHOD | ⎭ |
| SHEET FEED | SHEET FEED METHOD | ⎫ 804 |
| | OHP PRINTING DETAIL SETTING | ⎭ |
| DEVICE SETTING | SHEET FEED OPTION | ⎫ 805 |
| | SHEET DISCHARGE OPTION | ⎭ |

| | | |
|---|---|---|
| PRINTER DRIVER NAME | | ⎫ 801 |
| VERSION INFORMATION | | |
| COMMENT | | ⎭ |
| PAGE SETTING | RESOURCE OFFSET | ⎫ |
| | ORIGINAL SIZE | |
| | RESOURCE OFFSET | |
| | OUTPUT SHEET SIZE | |
| | RESOURCE OFFSET | |
| | PRINTING DIRECTION | |
| | RESOURCE OFFSET | 802 |
| | PAGE LAYOUT | |
| | RESOURCE OFFSET | |
| | MAGNIFICATION | |
| | RESOURCE OFFSET | |
| | STAMP | |
| | RESOURCE OFFSET | ⎭ |
| FINISH | RESOURCE OFFSET | ⎫ |
| | PRINTING METHOD | |
| | RESOURCE OFFSET | |
| | BINDING DIRECTION | 803 |
| | RESOURCE OFFSET | |
| | SHEET DISCHARGE METHOD | |
| | RESOURCE OFFSET | ⎭ |
| SHEET FEED | RESOURCE OFFSET | ⎫ |
| | SHEET FEED METHOD | |
| | RESOURCE OFFSET | 804 |
| | OHP PRINTING DETAIL SETTING | |
| | RESOURCE OFFSET | ⎭ |
| DEVICE SETTING | RESOURCE OFFSET | ⎫ |
| | SHEET FEED OPTION | |
| | RESOURCE OFFSET | 805 |
| | SHEET DISCHARGE OPTION | |
| | RESOURCE OFFSET | ⎭ |
| RESOURCE DATA SEGMENT | | 806 |

| | | | |
|---|---|---|---|
| | MANAGEMENT DOMAIN NAME | | 871 |
| | THE NUMBER OF MANAGEMENT PRINTERS (=M) | | |
| | COMMENT | | |
| 873 → | PRINTER NAME | | |
| 874 → | THE NUMBER OF LOGS (=N1) | | |
| 875 → | COMMENT | | |
| | 1 | 1 876-1 | INPUT INFORMATION / APPLICATION NAME OR SCANNER ATTRIBUTE INFORMATION |
| | | | THE NUMBER OF TOTAL PRINTING PAGES |
| | | | SHEET SIZE |
| | | | SHEET LONGITUDE |
| | | | SHEET LATITUDE |
| | | | COLOR OR BLACK/WHITE |
| | | | ONE FACE/TWO FACES |
| | | | TONER USE QUANTITY (Y, M, C, K) |
| | | ⋮ | |
| | | N1 876-N | |

872-1

⋮

| | | | |
|---|---|---|---|
| | PRINTER NAME | | |
| | THE NUMBER OF LOGS (=N2) | | |
| | COMMENT | | |
| M | 1 | INPUT INFORMATION / APPLICATION NAME OR SCANNER ATTRIBUTE INFORMATION |
| | | THE NUMBER OF TOTAL PRINTING PAGES |
| | | SHEET SIZE |
| | | SHEET LONGITUDE |
| | | SHEET LATITUDE |
| | | COLOR OR BLACK/WHITE |
| | | ONE FACE/TWO FACES |
| | | TONER USE QUANTITY (Y, M, C, K) |
| | ⋮ | |
| | N2 | |

| ITEM | CONTENTS | DATA RECORDING FORMAT |
|---|---|---|
| SENDER | FAX SENDER | ONLY WHEN FAX DATA CONTAINS VALID INFORMATION OF SENDER |
| FAX NUMBER | SENDER FAX NUMBER | ONLY WHEN FAX DATA CONTAINS VALID FAX NUMBER DATA IN CSI BLOCK |
| DATE | FAX RECEPTION DATE | THE FORMAT IS "YY/MM/DD HH:MM" ("HH" IS 24-HOUR FORMAT) |
| RECEPTION RESULT | FAX RECEPTION RESULT STATUS | NORMAL END → RECEPTION SUCCESS RECEPTION FAILURE |
| RECEPTION TIME | TIME TO COST RECEIVING FAX | THE FORMAT IS "HH:MM:SS". IN CASE OF LESS THAN 1 HOUR, THE FORMAT IS "MM:SS" |
| RECEPTION PAGE | TOTAL FAX RECEPTION PAGES | |
| ERROR INFORMATION | RECEIVE ERROR INF. | |
| RESOLUTION | RECEPTION FAX RESOLUTION | 100, 200dpi |
| COMPRESSION SYSTEM | RECEPTION FAX COMPRESSION SYSTEM | MH, MR, MMR |

FIG. 23

| ITEM | CONTENTS | DATA RECORDING FORMAT |
|---|---|---|
| RECEIVER | FAX RECEIVER | RECEIVER'S NAME THAT IS INDICATED IN FAX SENDING DIALOG |
| FAX NUMBER | RECEIVER FAX NUMBER | |
| DATE | FAX TRANSMISSION DATE | THE FORMAT IS "YY/MM/DD HH:MM" ("HH" IS 24-HOUR FORMAT) |
| TRANSMISSION RESULT | FAX TRANSMISSION RESULT | NORMAL END→TRANSMISSION SUCCESS TRANSMISSION FAILURE PARTIALLY FAILED (SOME SENDING FAILED IN CASE OF MULTIPLE RECEIVERS) |
| TRANSMISSION TIME | TIME TO COST TRANSMITTING FAX | FORMAT IS "HH:MM:SS". IF LESS THAN 1 HOUR, FORMAT IS "MM:SS" |
| THE NUMBER OF TRIALS | THE NUMBER OF TRANSMISSION TRIALS | |
| DOCUMENT NAME | DOCUMENT NAME THAT IS SENT | ・IN VFAX PRINTER THE NAME OF PRINTED DOCUMENT<br>・IN CASE OF VOC'S FUNCTION, (SCAN IMAGE AND SEND FAX) THIS NAME IS "PCNAME-YYMMDDHHMM. TIX" |
| THE NUMBER OF RECEIVERS | | |
| TRANSMISSION PAGE | THE NUMBER OF TRANSMISSION FAX PAGES | (TRANSMISSION PAGE)/(TOTAL PAGE) EX.: TOTAL PAGE:100PAGES TRANSMISSION PAGE:25PAGES DISPLAY→25/100 |
| ERROR INFORMATION | TRANSMISSION ERROR INFORMATION OF THE JOB | ERROR INFORMATION LIKE "RECEIVER FAX IS BUSY" |
| BELONGING OF RECEIVER | BELONGING OF FAX RECEIVER | DESTINATION COMPANY NAME+ BELONGING POST |
| COMMENT | COVER PAGE COMMENT | |
| RESOLUTION | TRANSMISSION FAX RESOLUTION | 100, 200dpi |
| COMPRESSION SYSTEM | TRANSMISSION FAX COMPRESSION SYSTEM | MH, MR, MMR |
| RECEPTION TIME (FOR SERVER) | THE TIME FAX DATA IS RECEIVED TO SERVER'S WAITING TRAY | YY/MM/DD HH:MM |
| SENDER | USER NAME WHO SENDS THIS FAX | |
| SENDER'S PC | DATA SENDER'S PC NAME | |

FIG. 24

| ITEM | CONTENTS |
|---|---|
| USER NAME | NAME OF USER WHO PERFORMS SCAN (USER NAME IS JUDGED BY USING INFORMATION IN HTTP HEADER) |
| SCAN START TIME | TWAIN SESSION START TIME (SNT BEGIN SESSION CALL TIME) |
| SCAN END TIME | TWAIN SESSION END TIME (SNT END SESSION CALL TIME) |
| THE NUMBER OF TOTAL SCAN PAGES | THE TOTAL NUMBER OF PAGES OF SCAN DOCUMENT (MAX 10 DIGITS) |
| MACHINE NAME | NAME OF MACHINE WHICH PERFORMS SCAN (MAX 15 DIGITS) |
| TWAIN DRIVER NAME | NAME OF TWAIN DRIVER WHICH IS USED FOR SCAN (MAX 32 DIGITS) |
|  |  |
| SHEET SIZE |  |
| SHEET LONGITUDE | SHEET HEIGHT REPRESENTED BY UNIT OF 1/10mm (MAX 4 DIGITS) |
| SHEET LATITUDE | SHEET WIDTH REPRESENTED BY UNIT OF 1/10mm (MAX 4 DIGITS) |
| COLOR OR BLACK/ WHITE | 1 : MONOCHROME 2 : COLOR |
|  |  |
|  |  |

FIG. 25

| ITEM | CONTENTS |
|---|---|
| USER NAME | NAME OF USER WHO PERFORMS PRINTING |
| PRINTING START TIME | PRINTING JOB START TIME |
| PRINTING END TIME | PRINTING JOB END TIME |
| THE NUMBER OF TOTAL PRINTING PAGES | THE TOTAL NUMBER OF PAGES OF PRINTING DOCUMENT (MAX 10 DIGITS) |
| MACHINE NAME | NAME OF MACHINE TO WHICH PRINTING IS INSTRUCTED (MAX 15 DIGITS) |
| PRINTER DRIVER NAME | NAME OF PRINTER DRIVER WHICH IS USED FOR PRINTING (MAX 32 DIGITS) |
| APPLICATION NAME | NAME OF APPLICATION WHICH PERFORMS PRINTING ATTRIBUTE INFORMATION OF SCANNER MACHINE NAME, RESOLUTION, COLOR/MONOCHROME IN CASE OF SCANNER |
| THE NUMBER OF DESIGNATED PRINTS | THE NUMBER OF PRINTS DESIGNATED IN PRINTING (MAX 6 DIGITS) |
| | |
| SHEET SIZE | |
| SHEET LONGITUDE | SHEET HEIGHT REPRESENTED BY UNIT OF 1/10mm (MAX 4 DIGITS) |
| SHEET LATITUDE | SHEET WIDTH REPRESENTED BY UNIT OF 1/10mm (MAX 4 DIGITS) |
| COLOR OR BLACK/WHITE | 1 : MONOCHROME<br>2 : COLOR |
| ONE FACE/TWO FACES | 1 : ONE FACE<br>2 : TWO FACES |
| TONER USE QUANTITY (Y, M, C, K) | TONER USE QUANTITY |
| | |

FIG. 27

| | | 1505 |
|---|---|---|
| 1601 HEADER INFORMATION | VERSION | |
| | INDEX TABLE NUMBER → N | |
| | INDEX TABLE OFFSET | |
| 1602 INDEX TABLE | ELEMENT [0] | DATA OFFSET |
| | | DATA SIZE |
| | | FLAG |
| | ⋮ | |
| | ELEMENT [N-1] | DATA OFFSET |
| | | DATA SIZE |
| | | FLAG |
| 1603-1 CLIENT PC DEVICE INFORMATION DATA [0] | 1604 PC INFORMATION | PC NAME |
| | | LOGON USER |
| | | LICENSE INFORMATION |
| | | OS INFORMATION |
| | | PRINTER INFORMATION NUMBER → N0 |
| | | SCANNER INFORMATION NUMBER → N1 |
| | | FAX BOARD INFORMATION NUMBER → N2 |
| | 1605 PRINTER INFORMATION [0] | |
| | ⋮ | |
| | PRINTER INFORMATION [N0-1] | |
| | 1606 SCANNER INFORMATION [0] | |
| | ⋮ | |
| | SCANNER INFORMATION [N1-1] | |
| | 1607 FAX BOARD INFORMATION [0] | |
| | ⋮ | |
| | FAX BOARD INFORMATION [N2-1] | |
| | ⋮ | |
| 1603-N CLIENT PC DEVICE INFORMATION DATA [N-1] | PC INFORMATION | |
| | PRINTER INFORMATION | |
| | SCANNER INFORMATION | |
| | FAX BOARD INFORMATION | |

| INFORMATION | CONTENTS |
|---|---|
| PC NAME | PC'S NET BIOS NAME |
| LOGON USER | PC'S LOGON USER |
| LICENSE INFORMATION | LICENSE NUMBER |
| OS INFORMATION | 95/98 OR NT |
| NUMBER OF PRINTER INFORMATION | |
| NUMBER OF SCANNER INFORMATION | |
| NUMBER OF FAX BOARD INFORMATION | |

| INFORMATION | CONTENTS | ACQUIREMENT METHOD |
|---|---|---|
| PRINTER NAME | (C) PRINTER NAME | PPRINTERNAME IN PRINTER_INFO_2 |
| DRIVER NAME | (C) DRIVER NAME | PDRIVERNAME IN PRINTER_INFO_2 |
| SHARED NAME | (C) SHARED NAME IN THE NETWORK | PSHARENAME IN PRINTER_INFO_2 |
| PORT NAME | (C) PRINTER PORT INFORMATION | PPORTNAME IN PRINTER_INFO_2 |
| SHARED INFORMATION | (C) THE INFORMATION TO SHARE AS NETWORK PRINTER | PATTRIBUTENAME IN PRINTER_INFO_2 |
| SERVER NAME | (C) SERVER PC OF SHARED PRINTER | PSERVERNAME IN PRINTER_INFO_2 |
| COLOR INFORMATION | (A) | DMCOLOR OF PDEVMODE IN PRINTER_INFO_2 |

(C) → CONNECTION INFORMATION, (A) → DEVICE ATTRIBUTE INFORMATION

| INFORMATION | CONTENTS | ACQUIREMENT METHOD |
|---|---|---|
| TWAIN SOURCE NAME | (C) TWAIN SOURCE NAME | OBTAINED BY TWAIN MANAGER TW_IDENTITY. PRODUCTNAME |
| SHARED NAME | (C) SHARED NAME IN THE NETWORK | UNDER VOS MANAGEMENT |
| SHARED INFORMATION | (C) SHARED INFORMATION LIKE PASSWORD IS SET OR NOT | UNDER VOS MANAGEMENT |
| MANUFACTURER NAME | (A) TWAIN MANUFACTURER NAME | STUB'S SNTGETSCANNER ATTRIBUTE () CAN GET THIS INFORMATION |
| ADF INFORMATION | (A) ADF CONNECTION INFORMATION | STUB'S SNTGETSCANNER ATTRIBUTE () CAN GET THIS INFORMATION |
| COLOR INFORMATION | (A) TWAIN DEVICE'S COLOR INFORMATION | STUB'S SNTGETSCANNER ATTRIBUTE () CAN GET THIS INFORMATION |
| UI INFORMATION | (A) SILENT UI OR NOT | STUB'S SNTGETSCANNER ATTRIBUTE () CAN GET THIS INFORMATION |
| THE FOLLOWING INFORMATION DOES NOT BE NEEDED FOR THE PURPOSE OF SHOWING THE SCANNER ICON. BUT VTD MUST CHECK THE TWAIN DRIVER VERSION WHEN IT IS CONNECTED TO REMOTE SCANNER, BECAUSE VTD SAVES THE INFORMATION OF CAPABILITIES AND MUST JUDGE IF THIS INFORMATION IS RIGHT OR NOT. THEREFORE IT MAY BE GOOD WAY TO SAVE THE FOLLOWING INFORMATION IN THIS SCANNER INFORMATION TABLE. THIS TOPICS IS NECESSARY TO DISCUSS WITH PECAN. IF YOU JUDGE THAT THE FOLLOWING ITEMS ARE NOT NEEDED, PLEASE TELL US | | |
| THE ELSE OF TW_IDENTITY | OTHER TW_IDENTITY INFORMATION (EX: TWAIN PROTOCOL VERSION, TWAIN DRIVER VERSION) | THE ELSE OF TW_IDENTITY INFORMATION (EX. TW_IDENTITY. PROTOCOLMAJOR, TW_IDENTITY. PROTOCOLMINOR, TW_IDENTITY. VERSION. MAJOR NUM, TW_IDENTITY. VERSION. MINOR NUM) |

| INFORMATION | CONTENTS | ACQUIREMENT METHOD |
|---|---|---|
| SHARED NAME | (C) SHARED NAME IN THE NETWORK | UNDER VOS MANAGEMENT |

| | | |
|---|---|---|
| 1601 HEADER INFORMATION | VERSION | |
| | INDEX TABLE NUMBER → 1 | |
| | INDEX TABLE OFFSET | |
| 1602 INDEX TABLE | ELEMENT [0] | DATA OFFSET |
| | | DATA SIZE |
| | | FLAG |
| 1701 LOCAL DEVICE INFORMATION DATA [0] | PC INFORMATION | PC NAME |
| | | LOGON USER |
| | | LICENSE INFORMATION |
| | | OS INFORMATION |
| | | PRINTER INFORMATION NUMBER → N0 |
| | | SCANNER INFORMATION NUMBER → N1 |
| | | FAX BOARD INFORMATION NUMBER → N2 |
| | PRINTER INFORMATION [0] | |
| | ⋮ | |
| | PRINTER INFORMATION [N0-1] | |
| | SCANNER INFORMATION [0] | |
| | ⋮ | |
| | SCANNER INFORMATION [N1-1] | |
| | FAX BOARD INFORMATION [0] | |
| | ⋮ | |
| | FAX BOARD INFORMATION [N2-1] | |

| | | |
|---|---|---|
| 1601 — HEADER INFORMATION | VERSION | |
| | INDEX TABLE NUMBER → N | |
| | INDEX TABLE OFFSET | |
| 1602 — INDEX TABLE | ELEMENT [0] | DATA OFFSET |
| | | DATA SIZE |
| | | FLAG |
| | ⋮ | |
| | ELEMENT [N-1] | DATA OFFSET |
| | | DATA SIZE |
| | | FLAG |
| 1701 — LOCAL DEVICE INFORMATION DATA | PC INFORMATION | |
| | PRINTER INFORMATION | |
| | SCANNER INFORMATION | |
| 1603-1 — CLIENT PC DEVICE INFORMATION DATA | PC INFORMATION | |
| | PRINTER INFORMATION | |
| | SCANNER INFORMATION | |
| ⋮ | | |
| 1603-N — CLIENT PC DEVICE INFORMATION DATA | PC INFORMATION | |
| | PRINTER INFORMATION | |
| | SCANNER INFORMATION | |
| 1507 — NON-CLIENT PC DEVICE INFORMATION DATA | PC INFORMATION | |
| | PRINTER INFORMATION | |
| ⋮ | | |
| 1509 — NON-CLIENT PC DEVICE INFORMATION DATA | PC INFORMATION | |
| | PRINTER INFORMATION | |

FIG. 46

STORAGE MEDIUM SUCH AS
FD, CD-ROM OR THE LIKE

| DIRECTORY INFORMATION |
|---|
| 1ST DATA PROC PROGRAM<br>PROGRAM CODE GROUP CORRESPONDING<br>TO STEPS OF CHART SHOWN IN FIG. 9 |
| 2ND DATA PROC PROGRAM<br>PROGRAM CODE GROUP CORRESPONDING<br>TO STEPS OF FLOW CHART SHOWN IN FIG. 32 |
| 3RD DATA PROC PROGRAM<br>PROGRAM CODE GROUP CORRESPONDING<br>TO STEPS OF FLOW CHART SHOWN IN FIG. 34 |
| 4TH DATA PROC PROGRAM<br>PROGRAM CODE GROUP CORRESPONDING<br>TO STEPS OF FLOW CHART SHOWN IN FIG. 35 |
| 5TH DATA PROC PROGRAM<br>PROGRAM CODE GROUP CORRESPONDING<br>TO STEPS OF FLOW CHART SHOWN IN FIG. 38 |
| 6TH DATA PROC PROGRAM<br>PROGRAM CODE GROUP CORRESPONDING<br>TO STEPS OF FLOW CHART SHOWN IN FIG. 40 |
| 7TH DATA PROC PROGRAM<br>PROGRAM CODE GROUP CORRESPONDING<br>TO STEPS OF FLOW CHART SHOWN IN FIG. 41 |
| 8TH DATA PROC PROGRAM<br>PROGRAM CODE GROUP CORRESPONDING<br>TO STEPS OF FLOW CHART SHOWN IN FIG. 45 |
| |

DATA PROCESSING APPARATUS, DATA PROCESSING METHOD, AND STORAGE MEDIUM STORING COMPUTER-READABLE PROGRAM

This application is a divisional of application Ser. No. 09/560,969, filed Apr. 28, 2000, allowed.

BACKGROUND OF THE INVENTION

1. Field of the Invention

The present invention relates to a data processing apparatus capable of data communications with various apparatuses connected to a communications medium, a data processing method, a storage medium storing a computer-readable program, and the like.

2. Related Background Art

Devices such as personal computers (PC), printers, scanners, digital copiers and digital cameras are now widely used and networks such as LAN's are prevailing. Under such circumstances, needs of sharing a printer, a modem or an image reader on a network are increasing. By sharing devices such as printers and scanners on the network, the environment that various devices can be used on the network has been established.

However, a method of combining devices to realize a particular function such as a copy function to be realized by a combination of a scanner and a printer or a combination of a digital copier and a scanner, is not available in some cases. Even if such a method is made available, specific devices are required or only devices of a particular kind can be used. Devices capable of being applied to general use are not known.

Conventional log information of devices such as printers and scanners connected to a network, such as the number of use frequencies of each printer or scanner, is managed independently for each device. Log information of each function of a device selected by a user has not been managed by a network administrator or the user. Such a management method has not been considered as yet.

Therefore, for example, when a user starts executing a desired function or the user requests a log for verification, the user cannot verify a necessary function log. A user cannot confirm and verify the details, from various viewpoints and in wide field, of the use state and the like of various devices shared in a network environment.

SUMMARY OF THE INVENTION

It is an object of the invention to solve the above-described problems and provide a data processing apparatus and method, and a storage medium storing computer-readable program.

It is another object of the invention to provide a data processing apparatus capable of allowing a user to confirm and verify the details of the use state of a system having various types of devices and supporting flexible management and configuration of the system, a data processing method and a storage medium storing a computer-readable program.

The other objects and features of the present invention will become apparent from the following detailed description of embodiments when read in conjunction with the accompanying drawings.

BRIEF DESCRIPTION OF THE DRAWINGS

FIG. 6 is a view showing an example of a combination judgment data structure stored in a data processing apparatus shown in FIG. 2;

FIG. 8 is a view showing an example of an error message displayed on the CRT shown in FIG. 2;

FIG. 9 is a flow chart showing an example of a first data processing procedure in the data processing apparatus according to the present invention;

FIG. 10 is a view showing an example of device driver information managed by a data processing apparatus according to the second embodiment of the present invention;

FIG. 18 is a view showing an example of a resource file of device driver information managed by the data processing apparatus according to the second embodiment of the present invention;

FIG. 21 is a view showing an example of the log information managed by the data processing apparatus according to the third embodiment of the present invention;

FIG. 22 is a view showing an example of the log information managed by the data processing apparatus according to the third embodiment of the present invention;

FIG. 23 is a view showing an example of the log information managed by the data processing apparatus according to the third embodiment of the present invention;

FIG. 24 is a view showing an example of the log information managed by the data processing apparatus according to the third embodiment of the present invention;

FIG. 25 is a view showing an example of the log information managed by the data processing apparatus according to the third embodiment of the present invention;

FIG. 27 is a view for explaining management server device information shown in FIG. 26;

FIG. 28A is a view for explaining in detail PC (personal computer) information shown in FIG. 27;

FIG. 28B is a view for explaining in detail printer information shown in FIG. 27;

FIG. 29A is a view for explaining in detail scanner information shown in FIG. 27;

FIG. 29B is a view for explaining in detail FAX (facsimile) board information shown in FIG. 27;

FIG. 30 is a view for explaining server device information shown in FIG. 26;

FIG. 31 is a view for explaining client device information shown in FIG. 26;

FIG. 46 is a view for explaining a memory map of a storage medium in which various data processing programs readable by the data processing apparatus according to the present invention are stored;

DETAILED DESCRIPTION OF PREFERRED EMBODIMENTS

[First Embodiment]

<Explanation of Apparatus>

Figure 1:
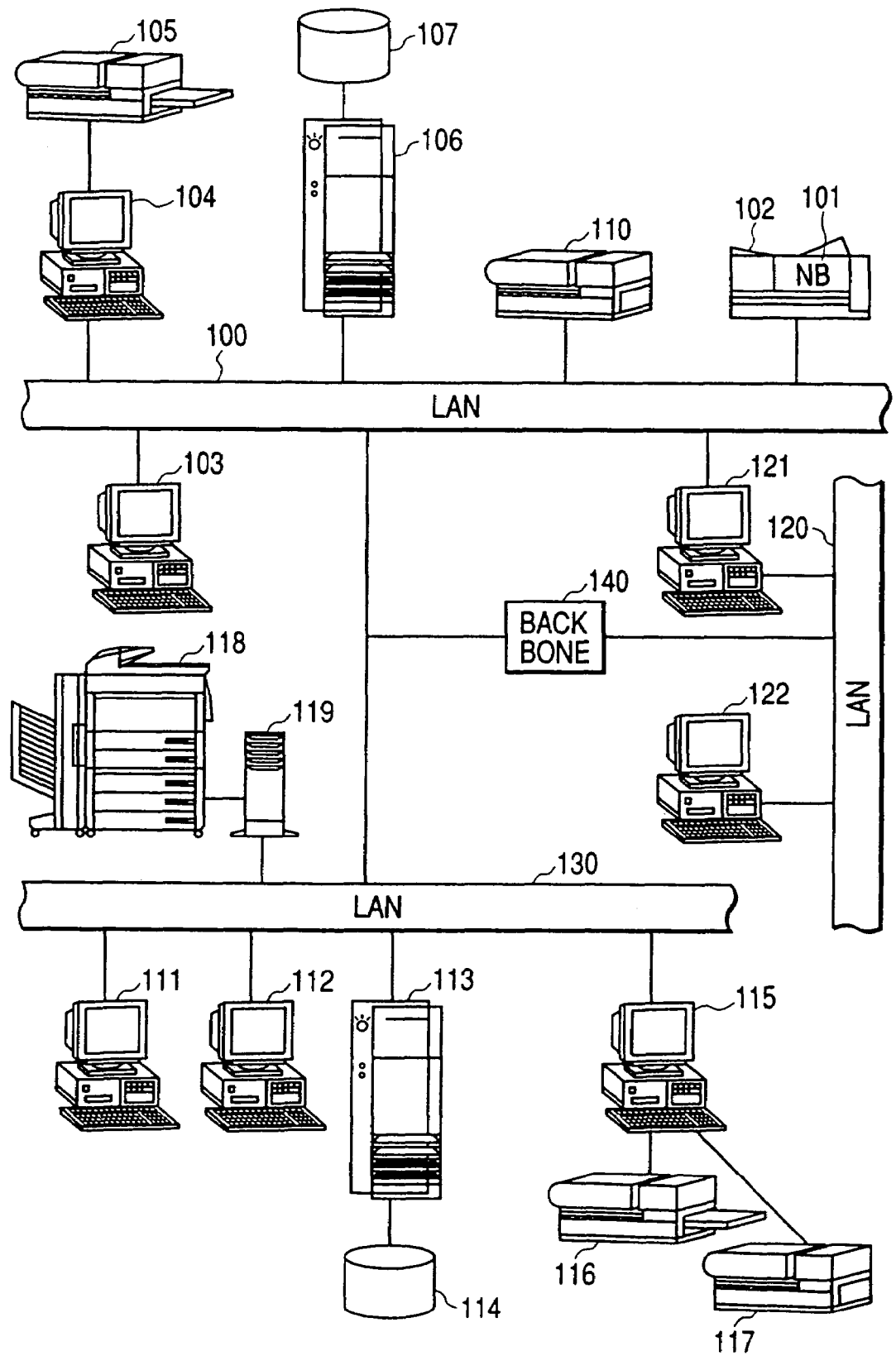
FIG. 1 is a block diagram showing a structure of a system of network devices including a data processing apparatus according to the present invention.

FIG. 1 is a block diagram showing a structure of a system of network devices including a data processing apparatus according to the present invention.

In FIG. 1, a printer 102 which has open-system architecture is connected with a network through an NB (network board) 101. The NB 101 is connected with LAN's 100, 120 and 130 through a local area network interface such as an Ethernet interface 10BASE2 having a coaxial connector, an Ethernet interface 10BASE-T having an RJ-45, or the like.

Plural PC's (personal computers) 103, 104, 111 and 112 are also connected with the LAN's 100 and 130, whereby these PC's can communicate with the NB 101 under the control of a network operating system.

Therefore, one of the PC's (e.g., the PC 103) can be used as the PC for network device management. Further, a printer 105 may be locally connected with the PC 104 as a local printer.

Further, since a PC 106 which functions as a file server is connected with the LAN 100, the PC 106 manages accessing to files stored in a large-capacity (e.g., 10,000,000,000 bytes) network disk 107.

The PC 104 which functions as a printer server manages printing of the printer such as the locally connected printer 105, the remotely located printer 102 or the like.

Similarly, a PC 115 which functions as a printer server manages printing of the printer such as a locally connected printer 116, the remotely located printer 102 or the like.

Further, the PC 115 can be functioned as a scanner server to manage the scanner such as a remotely located scanner 110 or the like. The scanner 110 is connected with the LAN 100 through the network board or the like. Further, a digital copying machine 118 provides printer and scanner functions under the management and control of an image processing unit 119.

In order to effectively perform communication among various network members, Network software such as Novell, UNIX or the like can be used for the network shown in FIG. 1. For example, software such as commercially available NetWare (trademark of Novell) can be used. Since the details of this software package are described in the on-line documentation included in the NetWare package, the explanation thereof will be omitted.

Each of the PC's 103 and 104 is a general PC which can generate a data file, transmit the generated data file to the LAN 100, receive a file from the LAN 100, display these files, and/or process these files.

In FIG. 1, although the personal computer devices (PC's) are illustrated, other computer devices suitable for executing the network software may be used. For example, when UNIX software is used, a UNIX workstation may be connected with the network. In this case, the connected UNIX workstation is used together with the illustrated PC's.

Ordinarily, the LAN 100 provides services to a relatively local user group, e.g., a user group in one floor or plural consecutive floors in one building.

On the other hand, when plural users are located at positions away from others (e.g., different buildings, different prefectures or the like), a WAN (wide area network) may be constructed.

Basically, the WAN is composed of the plural LAN's which are connected together through a high-speed digital line such as ISDN (Integrated Services Digital Network). For example, as shown in FIG. 1, when the LAN 100 and the LAN 120 are connected with each other through a backbone 140, the WAN is established. In this case, the devices connected with the LAN's 100, 120 and 130 can access functions of devices connected with other LAN's through the WAN.

Figure 2:
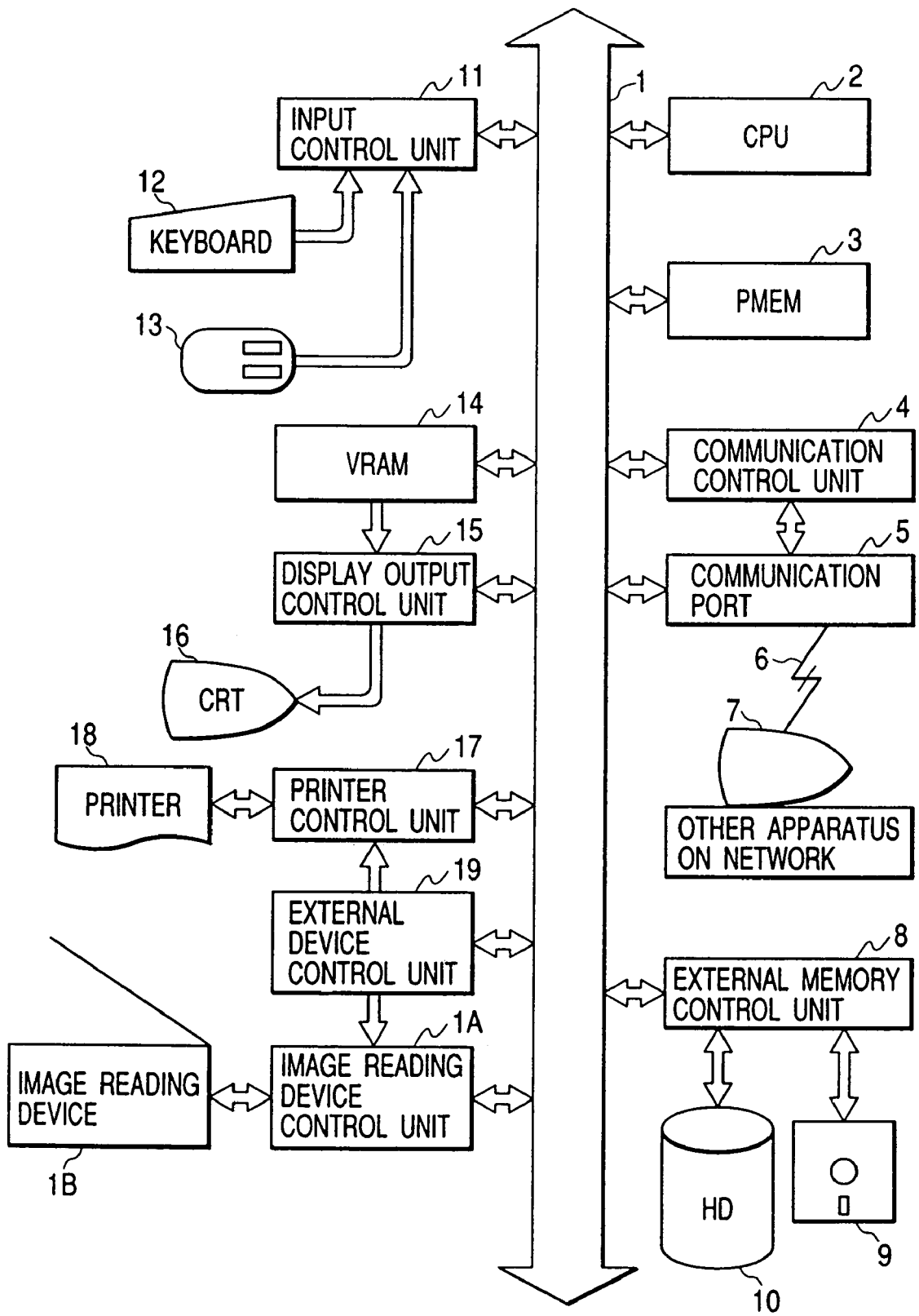
FIG. 2 is a block diagram for explaining a client structure in the first embodiment of the present invention.

FIG. 2 is a block diagram for explaining a client structure acting as a data processing apparatus according to the first embodiment of the present invention. It is assumed that, in the client structure, predetermined devices (including the printer, the scanner, the modem, a multifunctional image processing apparatus, etc.) can communicate with locally connected other data processing apparatus based on a predetermined protocol through a not-shown communication medium (e.g., a LAN according to Ethernet or the like).

In FIG. 2, numeral 1 denotes a system bus to which later-explained units are connected, and numeral 2 denotes a CPU (central processing unit).

Numeral 3 denotes a PMEM (program memory) which appropriately selects and reads a program for the processing, from an HD (hard disk) 10. The read program is executed by the CPU 2. Further, data input from a keyboard 12 is stored as code information in the PMEM 3 also acting as a text memory.

Numeral 4 denotes a communication control unit which controls input and output data of a communication port 5. A signal output from the communication port 5 is transmitted to a communication port 7 of other apparatus on the network through a communication line 6.

A printer and an image reading apparatus (e.g., the scanner) which are shared on the network are controlled through the communication control unit 4. Although the network such as the LAN is used in the present embodiment, it is needless to say that the present invention is applicable to a case where the communication port or the communication line connected with the communication control unit 4 is a general public line.

Numeral 8 denotes an external memory control unit which controls access to a data file disk such as an FD (floppy disk) 9, the HD 10 or the like.

Numeral 11 denotes an input control unit to which input devices such as the keyboard 12, a mouse 13 and the like are connected. A user issues an operation instruction to the system by operating the keyboard 12. Numeral 16 denotes a CRT (cathode-ray tube) on which a PD (pointing device) is used to instruct editing of image information. In the present embodiment, the mouse 13 is used as the PD.

Thus, the user arbitrarily shifts a cursor on the CRT 16 in X and Y directions and selects a command icon on a command menu to instruct the processing. Besides, the user shifts the cursor to indicate an editing target, a drawing position and the like.

Numeral 14 denotes a VRAM (video random-access memory) which acts as a video image memory. Drawing data (bit map data) which is to be displayed on the CRT 16 is expanded in the VRAM 14, the expanded data is appropriately read by a display output control unit 15, and the content of the read data is displayed on the CRT 16. Numeral 17 denotes a printer control unit which controls data outputting to a connected printer 18.

Symbol 1A denotes an image reading device control unit which controls image reading of a connected image reading device 1B. An external device control unit 19 controls the operation of the external device through the printer control unit 17 or the image reading device control unit 1A.

In an image reading server of the present invention necessarily includes the image reading device control unit 1A and the image reading device 1B. Incidentally, as described above, a client-side apparatus can share these units with the server, through the communication control unit 4 and the communication port 5.

Further, in the structure of FIG. 2, even if the image reading device is physically independent of the image reading apparatus, it is assumed that the image reading apparatus has the function of one component including the image reading device.

In the present embodiment, the program which is stored in a ROM (read-only memory) may be stored in the HD 10 or the FD 9 directly connected with the apparatus, or in other apparatus connected with the apparatus through the network. Further, the program according to the present invention can be supplied to the system or the apparatus through the storage medium such as the HD 10, the FD 9 or the like, or through the network.

Figure 3:
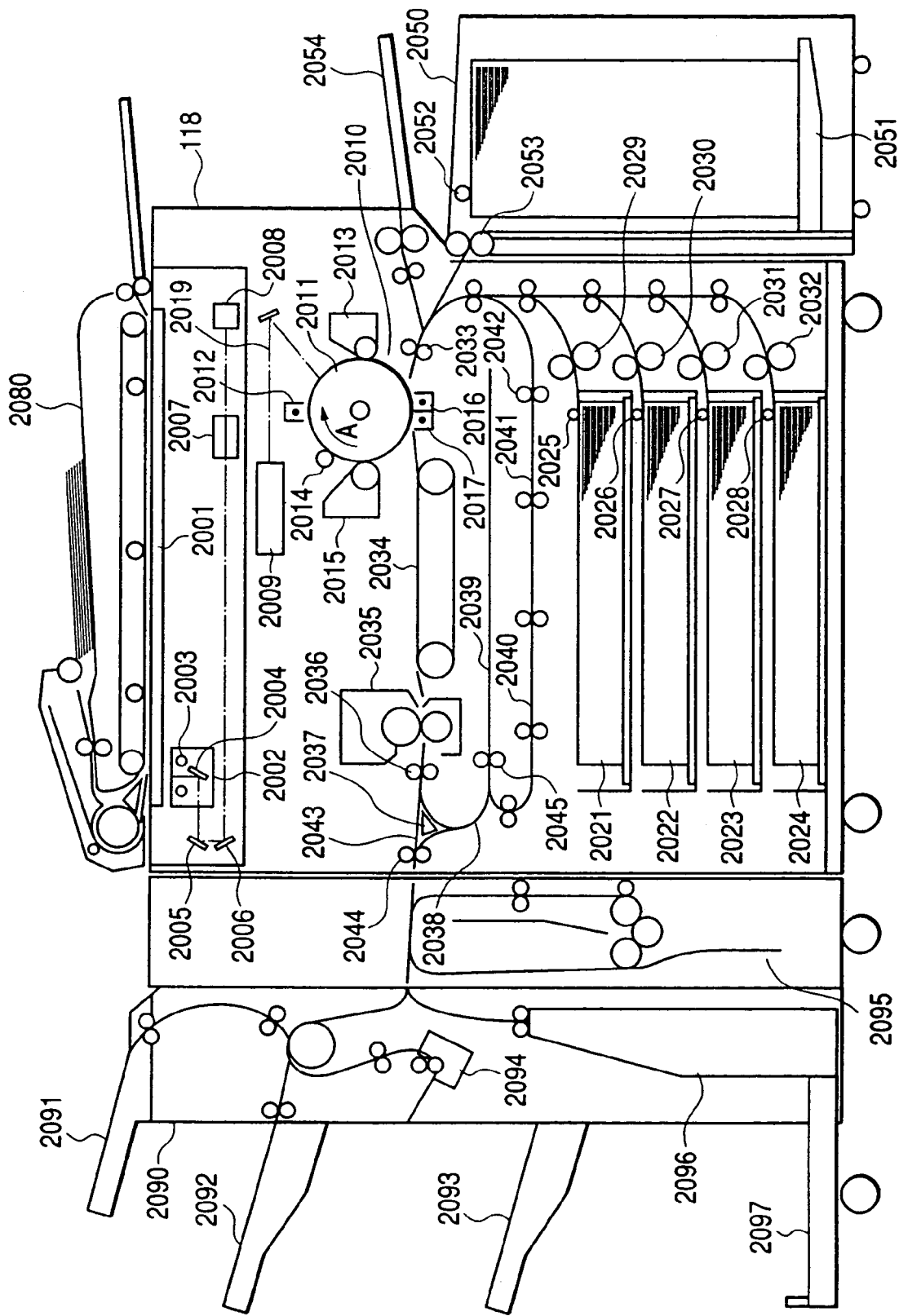
FIG. 3 is a sectional view for explaining a structure of a digital copying machine shown in FIG. 1.

FIG. 3 is a sectional view for explaining the structure of the digital copying machine 118 shown in FIG. 1.

In FIG. 3, numeral 2080 denotes an ADF (automatic document feeder) which is installed as an option. The ADF 2080 feds an original one by one from a sheaf of originals put on an original feeding board to an original mounting board (platen glass) 200 of the copying machine 118. Numeral 2002 denotes a scanner which is composed of an original illumination lamp 2003, a scanning mirror 2004 and the like. The scanner 2002 is reciprocated by a not-shown motor along a predetermined direction to scan the original. Thus, reflection light from the original is imaged on a CCD (charge-coupled device) in an image sensor unit 2008 through scanning mirrors 2004, 2005 and 2006 and a lens 2007.

The image sensor unit 2008 performs predetermined image processing to an electrical signal obtained by converting the reflection light from the original, to generate an image signal. Numeral 2009 denotes an exposure control unit which is composed of a laser beam generation unit, a polygonal scanner and the like. The exposure control unit 2009 generates a laser beam 2019 which is modulated based on the image signal generated by the image sensor unit 2008, and irradiates a photosensitive drum 2011 with the generated beam 2019.

Numeral 2010 denotes an image formation unit which is composed of the photosensitive drum 2011, a primary charger 2012, a development unit 2013, a transfer charger 2016, a separation charger 2017, a preexposure lamp 2014, a cleaner 2015 and the like. The primary charger 2012, the development unit 2013, the transfer charger 2016, the separation charger 2017, the preexposure lamp 2014 and the cleaner 2015 are disposed around the photosensitive drum 2011.

In the image formation unit 2010, the photosensitive drum 2011 is driven by a not-shown motor and thus rotated in the direction indicated by an arrow A. The primary charger 2012 charges the photosensitive drum 2011 to a predetermined potential. The later beam 2019 generated by the exposure control unit 2009 is irradiated on the photosensitive drum 2011 charged by the primary charger 2012, whereby an electrostatic latent image is formed. The development unit 2013 develops the electrostatic latent image formed on the photosensitive drum 2011 to visualize the image on the drum 2011 as a toner image.

Numerals 2021, 2022, 2023 and 2024 respectively denote first, second, third and fourth cassettes which hold transfer sheets as recording media. The transfer sheet held in the cassette is picked up by a pickup roller 2025, 2026, 2027 or 2028, fed to the copying machine 118 by a pair of sheet feed rollers (simply referred as a sheet feed roller hereinafter) 2029, 2030, 2031 or 2032, and then carried to the image formation unit 2010 by a pair of registration rollers (simply referred as a registration roller hereinafter) 2033.

The transfer charger 2016 transfers the visualized toner image on the photosensitive drum 2011 to the carried transfer sheet. After the toner image is transferred to the transfer sheet, the cleaner 2015 cleans residual toner on the photosensitive drum 2011. After the residual toner is cleaned by the cleaner 2015, the preexposure lamp 2014 eliminates the residual charges on the photosensitive drum.

The separation charger 2017 separates the transfer sheet on which the toner image was transferred, from the photosensitive drum 2011. Numeral 2034 denotes a carrying belt which carries the transfer sheet separated by the separation charger 2017, to a fixing unit 2035. The fixing unit 2035 presses and heats the transfer sheet to fix the toner image on the transfer sheet. Numeral 2036 denotes a pair of sheet discharge rollers (simply referred as a discharge roller hereinafter) which discharges the transfer sheet on which the toner image was fixed by the fixing unit 2035, outside the copying machine (body) 118.

Numeral 2037 denotes a sheet discharge flapper which changes the sheet transfer path between a carrying path 2038 and a discharge path 2043. Numeral 2040 denotes a lower carrying path which guides, to a sheet refeed path 2041, the transfer sheet carried by the sheet discharge roller 2036 and a pair of reversal rollers (simply referred as a reversal roller hereinafter) 2045 and then reversed through a reversal path 2039.

Numeral 2042 denotes a pair of sheet refeed rollers (simply referred as a sheet refeed roller hereinafter) which refeeds the transfer sheet guided to the sheet refeed path 2041 to the image formation unit 2010. Numeral 2044 denotes a pair of sheet discharge rollers (simply referred as a sheet discharge roller hereinafter) which is disposed in the vicinity of the sheet discharge flapper 2037 and discharges the transfer sheet outside the copying machine 118 when the sheet transfer path is changed to the sheet discharge path 2043 by the flapper 2037.

When the copying machine 118 performs two-face recording (two-face copying), the sheet discharge flapper 2037 is moved upward to guide the transfer sheet to which the copying was performed to the sheet refeed path 2041 through the carrying path 2038, the reversal path 2039 and the lower carrying path 2040. At this time, the reversal roller 2045 completely passes the trailing edge of the transfer sheet through the carrying path 2038 and then carries the sheet to the reversal path 2039 up to the position where the sheet is nipped by the reversal roller 2045. Then the reversal roller 2045 is reversed to carry the sheet to the lower carrying path 2040.

When the transfer sheet is reversed and discharged outside the copying machine (body) 118, the sheet discharge flapper 2037 is moved upward, and the transfer sheet is carried to the reversal path 2039 by the reversal roller 2045 up to the position where the trailing edge of the sheet remains in the carrying path 2038. Then the reversal roller 2045 is reversed to reverse and carry the sheet to the sheet discharge roller 2044.

Numeral 2090 denotes a sheet discharge unit (sorter) which is installed as an option, and flushes and staples the transfer sheets discharged from the copying machine 118. Concretely, the transfer sheets discharged one by one are stacked and flushed on a processing tray 2094 until the discharge of the sheets to which image formation of one copy (one sheaf) ends. Then the sheaf of transfer sheets is stapled by a not-shown stapler of the processing tray 2094, and the stapled sheaf is discharged to a sheet discharge tray 2092 or 2093. Each of the sheet discharge trays 2092 and 2093 is moved upward and downward by a not-shown motor and controlled to reach the position of the processing tray 2094 before an image processing operation is started.

Numeral 2091 denotes a sheet tray on which slipsheets each of which is to be inserted between the two continuous transfer sheets discharged are stacked. Numeral 2095 denotes a Z folder which is installed as an option and folds the discharged transfer sheets into Z shape. Numeral 2096 denotes a bookbinding unit which is installed as an option and performs bookbinding by folding the center of the discharged transfer sheets of one copy and then stapling them. The obtained sheaf of transfer sheets is discharged to a sheet discharge tray 2097.

Further, a paper deck (or a sheet deck) 2050 which can hold, e.g., 4000 transfer sheets is installed as an option in the copying machine (body) 118. A lifter 2051 of the paper deck 2050 ascends according to a quantity of the stacked transfer sheets such that the uppermost sheet is always in contact with a pickup roller 2052, whereby the transfer sheet is fed to the body 118 by a pair of sheet feed rollers (simply referred as a sheet feed roller hereinafter) 2053. Further, a multipurpose manual feeder 2054 which can hold 100 transfer sheets is installed.

The development unit 2013 may be a type in which toner is refilled by changing a toner cassette, or may be a type in which toner is directly refilled. Further, the development unit 2013 can detect a residual toner quantity in the unit 2013 itself.

Here, although a structure of a monochromatic copying machine is explained by way of example of the image output apparatus of the present invention, the present invention is applicable to a color copying machine.

In this case, the development unit 2013 is composed of four, i.e., Y (yellow), M (magenta), C (cyan) and Bk (black), development parts. Further, the development unit 2013 can independently detect each of residual Y, M, C and Bk toner quantities.

Further, the copying machine 118 can detect a residual transfer sheet quantity in each of the first to fourth cassettes 2021, 2022, 2023 and 2024, and the paper deck 2050. The sheet discharge unit (sorter) 2090 can detect a residual staple quantity in the processing tray 2094. Since the sheet discharge unit (sorter) 2090, the Z folder 2095 and the paper deck 2050 are the options, they are detachably installed in the copying machine (body) 118.

Figure 4:
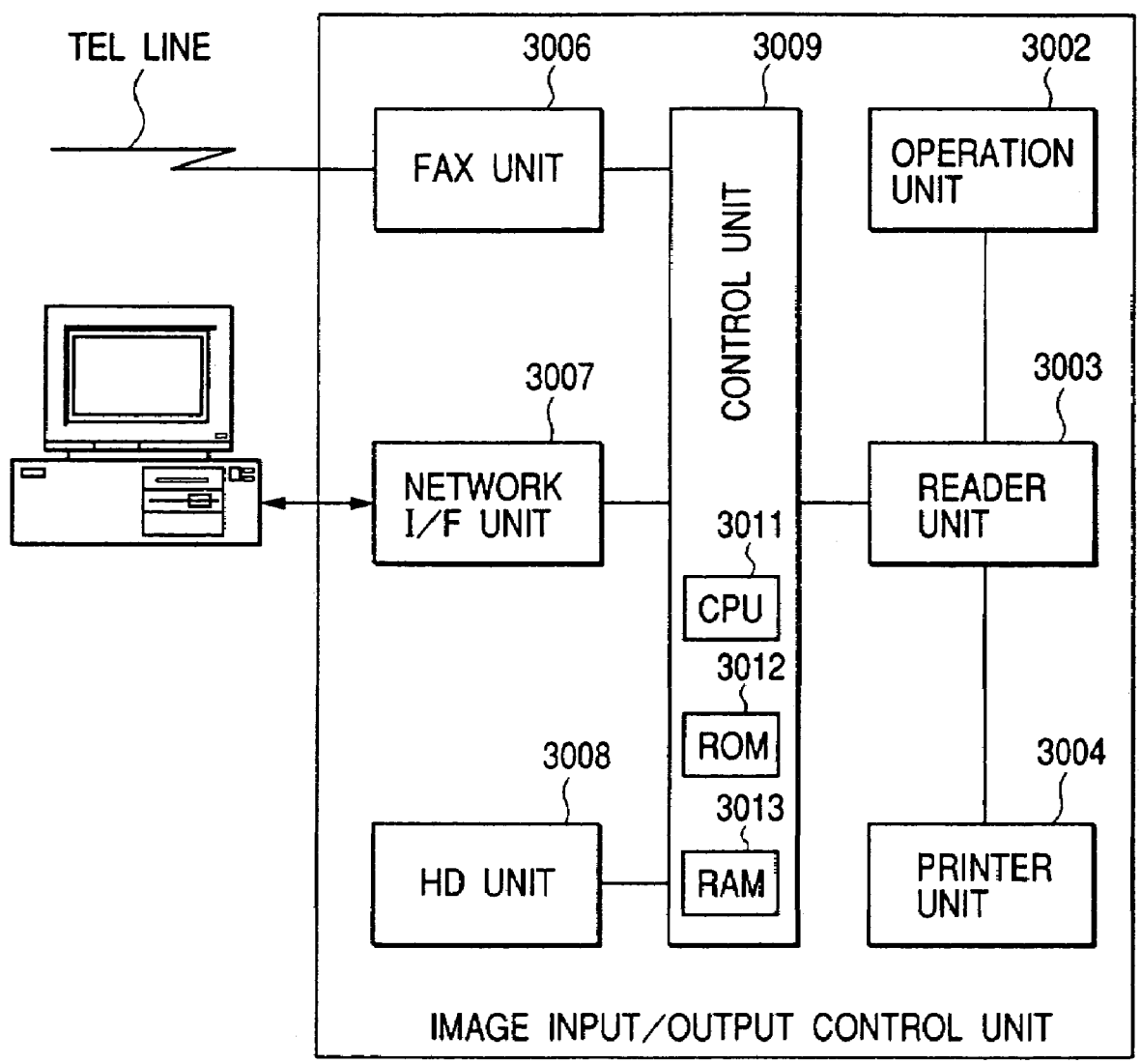
FIG. 4 is a block diagram for explaining a control structure of the copying machine shown in FIG. 3.

FIG. 4 is a block diagram for explaining a control structure of the copying machine 118 shown in FIG. 3. In FIG. 4, the same parts as those in FIG. 3 are added with the same reference numerals.

In FIG. 4, numeral 3002 denotes an operation unit which is used to perform various setting and instruct various operations for the digital copying machine (body) 118. Numeral 3003 denotes a reader unit which is composed of the elements 2001 to 2009 shown in FIG. 3, reads the original image, and outputs the image data corresponding to the original image to a printer unit 3004 and a control unit 3009. The printer unit 3004 which is composed of the elements 2009 to 2045 shown in FIG. 3 outputs the image according to the image data from the reader unit 3003 and the control unit 3009 onto a recording medium.

The control unit 3009 is connected with the reader unit 3003, a FAX (facsimile) unit 3006, a network I/F (interface) unit 3007 and an HD (hard disk) unit 3008, and entirely controls the copying machine 118.

The FAX unit 3006 decompresses compressed image data received through a telephone line, and transfers the decompressed image data to the control unit 3009. Further, the FAX unit 3006 compresses the image data transferred from the control unit 3009, and transmits the compressed image data through the telephone line. It should be noted that the compressed image data received by the FAX unit 3006 can be temporarily stored in the HD unit 3008.

The network I/F unit 3007 interfaces the LAN 130 (FIG. 3) with the control unit 3009. The network I/F unit 3007 expands or extracts code data (i.e., PDL (page description language) data) representing the image transferred through the LAN 130 to the image data recordable by the printer unit 3004, and then transfers the recordable image data to the control unit 3009.

The recording unit 3009 is composed of a CPU 3011, a ROM 3012, a RAM 3013 and the like. The control unit 3009 controls the data flow among the reader unit 3003, the FAX unit 3006, the network I/F unit 3007 and the HD unit 3008, on the basis of the data stored in the ROM 3012 or data received from other parts.

The HD unit 3008 includes an HD, a page memory and the like all not shown, and can store the plural image data. The plural image data stored in the HD unit 3008 can be output in the order according to an editing mode instructed by the operation unit 3002 of the digital copying machine (body) 118.

Figure 5:
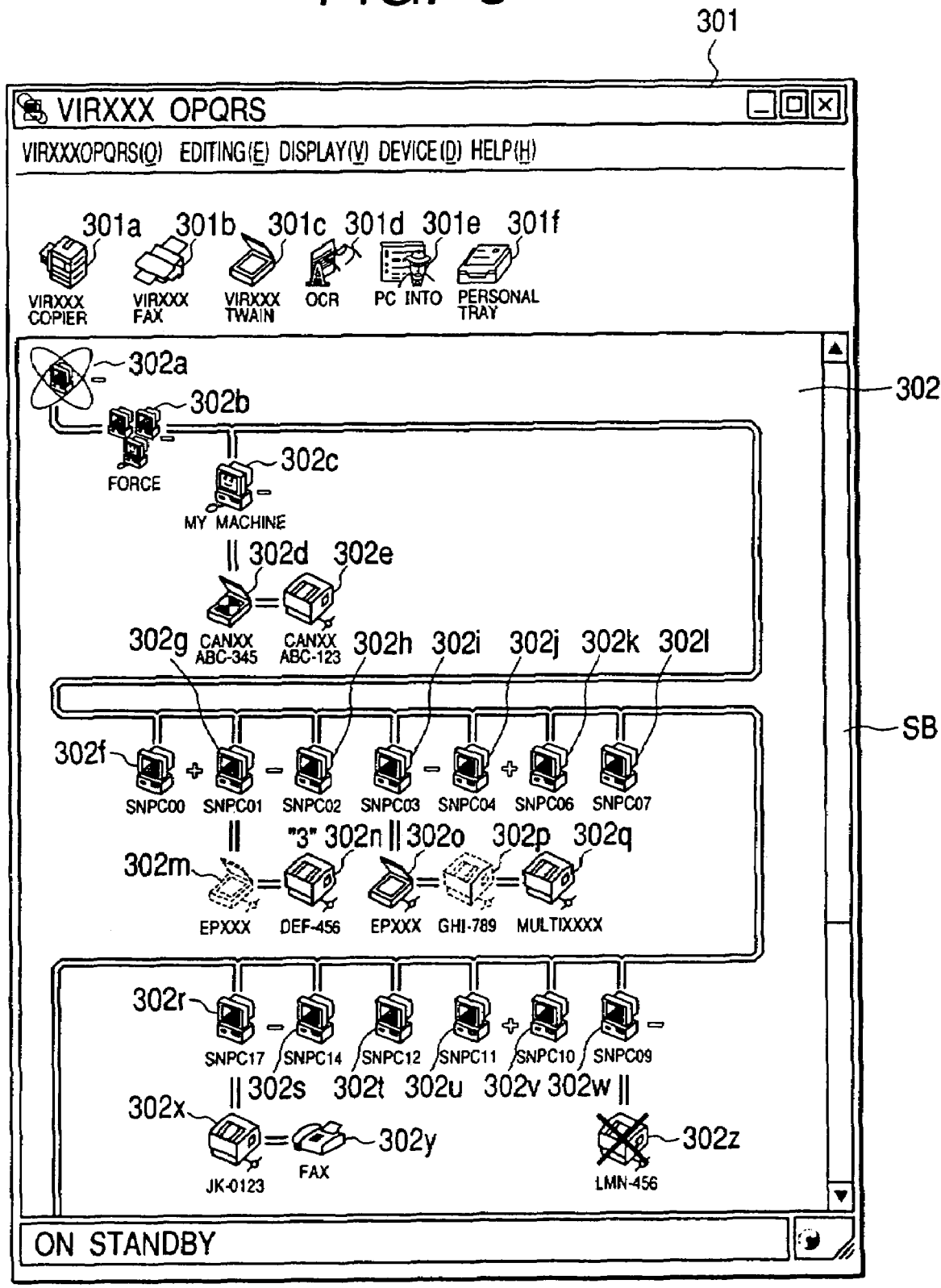
FIG. 5 is a view for explaining a first network connection structure displayed on a CRT (cathode-ray tube) shown in FIG. 2.

The control unit 3009 can notify the residual toner quantity, the residual transfer sheet quantity for each size, the residual staple quantity, the copying machine status (door open status, sheet jam status, etc.), presence/absence of the various options (the sheet discharge unit (sorter) 2090, the Z folder 2095, the paper deck 2050, etc. in FIG. 3) and the like, to the LAN 130 through the network I/F unit 3007, or to each device connected through the WAN composed of the LAN's 130, 100 and 120 in FIG. 1., FIG. 5 is a view showing a screen displayed on the CRT 16 of the data processing apparatus, e.g., a PC shown in FIG. 2, and for explaining a first network connection structure.

In FIG. 5, numeral 301 denotes a main window in which a menu, a tool bar, icons representing PC's (including a user's own apparatus and other apparatuses) and peripheral devices (scanners, printers, FAX machines, etc.), and icons 301a to 301f on the tool bar representing functions respectively performed or executed by operating the PC's and the peripheral devices are displayed.

For example, the icon 301a is used to execute a copying function for reading the image data from the selected scanner and outputting the read image data to the selected printer. The icon 301b is used to execute a FAX (facsimile) function.

The icon 301c is used to execute an image data reading function. The icon 301d is used to execute a function for reading the image data and performing OCR (optical character recognition) processing.

The icon 301e is used to execute a function for displaying PC (personal computer) information, and the icon 301f is used to execute a function for displaying each personal tray data. Numeral 302 denotes a system display window.

In the system window 302, symbols 302a to 302z denote icons which respectively represent the PC's and the peripheral devices shared on the network shown in FIG. 1. The displayed icons are changed according to the kind of device (e.g., PC, printer, scanner, FAX modem or the like) or the status (e.g., "in processing", "error occurrence" or the like).

Numeral 302a denotes the root icon, numeral 302b denotes the icon representing a domain by which the user's own apparatus (displayed as "my machine") logs on, and numeral 302c denotes the icon representing own apparatus. The user's own apparatus is a special device and thus displayed independently of other PC's.

The icons 302m and 302p respectively represent the peripheral device and the PC which are shared on the network but for which any driver is not installed. Thus, the icons 302m and 302p are displayed in gray.

The icon 302d represents that the scanner is scanning the image now. At the icon 302n, e.g., a numeral "3" representing that three jobs are spooled in the printer is displayed.

The icon 302z represents that the printer in which a driver has been installed can not be used because of some reasons (e.g., breakdown, toner empty, no sheet, etc.). As above, it is possible by using the screen shown in FIG. 5 to graphically recognize the connection statuses and conditions of all the PC's and peripheral devices on the network. In the present embodiment, although all icons are not displayed for the convenience of screen, the user can confirm the connection statuses of all PC's and peripheral devices by using an SB (scroll bar) disposed at the side of the screen.

FIG. 6 is a view showing an example of a combination judgment data structure stored in the data processing apparatus shown in FIG. 2. For example, the combination judgment data structure is stored in the HD 10.

In FIG. 6, numerals 601 and 602 denote header segments. The header segment 601 corresponds to the number of combination functions registered, and the head segment 602 corresponds to a comment.

Each of segments 603a to 603d corresponds to one function data. The segment 603a corresponds to first device data, and the segment 603b corresponds to second device data. In the present embodiment, the first device data represents the scanner, and the second device data represents the printer. Such a combination is effective (or valid) even if opposite. The segment 603c corresponds to a function (a copying function in the present embodiment) which is executable by virtually combining the above plural functions (scanner and printer functions in the present embodiment) with others, and the segment 603d corresponds to a comment. In the present embodiment, N registered functions can be stored as the combination judgment data structure, and the Nth function corresponds to segments 604a to 604d.

Figure 7:
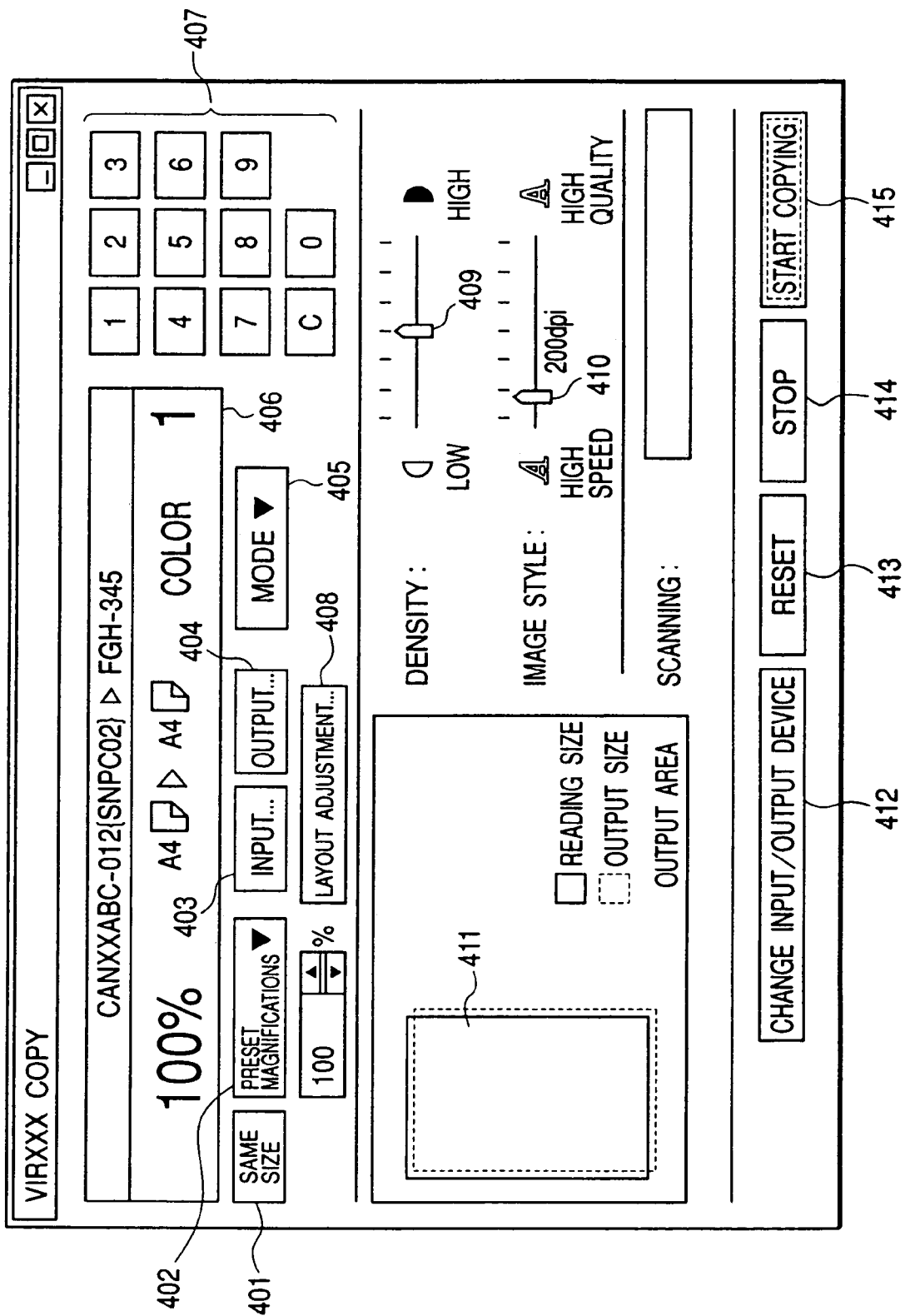
FIG. 7 is a view showing an example of a copying function setting screen displayed on the CRT shown in FIG. 2.

FIG. 7 is a view showing an example of a copying function setting screen displayed on the CRT 16 of the data processing apparatus shown in FIG. 2. When the scanner icon shown in FIG. 5 is dragged and dropped on the printer icon, if such a combination is judged to be effective, this combination is displayed on the CRT 16.

The reason why the copying function setting screen is displayed will be explained as follows. That is, the devices (i.e., the scanner and the printer in the present embodiment) dragged and dropped on the screen of FIG. 5 are disposed at physically distant locations respectively, but electrically connected with each other through a communication path to be able to perform data communication. The scanner can perform at least image input processing as an executable function, and the printer can perform at least image output processing as an executable function. Namely, although these devices are disposed at the locations physically distant from each other, when the functions of these devices are appropriately combined with each other, it is possible to execute the copying function. Therefore, a screen as in FIG. 7 is displayed such that the user of the data processing apparatus can operate these two peripheral devices as if one device, thereby causing the user to be able to unconsciously use the two peripheral devices as one device. It should be noted that, when the combination of the devices designated by a drag-and-drop operation is changed, the displayed setting screen of FIG. 7 is also changed.

In FIG. 7, numerals 401 and 402 denote magnification setting buttons (simply called buttons). The button 401, is depressed to instruct ordinary same-size output, and the button 402 is depressed to instruct reduction/enlargement output, whereby desired magnification can be designated.

Numerals 403 and 404 denote buttons which function as input and output sheet setting buttons, respectively. When the buttons 403 and 404 are depressed, a dialog box for setting a sheet size, a sheet direction and the like is displayed, whereby the sheet size and the sheet direction can be set. Numeral 405 denotes a button which functions as an input image color mode setting button. By using the button 405, a color mode, a monochrome mode, a gray scale mode and the like can be set.

Numeral 406 denotes a setting content confirmation display area. The setting content (the copying function in the present embodiment) which is based on the functions determined by the combination of the icons are displayed in the area 406. Concretely, the magnification "100% (same size)", the longitudinal input sheet "A4", the longitudinal output sheet "A4", the color copying mode "COLOR" and the like are displayed.

Numeral 407 denotes ten key buttons which are used to set the number of output copies, and numeral 408 denotes a layout adjustment setting button (simply called a button). When the button 408 is depressed, a dialog box by which sheet output position setting, 2-in-1 output setting and the like can be performed is displayed.

Numeral 409 denotes a slider by which a desired density setting can be performed according to user's operation and instruction with the mouse 13. Numeral 410 denotes a slider by which desired image style setting can be performed according to user's operation and instruction with the mouse 13.

Numeral 411 denotes a preview area in which an input size, an output size and an output area (or a image producible area) are displayed. Numeral 412 denotes a button which is used to change input and output devices. When the button 412 is depressed, a dialog box for setting input and output devices different from the input and output devices set by the icons is displayed, whereby the user can select the intended input and output devices. Numeral 413 denotes a button. When the button 413 is depressed, the current copying function setting is reset, and thus predetermined standard copying function setting becomes effective. Numeral 414 denotes a stop button, and numeral 415 denotes a copying execution button.

FIG. 8 is a view showing an example of an error message displayed on the CRT 16 shown in FIG. 2. When the CPU 2 judges based on stored judgment information that the icons combined by user's mouse operation do not make an effective (or valid) combination, the error message is displayed on the display screen shown in FIG. 5.

In FIG. 8, numeral 501 denotes an error message dialog box which is displayed when the combination of the icons is not effective.

In the present embodiment, it is judged whether or not the combination is effective based on the point to which the drag-and-drop operation is performed, and the error message is displayed. However, it is possible to judge the combination based on the point to which the drag operation is performed and then disable the user from performing the drop operation.

FIG. 9 is a flow chart showing an example of a first data processing procedure in the data processing apparatus according to the present invention. The first data processing procedure corresponds to a combination function processing procedure according to system structure display processing.

Initially, in a step S201, the connection information of all the PC's and the peripheral devices of FIG. 1 shared on the network and use conditions and status information of these devices are acquired, and the acquired information is stored in the PMEM 3 of FIG. 2. Next, in a step S202, the device driver information installed in the user's own apparatus is checked and acquired. In a step S203, the screen for simultaneously displaying the system structure and the system status shown in FIG. 5 is displayed on the CRT 16 of the user's own apparatus, on the basis of the acquired information.

Next, in a step S204, when execution of each function is instructed, it is judged whether or not such an instruction is effective. For example, on the screen shown in FIG. 5, when the scanner icon 302*d* is dragged to and dropped on the printer icon 302*n* by using the mouse to execute the copying function, it is judged whether or not the combination of the scanner and the printer is effective.

If judged that the combination is not effective, the flow advances to a step S205 to display the error message on the CRT 16 as shown in FIG. 8.

Conversely, if judged in the step S204 that the combination is effective, the flow advances to a step S206 to display a corresponding-function window. In the present embodiment, the setting screen for the copying function shown in FIG. 7 is displayed on the CRT 16.

Next, it is judged in a step S207 whether or not the copying is to be performed. When the button 414 of the virtual operation panel shown in FIG. 7 is depressed to instruct a copying stop, the processing ends.

When the button 415 is depressed to instruct the copying, the flow advances to a step S208 to perform, the copying according to the setting. Namely, in this case, an original image set in the existential scanner corresponding to the dragged icon on the screen of FIG. 5 is input, the image is transferred through the network to the existential printer corresponding to the icon on which the dragged icon is dropped, and this printer performs the processing based on the input setting on the screen shown in FIG. 7 and forms the image on the sheet.

[Second Embodiment]

In the above-described first embodiment, it was explained the case where the device driver information is acquired from the network by communicating with the network device when each PC on the network is powered, and the device connection information and the operation status of each device are virtual-displayed graphically by using the integrated-shaped icons which are different for the respective devices. However, the devices to be connected with the network are not limited to the printer and the scanner as described in the first embodiment. Namely, the present invention is also applicable to a case where a multifunctional device including the printer and scanner functions or a combination of these functions and other functions (including the FAX function, a database function, etc.) is connected with the network. Hereinafter, the second embodiment will be explained.

FIG. 10 is a view showing an example of the device driver information managed by the data processing apparatus according to the second embodiment of the present invention. For example, it is assumed that, when initialization processing such as a PC power-up operation or the like is performed, or when a later-described icon is depressed, the device driver information of a multifunctional device (e.g., the digital copying machine 118 managed by the respective devices shown in FIG. 1) connected with the network is acquired from the PC on the network, and the acquired information is managed on the PMEM 3 or the HD 10. When a management server for managing the device driver information is connected with the network, the device driver information may be acquired from the management server.

In FIG. 10, numeral 800 denotes acquirement information, and numeral 801 denotes a header segment which is composed of a driver name, version information and a comment.

Numeral 802 denotes a page setting information segment which is composed of page setting information (an original size, an output sheet size, a printing direction, a page layout, magnification, and a stamp). Here, for example, "A4", "A3", "B4" and the like are selectable as the original size and the output sheet size, "longitudinal", "lateral" and the like are selectable as the printing direction, "1 page/sheet", "2-in-1" and the like are selectable as the page layout, "100%", "141%" and the like are selectable as the magnification, and "secret", "confidential" and the like are selectable as the stamp.

Numeral 803 denotes a finish information segment which is composed of a printing method, a binding direction and a sheet discharge method. Here, for example, "ordinary printing", "bookbinding printing", "two-face printing", "OHP printing" and the like are selectable as the printing method, "longitudinal", "lateral" and the like are selectable as the binding direction, and "sorting", "grouping", "rotation sorting" and the like are selectable as the sheet discharge method.

Numeral 804 denotes a sheet feed information segment which is composed of various sheet feed setting information (a sheet feed method, and an OHP printing detail setting). Here, for example, "cassette 1", "manual feed" and the like are selectable as the sheet feed method, and "sheet feed port when OHP printing setting", "intermediate sheet designation", "sheet type" and the like are selectable as the OHP printing detail setting.

Numeral 805 denotes a device setting information segment which is composed of sheet feed option information and sheet discharge option information (a sheet feed option, and a sheet discharge option). Here, for example, "sheet feed option device setting" is selectable as the sheet feed option information and "sheet discharge option device setting" is selectable as the sheet discharge option information.

Figure 11:
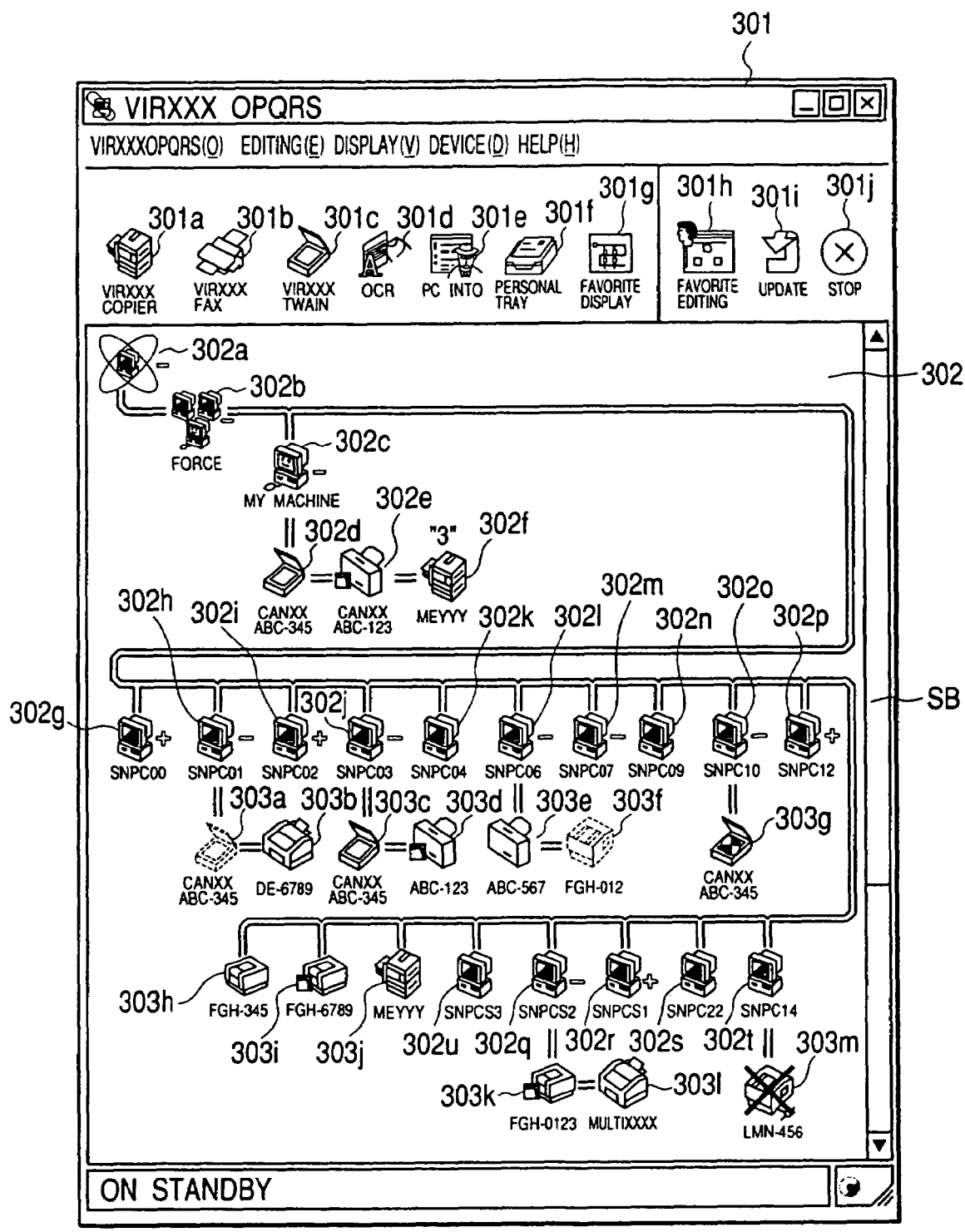
FIG. 11 is a view for explaining a second network connection structure displayed on the CRT shown in FIG. 2.

In the first embodiment, the identical icon is used for the same-type device. However, in the present embodiment, icon information which represents an icon close (or similar) to a rough appearance of an actual product for each maker (or manufacturer) is previously stored and displayed, whereby the user can visually recognize an icon of the same-type device of other maker. As shown in FIG. 11, a maker name and a device name may be displayed nearby the corresponding icon.

In this case, it is assumed that, when the device corresponds to color image processing, a CM (color mark: FIG. 11) representing color correspondence is added to the device icon.

The display of the icon is controlled based on the device driver information which is managed on the HD 10 or the PMEM 3.

Since the device driver information uses information which concerns a device mode supported by device driver information, even if a new peripheral device (including an option device) is provided by the maker, the image processing apparatus can quickly cope with the newly provided device only by installing the device driver information thereof.

FIG. 11 is a view showing a system structure status screen displayed on the CRT 16 of the data processing apparatus shown in FIG. 2, and for explaining a second network connection structure. In FIG. 11, it should be noted that the same parts as those in FIG. 5 are added with same symbols, respectively.

In FIG. 11, symbols 301g to 301j denote icons. When the icon 301g is indicated by the cursor and the mouse 13 is then clicked, the screen display is changed to a not-shown favorite display. Namely, the system display window is divided, and the entire system and the device icons in the system structure which are frequently used for the user in his own apparatus and have been registered as the favorites are displayed in the divided window.

The icon 301h is indicated when the system display window 302 is changed to an editing screen for registering the icons in a favorite window. The icon 301i is indicated when the content of the system display window 302 is updated. The icon 301j is indicated when a program for displaying the system display window 302 is stopped.

Symbols 302g to 302u denote icons which respectively represent other PC's connected with the network. Symbol 302f denotes an icon which represents a multifunctional device such as the digital copying machine 118 shown in FIG. 1. At the icon 302f, e.g., a numeral "3" representing that three jobs are spooled in the copying machine is displayed. It should be noted that, as the icon 302f, an inherent icon different from the icons of the input and output device connected with the network devices and its device name are displayed.

Symbols 303a to 303m denote icons which represent the input and output devices connected with the network devices, respectively. These icons 303a to 303m are the inherent icons, (i.e., the icons of which shapes are extremely close to actual appearances of the bodies to be connected, respectively) which are specified by the device names respectively, and their connection statuses and operation statuses are displayed. Here, "X" (impossibility) mark is now overlaid on the icon 303m, whereby the current device represented by the icon 303m can not be selected due to some troubles. Further, the icons (303a and 303f in this case) representing the devices which have been connected but to which any driver is not installed are displayed in gray.

Figure 12:
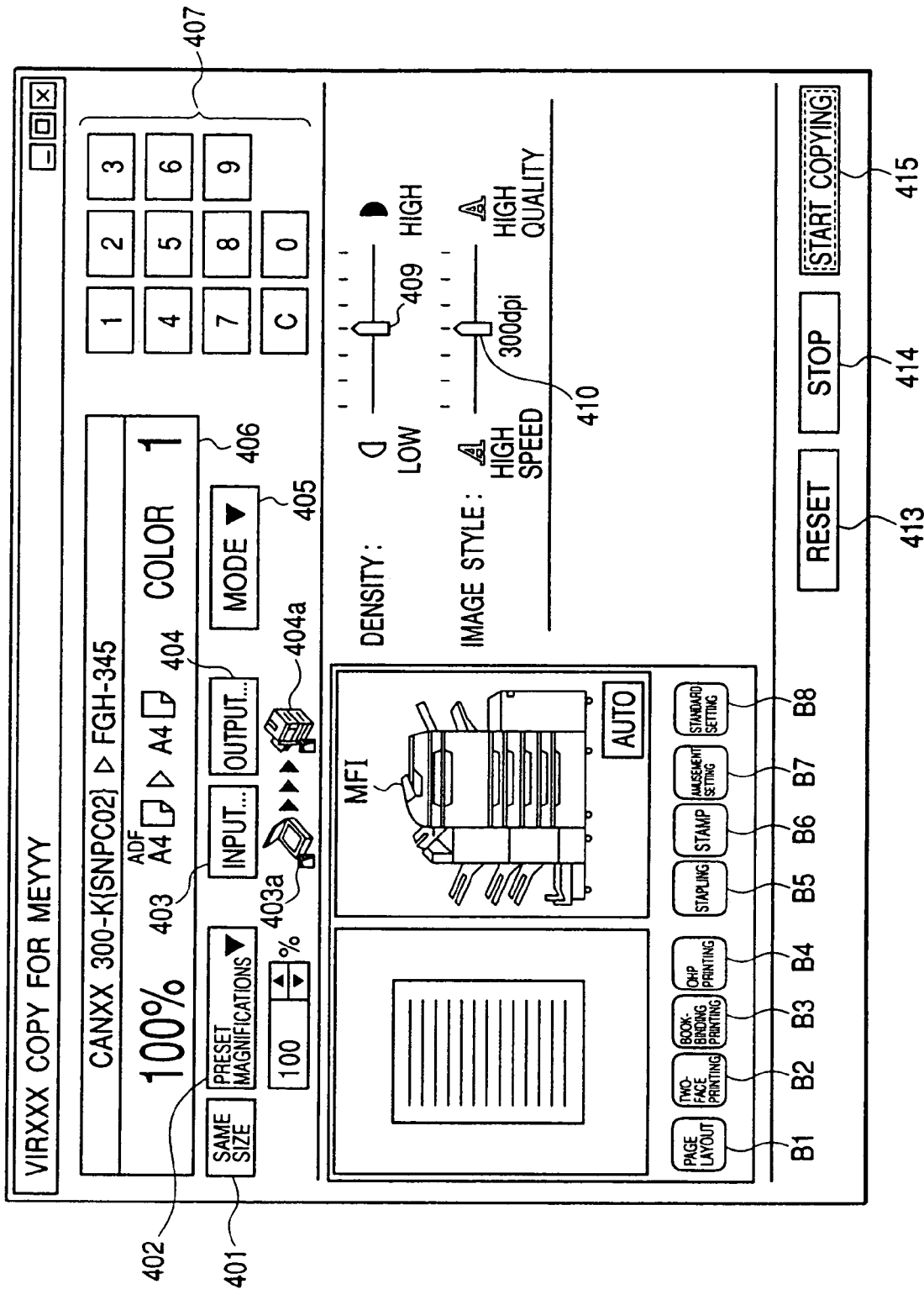
FIG. 12 is a view showing an example of a virtual operation panel displayed on the CRT of the data processing apparatus shown in FIG. 2.
Figure 13:
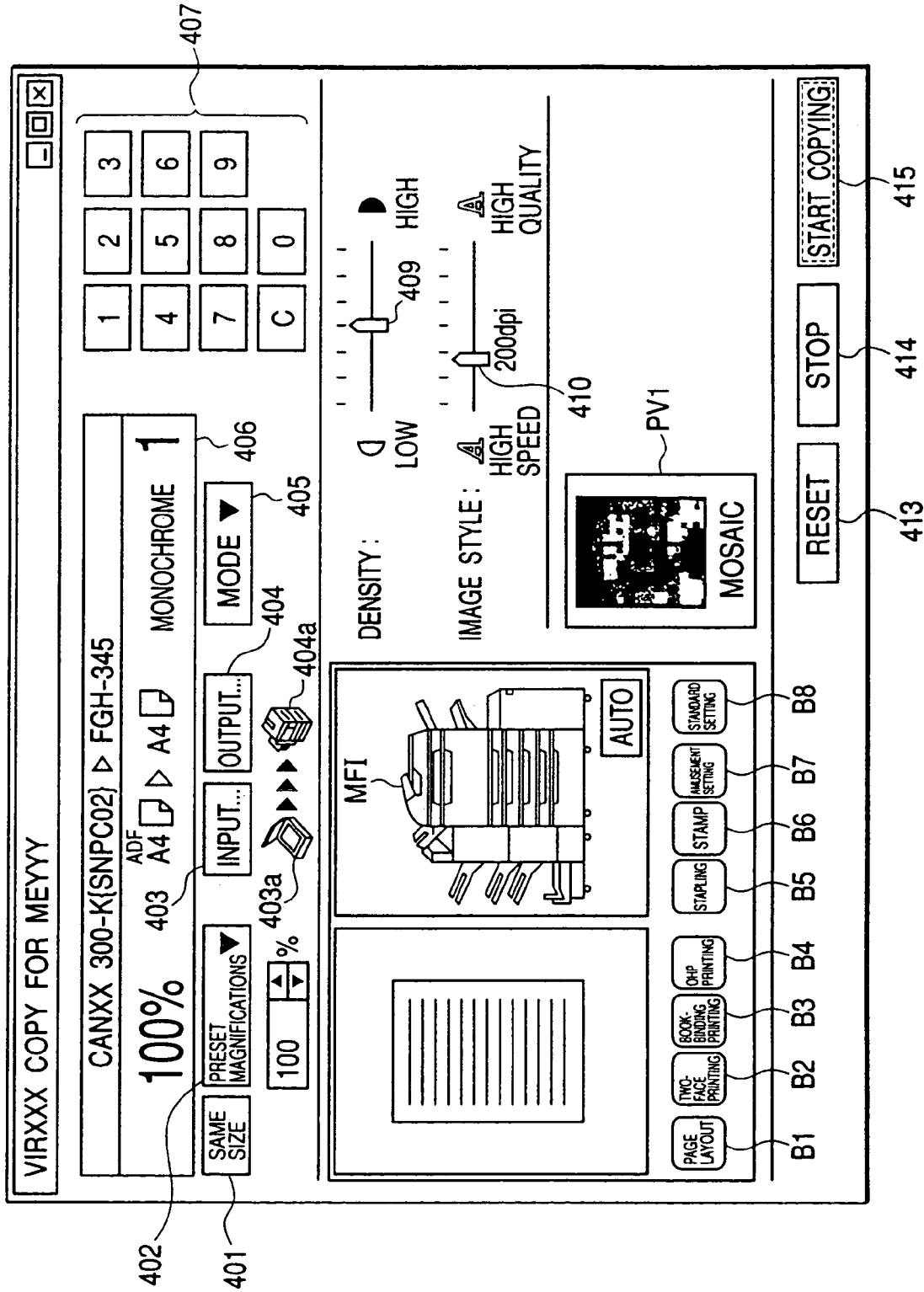
FIG. 13 is a view showing an example of the virtual operation panel displayed on the CRT of the data processing apparatus shown in FIG. 2.
Figure 14:
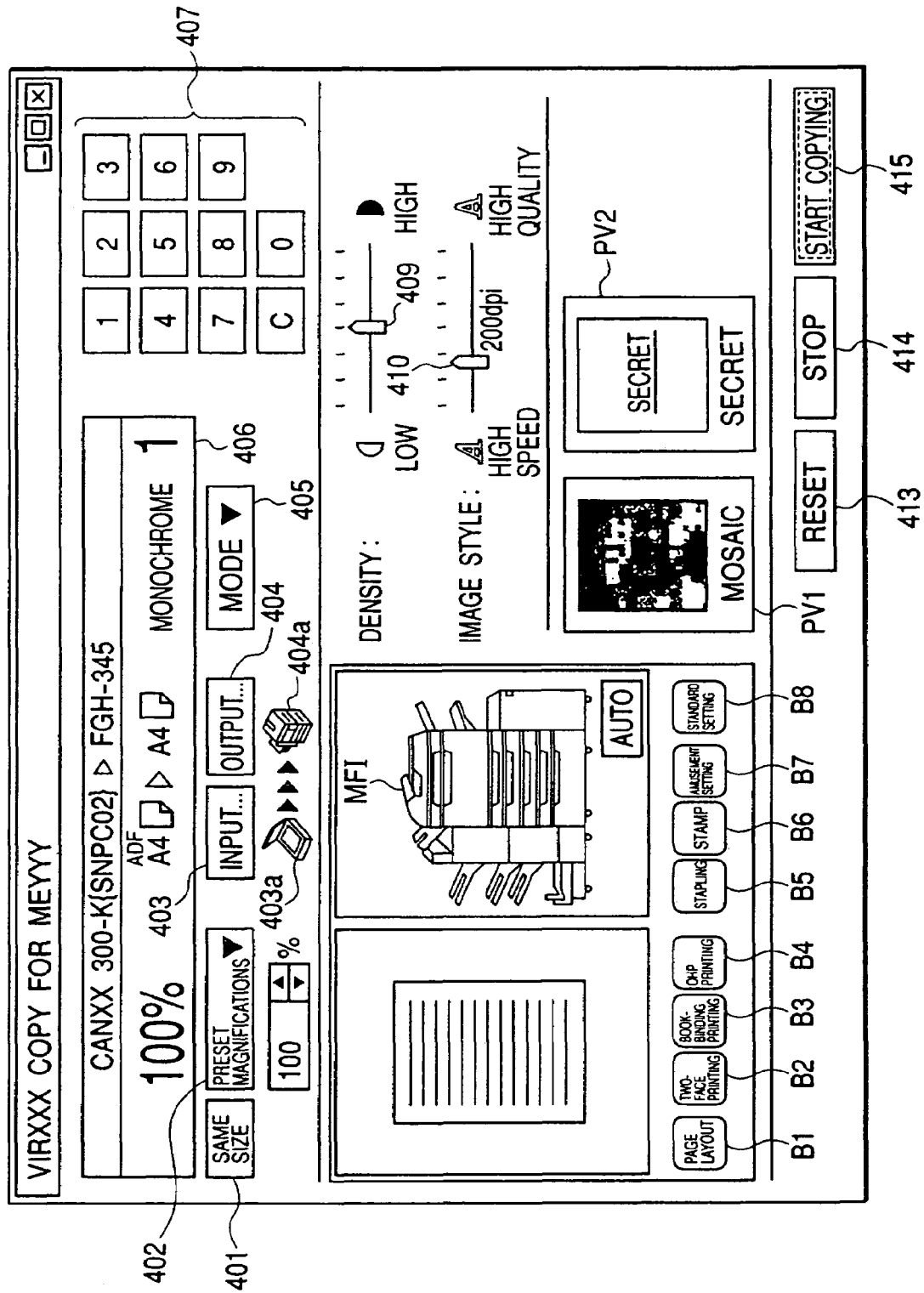
FIG. 14 is a view showing an example of the virtual operation panel displayed on the CRT of the data processing apparatus shown in FIG. 2.

Each of FIGS. 12, 13 and 14 is a view showing an example of a virtual operation panel displayed on the CRT 16 of the data processing apparatus shown in FIG. 2. When the scanner icon (e.g., 302d, 303c or the like) dragged in the status that an icon 302f shown in FIG. 11 is effectively displayed is dropped on the icon 302f, the virtual operation panel is displayed as the image by which the user can confirm the digital copying machine 118 and the connected option devices, by referring to the device driver information acquired from the digital copying machine 118 corresponding to the icon 302f and managed in the HD 10 or the PMEM 3. Namely, the virtual operation panel to be displayed is changed according to the kind of dragged and dropped icon. In FIGS. 12 to 14, it should be noted that the same parts as those in FIG. 7 are added with same numerals and symbols, respectively.

In FIGS. 12 to 14, symbols B1 to B8 denote buttons. The buttons B1 to B6 are the operation buttons which are inherent for the digital copying machine 118 and substantially equivalent to the content displayed on the operation panel of the digital copying machine 118. Namely, the button B1 is depressed by a cursor operation when the page layout is set. In the page layout, various N-in-1 layout including 2-in-1 layout or layout of outputting one image to every plural sheets is included. In a default status, the output image corresponding to the sheet size "A4" and lateral writing output is displayed.

The button B2 is depressed when the two-face printing is designated, the button B3 is depressed when the bookbinding processing is performed, the button B4 is depressed when the OHP printing is designated, and the button B5 is depressed when the stapling being a sheet discharge option of the digital copying machine 118 is designated. The button B6 is depressed when the stamp output is performed. In the stamp output, the stamp information (image) such as "SECRET" is added to (overlaid on) the output image information, and an obtained composite image is output.

It should be noted that the functions which are set by using the buttons B1 to B6 are the functions which belong to the digital copying machine 118.

The button B7 is depressed when the function which does not belong to the digital copying machine 118 but can be set by the PC side is executed. In the present embodiment, this function is called favorite setting (later described), and two kinds of setting (image effect setting and stamp setting) are prepared as the favorite setting. The button B8 is depressed when the copying mode setting is reset to the standard mode.

Symbols PV1 and PV2 denote preview areas in which effect images selected according to the favorite setting designated by the PC side are displayed. In the present embodiment, a mosaic image is displayed in the preview area PV1, and a secret stamp is displayed on the preview area PV2.

Resolution which is adjusted by a slider 410 is automatically set in ½ of the highest resolution of the selected output device side, in consideration of traffic of the image data managed on the network. Further, it is assumed that the resolution which is identical or close to the automatically set resolution is automatically set as the resolution of the input device side.

The highest resolution of the copying machine corresponding to color processing is 600 dpi. Therefore, when the image is input from the color-correspondence scanner, the screen shown in FIG. 12 represents that the input resolution of the scanner side is set to 300 dpi being ½ or so of the output resolution of the printer side.

Similarly, it is assumed that, in consideration of traffic of the image data managed on the network, the resolution of, e.g., ½ or so of the reading resolution set in the scanner corresponding to the dragged scanner icon is automatically set. However, it is possible to increase or decrease the resolution according to a user's demand.

Symbol MFI denotes a system image. When the scanner icon which is dragged in the status that the icon 302f of FIG. 11 is effectively displayed is dropped on the icon 302f, the system image MFI is displayed on the CRT 16 by referring to the device driver information acquired from the corresponding digital copying machine 118 and managed in the HD 10 or the PMEM 3 such that the user can confirm the option device connected with the digital copying machine 118. It should be noted that a sheet feed unit of the system image MFI is displayed such that an automatically selected sheet feed unit distinguishable from other sheet feed units.

Icons 403a and 404a function input and output sheet setting buttons, respectively. When the icon 403a or 404a is depressed, a dialog box (e.g., shown in later-described FIG. 17) for setting a sheet size, a sheet direction and the like is displayed. Thus, various detail setting including the sheet size, the sheet direction, the color/monochrome mode and the like can be set.

Figure 15:
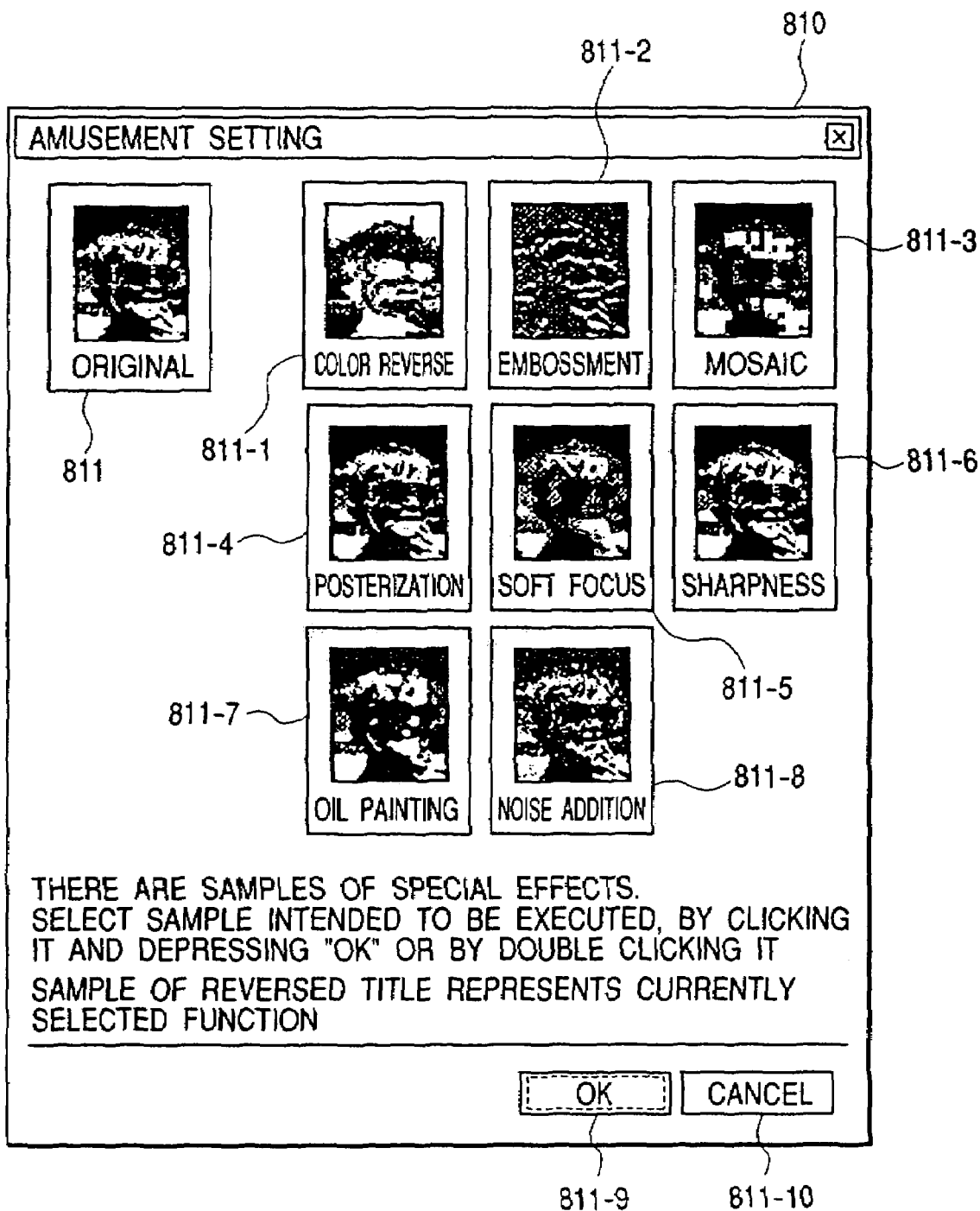
FIG. 15 is a view showing an example of a first window displayed, in case of amusement setting, on the virtual operation panel of the CRT of the data processing apparatus shown in FIG. 2.

FIG. 15 is a view showing an example of a first window displayed which is displayed in case of amusement setting, on the virtual operation panel of the CRT 16 of the data processing apparatus shown in FIG. 2. Especially, after the button B7 of FIG. 14 and the like is depressed, the screen of FIG. 15 is displayed when "effect" is selected on a not-shown menu.

In FIG. 15, numeral 811 denotes an original image which corresponds to an original image example input from the scanner. Numerals 811-1 to 811-8 denote effect image examples. The effect image 811-1 corresponds to the image example subjected to color reverse processing, the effect image 811-2 corresponds to the image example subjected to embossment processing, the effect image 811-3 corresponds to the image example subjected to mosaic processing, the effect image 811-4 corresponds to the image example subjected to posterization processing, the effect image 811-5 corresponds to the image example subjected to soft focus processing, the effect image 811-6 corresponds to the image example subjected to sharpness processing, the effect image 811-7 corresponds to the image example subjected to oil painting processing, and the effect image 811-8 corresponds to the image example subjected to noise addition processing. In the present embodiment, since the effect image 811-3 is selected now, the mosaic processing is displayed in the preview area PV1 of the virtual operation panel of FIG. 13. Here, when a button 811-9 is depressed, the selected effect image can be settled, and when a button 811-10 is depressed, the selected effect image can be cancelled.

Such effect processing is performed, by performing predetermined image processing calculation to the scanner image data according to an image application on the PC side.

Figure 16:
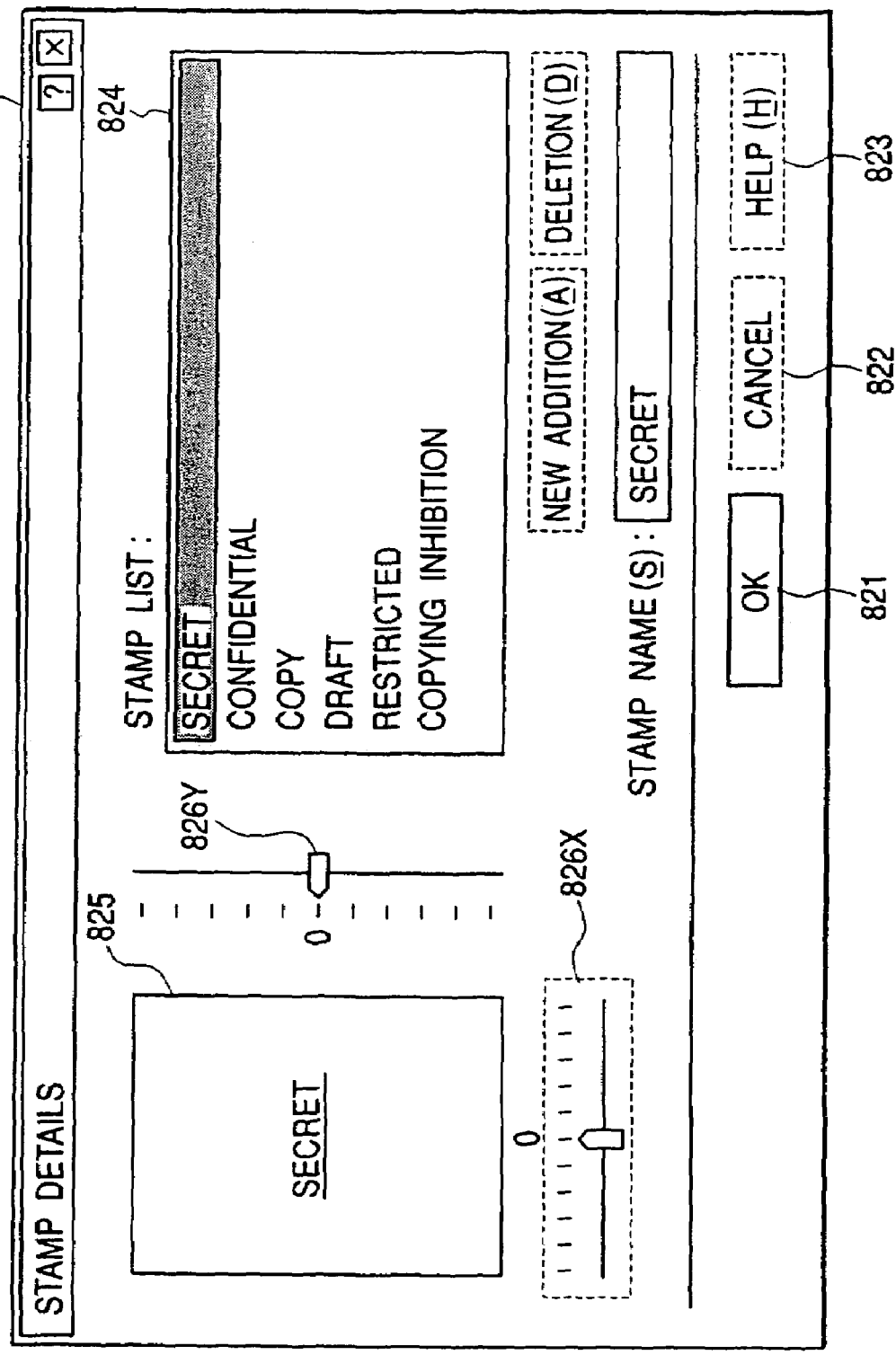
FIG. 16 is a view showing an example of a second window displayed, in case of amusement setting, on the virtual operation panel of the CRT of the data processing apparatus shown in FIG. 2.

FIG. 16 is a view showing an example of a second window displayed, in case of amusement setting, on the virtual operation panel of the CRT 16 of the data processing apparatus shown in FIG. 2. Especially, after the button B7 of FIG. 14 and the like is depressed, the screen of FIG. 16 is displayed when "stamp" is selected on a not-shown menu.

In FIG. 16, numerals 821 and 822 denote buttons. When the button 821 is depressed, the stamp (reversely displayed) selected in a stamp list 824 is settled, and when the button 822 is depressed, the selected stamp is cancelled. A button 823 is depressed to display a help screen for the stamp processing.

Symbols 826X and 826Y denote sliders. By the sliders 826X and 826Y, the position at which the stamp is allocated within the output sheet can be set independently for each of X and Y directions. In the present embodiment, stamp information 825 is set at the center of the currently output image.

The stamp information registered in the stamp list can be newly added and deleted. Namely, the stamp information which was intended by the user and generated and printed by the application or the like, the image data which was input from the scanner, or the image which was edited by combining the stamp information and the image data has been stored and managed in the HD 10 or the like. These stamps are executed not by the function of the copying machine but by the function of the PC.

Figure 17:
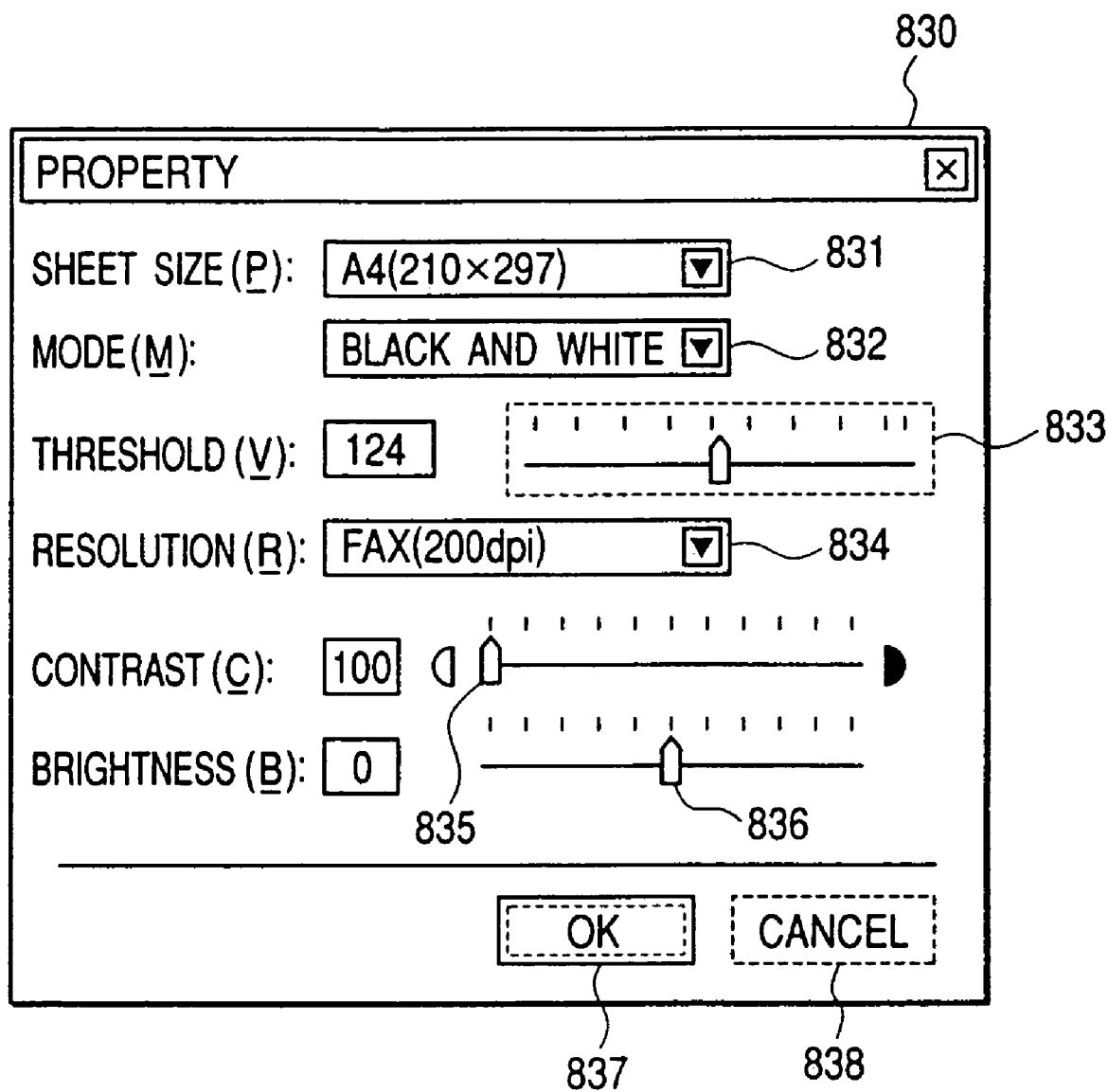
FIG. 17 is a view showing an example of a property screen displayed, according to icon instructions, on the virtual operation panel of the CRT of the data processing apparatus shown in FIG. 2.

FIG. 17 is a view showing an example of a property screen displayed, according to icon instructions, on the virtual operation panel of the CRT 16 of the data processing apparatus shown in FIG. 2. Especially, when the icon 403a shown in FIG. 14 and the like is depressed or indicated, the property screen is displayed on the basis of the device driver information acquired in the drag-and-drop operation for the input and output devices.

In FIG. 17, numeral 830 denotes a property screen on which various image input conditions can be freely set for, e.g., the scanner. For example, "A4" is now set to a sheet size area 831, "black and white (or monochrome)" is now set to a mode area 832, and "FAX (200 dpi)" is now set to a resolution area 834. Numerals 833, 835 and 836 denote sliders. A threshold of gradation is set by using the slider 833, contrast is set by using the slider 835, and brightness is set by using the slider 836. Numerals 837 and 838 denote buttons. When the button 837 is depressed, the set content is settled, and when the button 838 is depressed, the set content is cancelled.

FIG. 18 is a view showing an example of a resource file of the device driver information managed by the data processing apparatus according to the second embodiment of the present invention. For example, the resource file corresponds to the resource file of each device which is unitarily managed by a not-shown management server when initialization processing such as a PC power-up operation or the like is performed, or when a later-described icon is depressed. The resource file is acquired from the management server.

In FIG. 18, numeral 800 denotes acquirement information, and numeral 801 denotes a header segment which is composed of a driver name, version information and a comment.

Numeral 802 denotes a page setting information segment which is composed of resource offset information and page setting information (an original size, an output sheet size, a printing direction; a page layout, magnification, and a stamp). Here, for example, "A4", "A3", "B4" and the like are selectable as the original size and the output sheet size, "longitudinal", "lateral" and the like are selectable as the printing direction, "1 page/sheet", "2-in-1" and the like are selectable as the page layout, "100%", "141%" and the like are selectable as the magnification, and "secret", "confidential" and the like are selectable as the stamp.

Numeral 803 denotes a finish information segment which is composed of the resource offset information, a printing method, a binding direction and a sheet discharge method. Here, for example, "ordinary printing", "bookbinding printing", "two-face printing", "OHP printing" and the like are selectable as the printing method, "longitudinal", "lateral" and the like are selectable as the binding direction, and "sorting", "grouping", "rotation sorting" and the like are selectable as the sheet discharge method.

Numeral 804 denotes a sheet feed information segment which is composed of the resource offset information and various sheet feed setting information (a sheet feed method, and an OHP printing detail setting). Here, for example, "cassette 1", "manual feed" and the like are selectable as the sheet feed method, and "sheet feed port when OHP printing setting", "intermediate sheet designation", "sheet type" and the like are selectable as the OHP printing detail setting.

Numeral 805 denotes a device setting information segment which is composed of the resource offset information, sheet feed option information and sheet discharge option information (a sheet feed option, and a sheet discharge option). Here, for example, "sheet feed option device setting" is selectable as the sheet feed option information and "sheet discharge option device setting" is selectable as the sheet discharge option information.

Numeral 806 denotes a resource data segment in which inherent image information (image parts) including various icon image data for displaying the system structure of each device is stored. The updatable resource data which is stored in the resource data segment 806 is used when the system structure status screens shown in FIGS. 5, 11 and 33 (later described), the screens shown in FIGS. 12 to 14, and the like are displayed on the CRT 16.

Thus, for example, even if an option unit is connected with the multifunctional device on the network and thus the function of this device is expanded, it is possible to freely cope with such a situation by acquiring a latest resource file from the server, whereby a function-expanded virtual panel or button can be displayed (see the screens of FIGS. 12 to 14 and the like).

Figure 19:
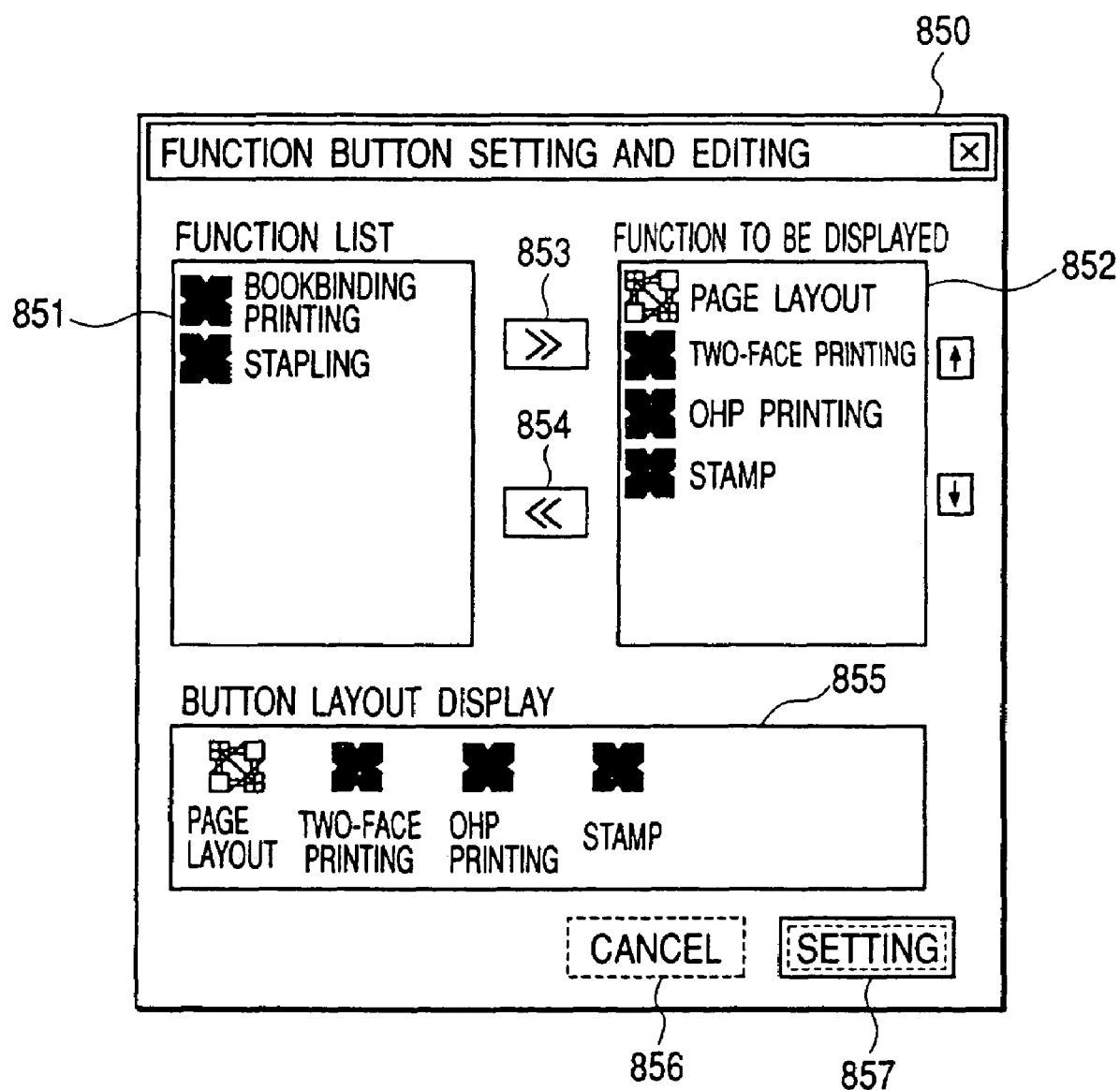
FIG. 19 is a view showing an example of a button editing screen displayed on the virtual operation panels shown in FIGS. 12 to 14.

FIG. 19 is a view showing an example of a button editing screen displayed on the virtual operation panels shown in FIGS. 12 to 14.

In FIG. 19, numeral 850 denotes an editing window. A button which is intended to be displayed is selected from a group of function buttons displayed on a function list area 851, and shift buttons 853 and 854 are operated to shift the selected button between the function list area 851 and a display function area 852, thereby editing the buttons to be displayed.

Numeral 855 denotes a button layout display area in which the buttons to be displayed in correspondence with the buttons B1 to B6 shown in FIG. 12 and the like are arranged in user's selected order (this order can be changed by using the mouse or the like). It is assumed that, when a not-shown editing button displayed on the virtual operation panel is depressed, an editing program is read from the HD 10, whereby the button editing screen is initiated (i.e., displayed).

Thus, after the buttons intended to be displayed are edited, the buttons to be displayed are cancelled or set by a button 856 or 857.

Hereinafter, a data processing procedure will be explained. The data processing procedure is executed by the CPU 2 shown in FIG. 2, on the basis of the program stored in the HD 10 or the like.

Initially, when display/non-display is designated by using the button 853 or 854 on the editing window 850, the selected button is shifted from the function list area 851 to the display function area 852, or from the area 852 to the area 851, and displayed.

Next, when the change of the button layout is instructed in the button layout display area 855 on the editing window 850, a layout of the buttons in the area 855 is changed and displayed according to the instruction.

Next, when the setting is instructed by using the button 857 on the editing window 850, the setting on the window 850 is acquired and stored as setting function button layout information in the HD 10 or the like shown in FIG. 2, and the editing window 850 is closed.

When the cancel is instructed by using the button 856 on the editing window 850, the setting on the window 850 is cancelled, and the editing window 850 is closed.

By the above processing, the function buttons (B1 to B8 of FIGS. 12 to 14) on the virtual operation panel can be edited (i.e., the arrangement order and display can be set) by using the editing window 850 shown in FIG. 19, thereby further increasing function setting operability.

[Third Embodiment]

In the first and second embodiments, a desired function is executed by a drag and drop operation of virtually displayed icons of a scanner and a printer in combination or a scanner and a multifunctional device in combination. A management server on the network may manage a log of such the combination function or a log of each device to manage a residual resource quantity of each printer. When the PC on the network requests a log or executes a function, the management server acquires the log information and displays an indication on whether the set function can be executed or allows the log information of each device to be effectively used. The third embodiment will be explained hereinafter.

Figure 20:
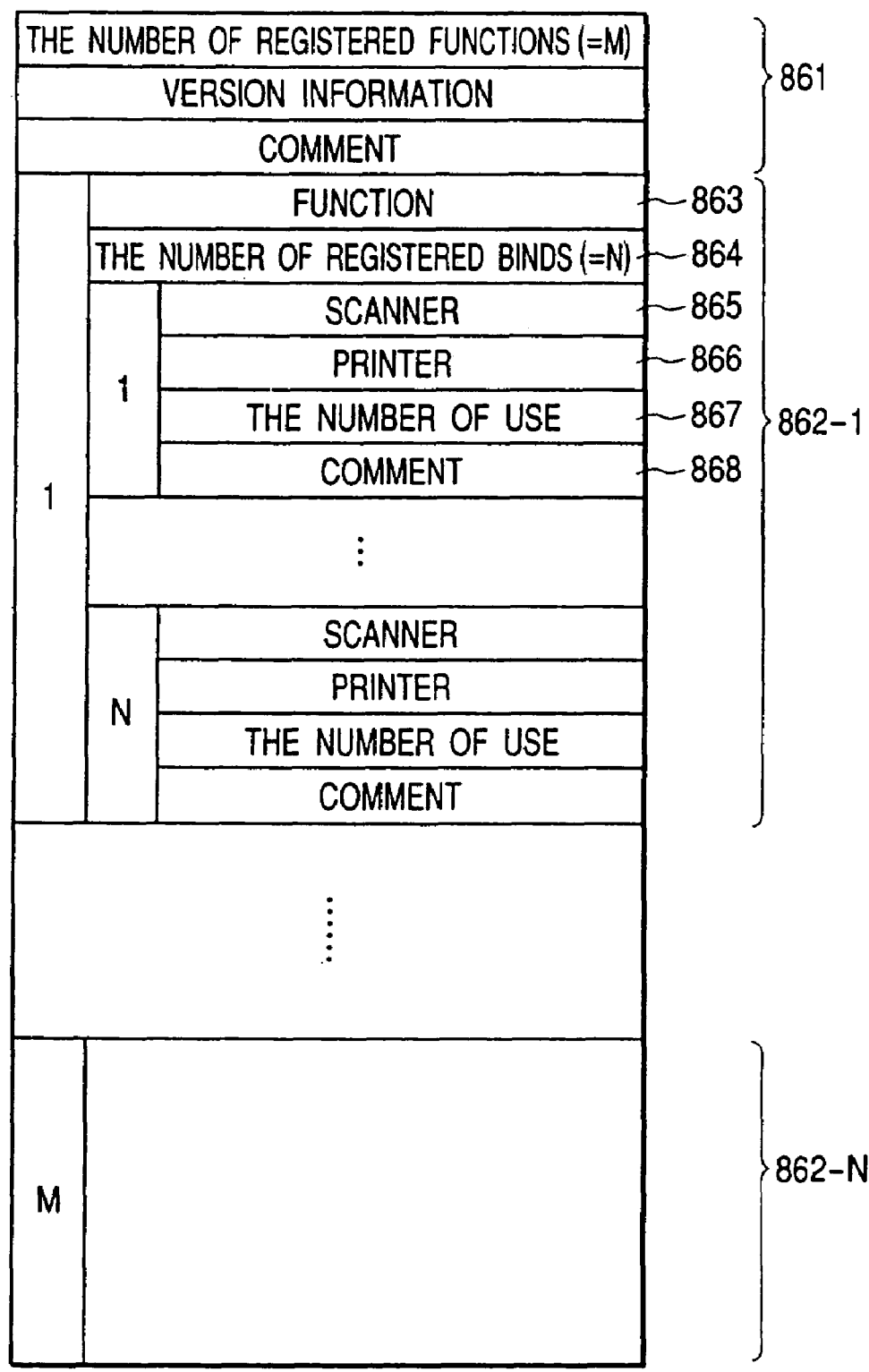
FIG. 20 is a view showing an example of log information managed by a data processing apparatus according to the third embodiment of the present invention.

FIG. 20 is a view showing an example of the log information managed by the data processing apparatus according to the third embodiment of the present invention. One of the PC's on the network shown in FIG. 1 is registered as the management server. The management server manages the function log information.

In FIG. 20, numeral 860 represents function log information which is composed of a header segment 861 and function log information segments 862-1 to 862-N.

The header segment 861 stores the total number of registered executable functions of each type (each function) realized by combining operable devices in the network environment managed by the management server. In the example shown in FIG. 20, M combination functions are presently registered by the management server in the network environment. A copy function executable by a combination of a scanner and a printer is being registered as one of M combination functions. When one of PC's on the network designates a combination of devices and if the combination function executable by the designated combination is a new combination function different from the combination functions presently registered in the management server, this information is notified from PC to the management server which in turn updates the number of registered functions to M+1.

The function log information segments 862 manage the detailed information of each combination function (862-1 to 862-N) of M combination functions.

Numeral 863 denotes identification information of a function usable by a network device, such as a copy function. Numeral 864 denotes a registration bind number N which is counted each time the function is executed. Numeral 865 denotes a device ID corresponding to an icon (in this example, scanner) to be subjected to a drag and drop operation for the network. Numeral 866 denotes a device ID corresponding to an icon (in this example, printer) to be subjected to a drag and drop operation for the network.

Numeral 867 denotes the number of use frequencies representative of the cumulative number of copy operations using the same combination. Numeral 868 denotes a comment.

The function log information segment 862-1 shows the detailed information of one combination function of the M registered combination functions. In the example shown in FIG. 20, the copy function is registered as one combination function of the M registered combination functions. N candidates of combinations of devices capable of executing the copy function are registered (i.e., N combination patterns of devices capable of executing the copy function are presently registered). One combination candidate of the N combination candidates is a combination pattern of the scanner 865 and printer 866 (these scanner and printer are in the network environment managed by the management server). The number of use frequencies of the combination (scanner 865 and printer 866) in the system managed by the management server is stored as the cumulative number 867 of use frequencies. This cumulative number of use frequencies is managed for each combination candidate of the N combination candidates capable of executing the copy function.

When a user of PC on the network starts executing the function through a drag and drop operation for the icons, the function log information is notified to the management server which in turn stacks this information on a hard disk.

In the example shown in FIG. 20, one of a plurality of PC's in the network environment designates a combination of the scanner 865 and printer 866. Each time the copy function realized by this combination is executed, this execution is notified from PC designated the combination to the management server. Upon reception of this notice, the management server counts up the cumulative number 867 of use frequencies of the combination.

Each of the other combination functions among the M functions is managed for each function by the management method similar to that described above.

In the present embodiment, the function log information (including the information shown in FIG. 20 and management information shown in FIGS. 21 to 25 to be described later, and the like) managed by the management server is read in response to an acquire request of the management information from a user (PC) on the network, and transferred to the requesting PC. The management information is displayed directly on CRT of the requesting PC or is processed and displayed in a list form or in a graph form (this will be later described with reference to FIGS. 48A and 48B and the like). It is obvious that the management information managed by the management server can be displayed on a display unit (e.g., CRT 16) of the management server.

FIG. 21 is a view showing an example of the log information managed by the data processing apparatus according to the third embodiment of the present invention. In the present embodiment, either of PC's on the network shown in FIG. 1 is registered as the management server, and the registered management server manages the device log information.

In FIG. 21, numeral 870 denotes printer log management information which is composed of a header segment 871 and printer log information segments 872-1 to 872-M. It should be noted that symbol M denotes the number of discriminating printers on the network.

Numeral 873 denotes a segment which corresponds to a printer name. In the segment 873, the printer name determined based on the device driver information is automatically set. Numeral 874 denotes a segment which corresponds to the number of logs. In the segment 874, the value N1 which is obtained by accumulatively counting the number of logs in the printer is set. Numeral 875 denotes a segment which corresponds to a comment. Numerals 876-1 to 876-N denote segments which correspond to log detail information. In the segments 876-1 to 876-N, input information (an application name or the like), the number of total printing pages, a preset sheet size, a longitudinal size of non-preset sheet, a lateral size of non-preset sheet, color printing/monochrome printing, one face/two faces, a toner use quantity, and the like are set. The toner use quantity is set based on toner use quantity information notified by the printer every time a printing job by the printer ends. Each log information is occasionally updated and managed in the HD of the management server.

Therefore, every time each printer on the network executes the job, latest log information is updated. Thus, when the printer function or the copying function is executed on the PC of the network, the log information might be used as judgment information to judge whether or not the set job can be executed with the current toner quantity. Therefore, when a command to demand the printer log management information is received from the PC on the network (e.g., when the user's operation to drag and drop the scanner icon to the printer icon to execute the copying function is issued as the key to the management server), the management server notifies the printer log management information managed based on ID (the printer name) of the designated icon, to the PC of the demand sender.

FIGS. 22, 23, 24 and 25 are views showing examples of the log information managed by the data processing apparatus according to the third embodiment of the present invention. In the present embodiment, either of PC's on the network shown in FIG. 1 is registered as the management server, and the registered management server manages the log information for each job.

FIG. 22 shows job information which is managed when a FAX function job is executed and corresponds to log item information in a reception folder. Concretely, a sender, a FAX number, date, a reception result, a reception time, a reception page, error information, resolution, a compression system and the like are managed as the log information by the management server.

FIG. 23 shows job information which is managed when the FAX function job is executed and corresponds to log item information in a transmission-end folder. Concretely, a receiver, a FAX number, date, a transmission result, a transmission time, the number of trials, a document name, the number of receivers, a transmission page, error information, a belonging of a receiver, a comment, resolution, a compression system, a server reception time, a sender, a sender's PC and the like are managed as the log information by the management server.

FIG. 24 shows log information of the scanner on the network shown in FIG. 1. The log information which includes items of user name, scan start time, scan end time, the number of total scan pages, machine name, TWAIN driver name, sheet size, height of sheets, width of sheet, color/monochrome and the like is notified to the management server, when the job using the scanner is executed. Then the notified log information is managed on the HD of the management server and read from the HD according to the log information demand from the user of the PC on the network, and the read log information is displayed on a display apparatus of the PC or the management server of the demand sender.

FIG. 25 shows log information of the printer on the network shown in FIG. 1. The log information which includes items of user name, printing start time, printing end time, the number of total printing pages, machine name, printer driver name, application name, the number of designated prints, preset sheet size, non-preset sheet longitudinal size, non-preset sheet lateral size, color/monochrome, one face/two faces, toner use quantity and the like is notified to the management server, when the job using the printer is executed. Then the notified log information is managed on the HD of the management server and read from the HD according to the log information demand from the user of the PC on the network, and the read log information is displayed on a display apparatus of the PC or the management server of the demand sender.

The toner use quantity data detected or calculated at the printer side is set as the toner use quantity.

<Explanation of Data Processing Procedure>

Hereinafter, the data processing procedure in the data processing apparatus according to the fourth to tenth embodiments of the present invention will be explained. The processing of the later-described fourth to seventh embodiments is executed by the CPU 2 on the basis of a program stored in the HD 10 of FIG. 2 or a not-shown storage medium.

[Fourth Embodiment]

Figure 26:
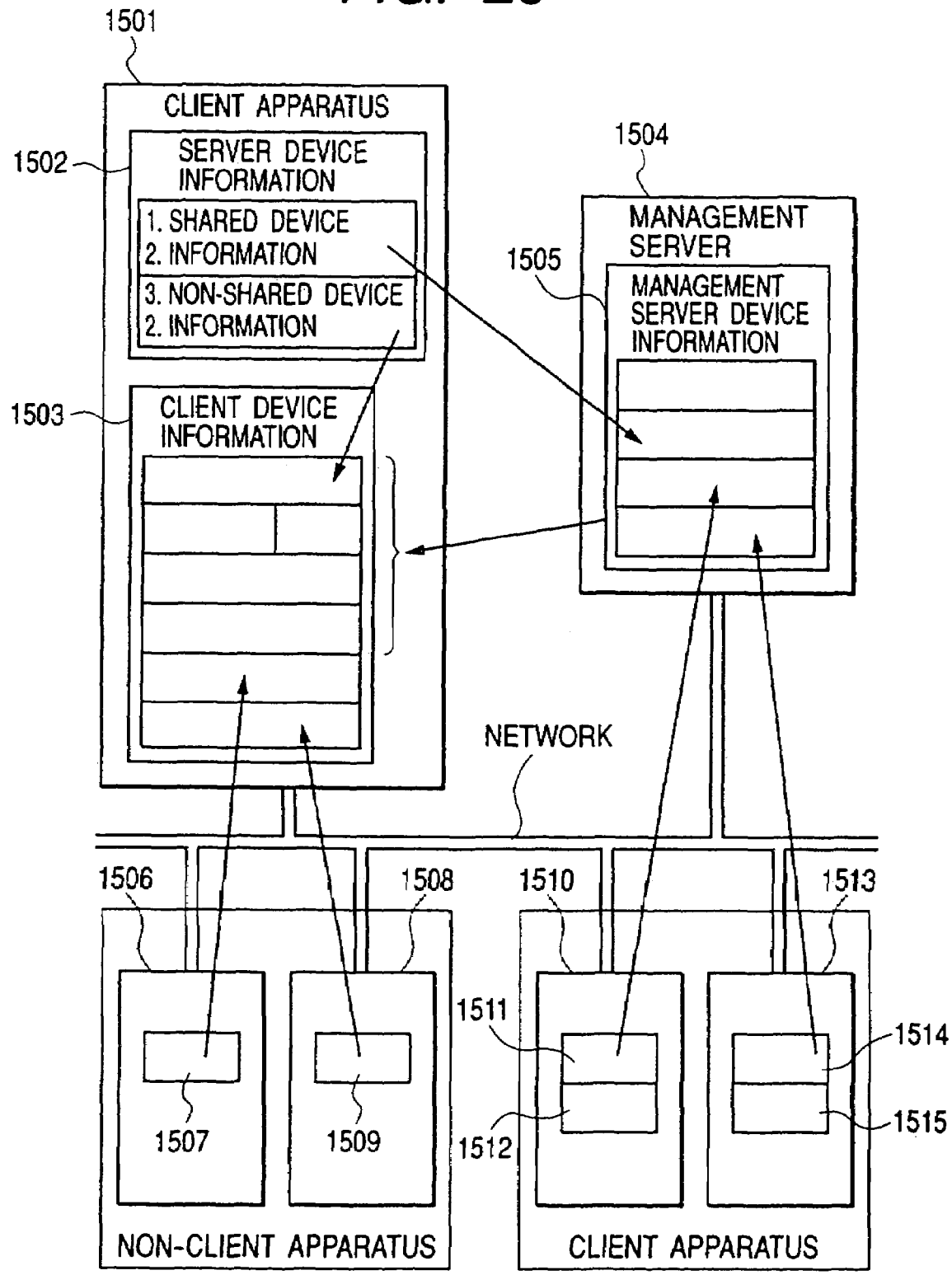
FIG. 26 is a view showing relation between a data processing apparatus registered as a management server and a client device, in the data processing apparatus according to the present invention.

FIG. 26 is a view showing relation between the data processing apparatus registered as the management server and a client device, in the data processing apparatus according to the present invention.

In FIG. 26, numerals 1501, 1510 and 1513 denote client apparatuses. Numerals 1502, 1511 and 1514 denote server device information (later-described FIG. 30), and numerals 1503, 1512 and 1515 denote client device information (later-described FIG. 31) which are all stored in the HD 10 of FIG. 2.

The server device information 1502 (1511, 1514) is composed of information (1. shared device; 2. information) of the devices shared on the network and information (3. non-shared device; 4. information) of the devices not shared on the network, acquired according to the device driver information installed in the user's own apparatus, and managed in a client program in the client apparatus 1501 (1510, 1513).

Numeral 1504 denotes a management server which stores and manages management server device information 1505 (later-described FIG. 27) in the HD 10 of FIG. 2. Numerals 1506 and 1508 denote non-client apparatuses in which a server program, a client program, programs represented by later-described flow charts, and the like are not installed. The non-client apparatuses 1506 and 1508 store device information 1507 and 1509, respectively.

The client device information 1503 (1512, 1515) is composed of the server device information, the device information of the client apparatus effective or available on the network, and the device information of the non-client apparatus, acquired by the management server and the non-client apparatus, and managed by the client program in the client apparatus 1501 (1510, 1513).

FIG. 27 is a view for explaining the management server device information 1505 shown in FIG. 26.

As shown in FIG. 27, the management server device information 1505 is composed of header information 1601, an index table 1602, and device information (client PC device information data) 1603-1 to 1603-N of the client apparatuses effective or available on the network.

Each of elements [0] to [N−1] in the index table 1602 is composed of a data offset, a data size and a flag. The elements [0] to [N−1] correspond to the device information 1603-1 to 1603-N, respectively.

Further, each of the device information (client PC device information data) 1603-1 to 1603-N of the client apparatuses is composed of PC information 1604 (later-described in FIG. 28A), printer information 1605 (later-described in FIG. 28B), scanner information 1606 (later-described in FIG. 29A), and FAX board information 1607 (later-described in FIG. 29B).

Further, the device information 1603-1 to 1603-N of the client apparatuses correspond to the information (1. shared device; 2. information) of the device shared on the network which is acquired from the server device information 1502, 1511 and 1514 shown in FIG. 26.

FIG. 28A is a view for explaining in detail the PC information 1604 shown in FIG. 27, and FIG. 28B is a view for explaining in detail the printer information 1605 shown in FIG. 27.

The PC information 1604 is composed of information and content, as shown in FIG. 28A.

The printer information 1605 is composed of information, content and an acquirement method, as shown in FIG. 28B.

FIG. 29A is a view for explaining in detail the scanner information 1606 shown in FIG. 27, and FIG. 29B is a view for explaining in detail the FAX board information 1607 shown in FIG. 27.

The scanner information 1606 is composed of information, content and an acquirement method, as shown in FIG. 29A.

The FAX board information 1607 is composed of information, content and an acquirement method, as shown in FIG. 29B.

FIG. 30 is a view for explaining the server device information 1502, 1511, 1514 shown in FIG. 26. In FIG. 30, it should be noted that the same content as that in FIG. 27 is added with same explanation.

In FIG. 30, numeral 1701 denotes local device information (or local device information data) which represents the devices locally connected with the user's own apparatus. The structure of the local device information 1701 is the same as that of the device information 1603-1 to 1603-N of the client apparatus shown in FIG. 27.

As shown in FIG. 30, the server device information 1502 is composed of the header information 1601, the index table 1602 and the local device information 1701.

FIG. 31 is a view for explaining the client device information 1503 (1512, 1515) shown in FIG. 26. In FIG. 31, it should be noted that the same content as that in FIG. 27 is added with same explanation.

As shown in FIG. 31, the client device information 1503 is composed of the header information 1601, the index table 1602, the local device information 1701, the device information (client PC device information data) 1603-1 to 1603-N-1 of the client apparatuses effective or available on the network, the device information 1507 of the non-client apparatus 1506, and the device information 1509 of the non-client apparatus 1508.

The structure of the printer information in each of the device information 1507 and 1509 of the non-client apparatuses 1506 and 1508 is the same of that of the printer information 1605 shown in FIG. 28B. As the printer information, only a shared name and a server name are set.

Figure 32:
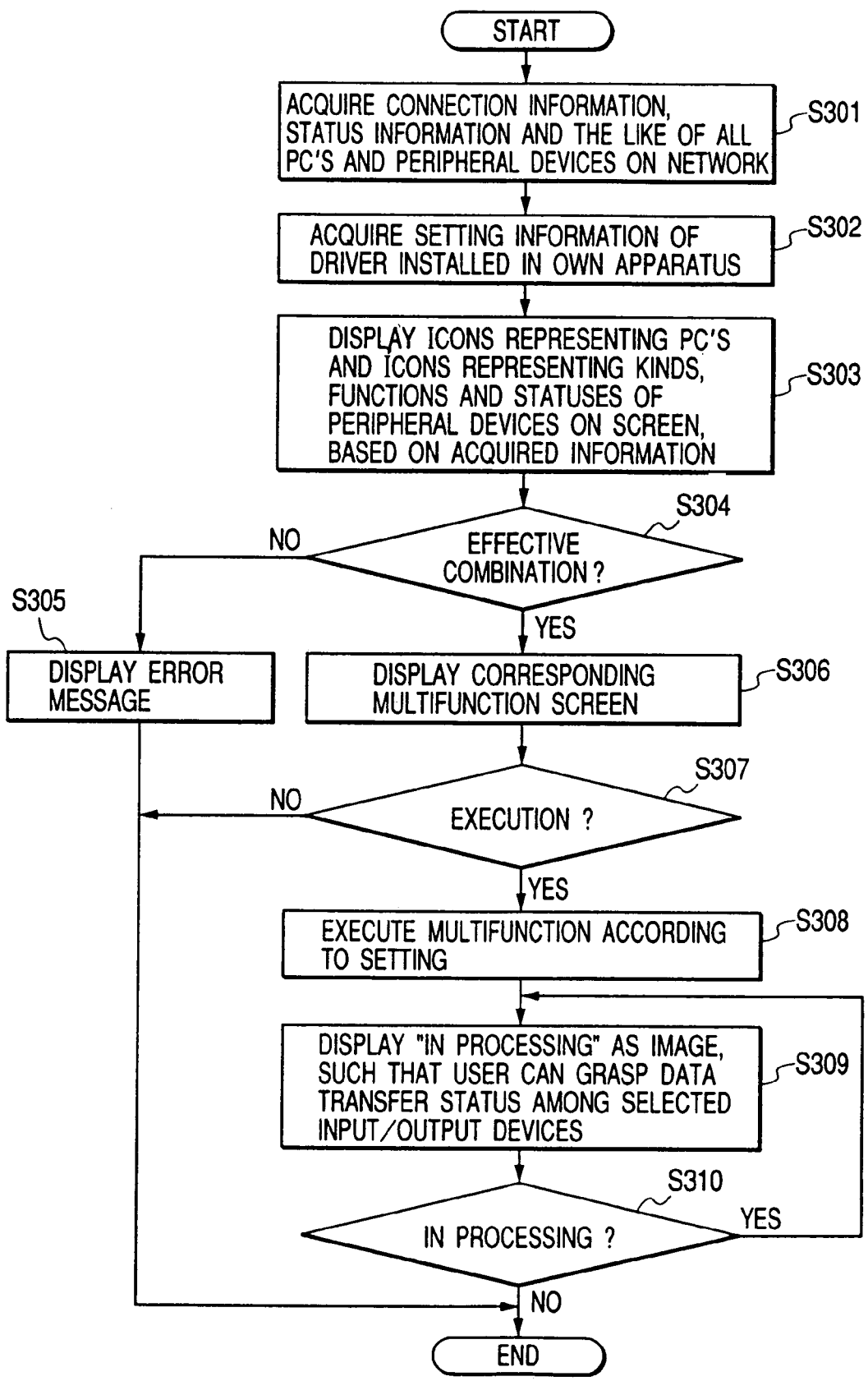
FIG. 32 is a flow chart showing an example of a second data processing procedure in the data processing apparatus according to the present invention.

FIG. 32 is a flow chart showing an example of a second data processing procedure in the data processing apparatus according to the present invention. The second data processing procedure corresponds to a combination function processing procedure according to a system structure display processing.

First, in a step S301, the domain information to which the user's own apparatus belongs is acquired, the address of the management server (either of PC's on the network shown in FIG. 1 is registered as the management server), and the connection information of all the PC's and the peripheral devices of FIG. 1 shared on the network and use conditions and status information of these devices are acquired from the management server. At this time, also the device information (the management server device information 1505 shown in FIG. 26) which has been installed in other PC (i.e., managed by the management server) is acquired. The acquired information is stored and managed in the PMEM 3 shown in FIG. 2. Next, in a step S302, the device information (the server device information of FIG. 30, the information of FIG. 10 or the like) which has been installed (managed) in the user's own apparatus is checked (acquired). At this time, the device information acquired from the management server is compared with the device information installed in the user's own apparatus to specify the device of which driver information is not installed in the user's own apparatus.

The management server always monitors the connection information of all the PC's and the peripheral devices of FIG. 1 shared on the network and the use conditions and status information of these devices. Thus, when status of the PC or the peripheral device on the network changes, the management server notifies latest system information (the connection status, the user condition and the status of each device on the network) to each client through the LAN's 100, 120 and the like.

In a step S303, the PC's and the peripheral devices are displayed on the basis of the acquired information. Namely, a system structure status screen for simultaneously displaying the system structure and the system status shown in FIG. 11 is displayed based on the client device information shown in FIG. 31. At this time, each peripheral device is represented by a device name and an inherent icon (i.e., a icon highly close to the actual appearance of the device body to be connected (the icon representing the function including monochrome/color information)) specified by the device name, on the basis of the acquired information and the resource data of the resource data segment 806 of FIG. 18 stored in the HD 10. Such the icon is displayed on the CRT 16 together with the connection status and the operation status (including the number of currently spooled jobs, and visual or numerical information representing a unusable status). Also, at this time, the icon which corresponds to the device not installed in the user's own apparatus is displayed in gray.

Next, in a step S304, when execution of each function is instructed, it is judged whether or not such an instruction is effective. For example, on the screen shown in FIG. 11, the scanner icon 303c is dragged to and dropped on the digital copying machine icon 303f by using the mouse to execute the copying function.

If judged that the combination is not effective (e.g., a combination of the scanner and the scanner, a combination of the printer and the printer, or the like), the flow advances to a step S305 to display the error message as shown in FIG. 8.

Conversely, if judged in the step S304 that the combination is effective (e.g., a combination of the scanner and the printer, a combination of the scanner and the copying machine, a combination of the scanner and the PC, a combination of the scanner and the FAX unit, a combination of the PC and the printer, a combination of the PC and the PC, a combination of the FAX unit and the FAX unit, or the like), the flow advances to a step S306 to display a corresponding-function window such that the function executable by combining the devices can be set as well as the function executable by each device. In the present embodiment, the virtual operation panels shown in FIGS. 12 to 14 are displayed.

Next, it is judged in a step S307 whether or not the copying is to be performed. When it is instructed to stop the copying, the processing ends. Conversely, when the button 415 on the virtual operation panels shown in FIGS. 12 to 14 is depressed to instruct the copying, the flow advances to a step S308 to perform the copying according to the setting. When the processing is performed, the function window is closed, and the displayed content returns to the system structure status screen for simultaneously displaying the system structure and the system status shown in FIG. 11.

Next, in a step S309, the status that the processing is being performed (the copying processing is being performed in this case) is image-displayed on the screen for simultaneously displaying the system structure and the system status shown in FIG. 11. The display continues until the processing ends (step S310) (see later-described FIG. 33), and the processing ends.

Figure 33:
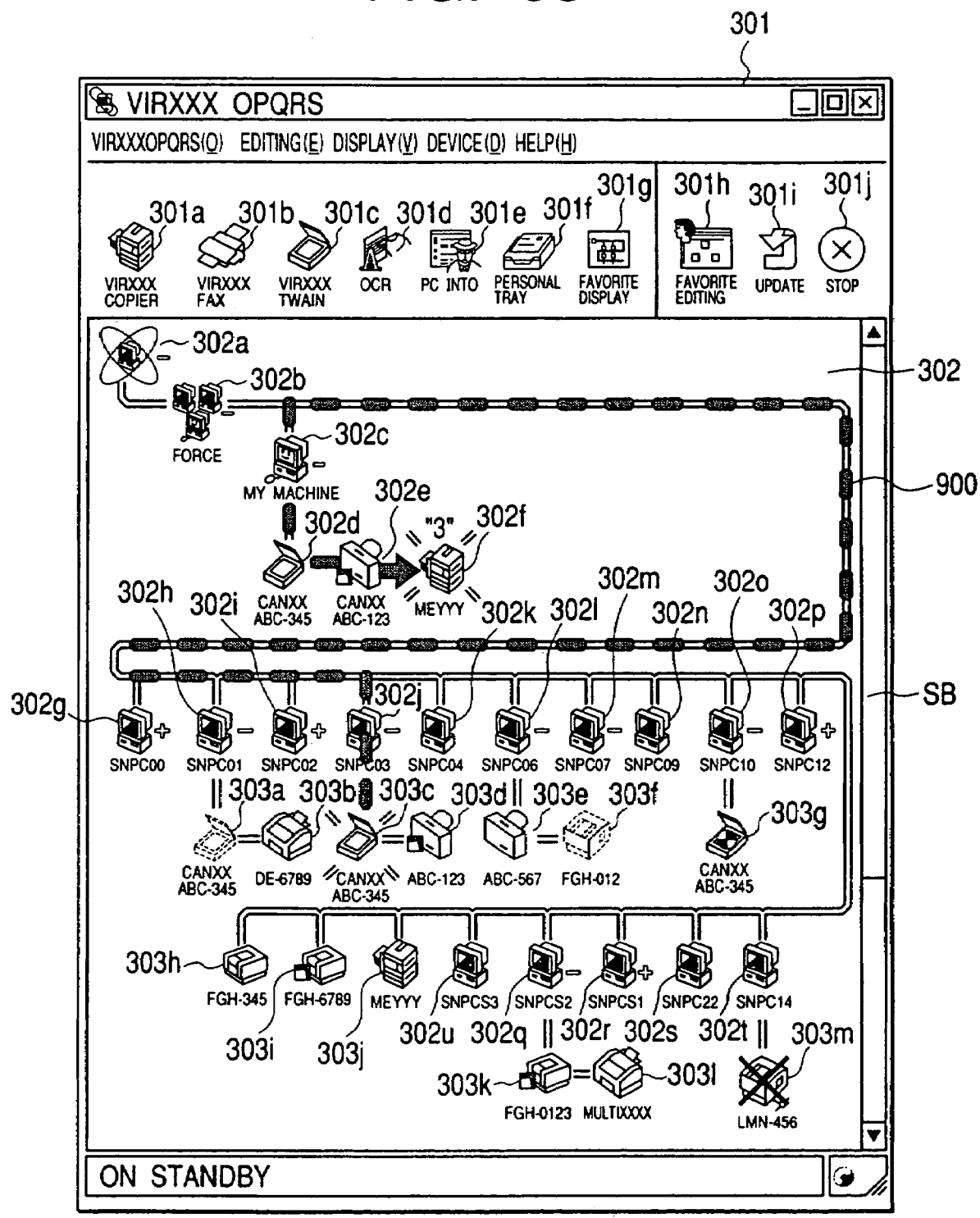
FIG. 33 is a view showing an example of a copying function execution screen of a data processing apparatus according to the fourth embodiment of the present invention.

FIG. 33 is a view showing an example of a copying function execution screen of the data processing apparatus according to the fourth embodiment of the present invention. It should be noted that the same parts as those in FIG. 11 are added with same numerals and symbols, respectively.

In FIG. 33, numeral 900 denotes function in-execution (i.e., function is being executed) display which represents that the image read by the scanner of the icon 303c is being printed now by the printer of the icon 302f, by displaying the icons 303c and 302f in a manner different from other icons and further displaying as an image a network path with an arrow of fat chain line. When the scanner icon 303c is dragged and dropped on the digital copying machine icon 302f by using the mouse on the operation screens shown in FIGS. 12 to 14 to instruct the copying function execution, the function in-execution display 900 continues until the copying processing ends.

By the above processing, the device on the network is displayed with the icon highly close to the actual appearance of the device body, the icon representing the function including monochrome/color information, and the number of currently spooled jobs, whereby it is possible to easily select the optimum device on the network. Besides, after the processing execution for the selected device is instructed, the status that the processing is being performed is displayed as the image such that the user can grasp the data transfer status among the selected input and output devices on the network, whereby it is possible to visually confirm the used input and output devices and processing end timing.

As described above, in the present embodiment, the data processing apparatus which can perform the data communication with the various peripheral devices (the printer, the FAX machine, the digital copying machine, the scanner, the digital camera, the modem, etc.) including the PC's connected on the data communication paths such as the LAN's 100 and 120 shown in FIG. 1 is provided. The data processing apparatus acquires, e.g., the device driver information of FIG. 10, the device information of FIG. 26, the status information of each peripheral device, the connection information of the peripheral devices, the use condition of the peripheral device, the resource data of FIG. 18 and the like, through the management server or directly from the various peripheral devices by the communication with them. Then, on the basis of the acquired information, the information managed in the user's own apparatus, and the like, the data processing apparatus displays together with the data communication path the image on one screen (e.g., screen of FIG. 5, 11 or 33) of the CRT 16, such that the user can confirm as the visible image whether the device having what function exists on the system (i.e., the kind of device), by which maker the device was manufactured (in case where there are plural makers), and how the device is connected and disposed on the communication path. Besides, the data processing apparatus displays on the screen of the CRT 16 the icons which were classified for the function of the devices actually connected to the path. On the screen, the shape of the visible image of the icon represents the actual appearance of the device. Further, the data processing apparatus determines arrangement or layout of the image of the communication path and the respective icons on the screen according to the actual connection status of them, and disposes and displays the path and the icons on the screen such that the user can visually confirm the connection status of the devices and the data communication path. In this case, the arrangement status of the image representing the communication path and the icons is made near to the actual system as much as possible. For example, in the actual system, when one printer is connected with the communication path through the scanner and the PC, the status that the scanner icon and the PC icons are interposed between the image of the communication path and the printer icon is displayed on the screen of the CRT 16. Further, for example, in the actual system, when one printer is directly connected with the communication path without using the device such as the PC, the status that any device icon is not interposed between the image of the communication path and the printer icon (i.e., the communication path image and the printer icon are directly connected with each other) is displayed on the screen of the CRT 16 (see the screen shown in FIG. 11). Thus, the user can confirm as the visible image on the screen shown in FIG. 11 or the like whether the device having what function (type) is connected with the communication path, whether or not the device is connected with the path through other device, what other device interposed is in case of connecting the device with the path through other device, and the like.

The shape of the icon classified for each function is made different from that for other function. Besides, the displayed icon shape is made different for each maker and each kind of device even if the plural kinds of devices have an identical function. Further, on the screen, the operation status that, e.g., three jobs are spooled now is displayed nearby the icon, the status that the color mark or the like is added to the corresponding to the icon is displayed when the device can cope with color processing. Further, when the device connected with the communication path and existing on the system is shared on the network but does not have any installed driver software, the icon of the corresponding device is displayed in gray on the screen so as to make the displaying status of the icon of the corresponding device different from other icons. In this case, before the screen is displayed, it is judged in the data processing apparatus whether or not driver software has been installed in each of the plural devices shared on the network. When the device in which the driver software is not installed exists, such the device is specified. Further, when the device in which the driver software has been installed but which can not be selected (used) due to some troubles (e.g., no sheet, no toner, breakdown, etc.) exists, the impossibility mark or the like is added on the icon of the corresponding device and such the status is displayed (see FIG. 11).

When the user performs the drag-and-drop operation of the icon on the system structure status screen of FIG. 5 or 11 displayed on the CRT 16 by using the cursor or the like, an arbitrary combination of the icons classified for the respective functions is instructed or designated. Thus the data processing apparatus judges whether or not the combination of the dragged-icon device and the dropped-icon device is appropriate (i.e., effective or available). When the data processing apparatus judges that such the combination is not appropriate, the apparatus notifies the user of such a judged result and demands to again perform the instruction operation. Conversely, when the data processing apparatus judges that such the combination is appropriate, the screen shown in FIG. 5 or 11 is changed to the operation screen (e.g., the screen shown in FIGS. 12, 13 or 14) which displays at least the button capable of selecting the function (including the expanded function) executable by each device and the function obtained by combining these executable functions. Then, when the output is instructed on this screen by the user (i.e., when the copying start button 415 is depressed), for example, the image is input from the scanner corresponding to the dragged icon, the input image is then transmitted to the printer corresponding to the icon on which the dragged icon is dropped, and the image formation based on the mode set on the setting screen is performed. On the basis of the output instruction by such the combined functions, while the processing is being actually performed by using the devices of the corresponding icons, the screen as shown in FIG. 33 is displayed on the CRT 16, and a specific emphasis pattern (e.g., a blinking flash pattern) is added to each of the indicated icons to emphasis it. Further, the displaying status of the indicated icon for each function is temporarily made different from the displaying status of other icons, and the communication path which is displayed on the screen and connects shortest the icons for the respective functions to which the network path is indicated is made different from other paths (see FIG. 33).

As explained above, the system structure is discriminated by the specific icon capable of being discriminated for each function and displayed together with its use condition (the screen of FIG. 5 or 11). Namely, one icon selected from the discriminated and displayed icons is overlaid on other icon for combination function (multifunctional) processing intended by the user, and display of the operation status of the devices indicated by the icons is changed to other display (see the screen in FIG. 33), whereby the connection status of the devices constituting the system can be displayed as the icons connected to the virtual network path. Thus, the user can visually confirm the running network structure and the connected peripheral devices as compared with the existing network structure without strangeness. Besides, the user can easily discriminate whether or not the user-selected input and output devices normally operate on the virtually displayed system, as compared with other non-selected icons. Thus, it is possible to highly improve operability of the data processing apparatus in case of selecting each peripheral device connected with the network and issuing intended input and output instructions.

Therefore, as the user visually confirms the entire system by using the icons for connecting the combination function (multifunctional) structure with the virtual network path, he can perform the function setting for combining the peripheral devices on the network by a simple icon instruction operation.

When the PC connected with the network is shut down, this PC notifies the management server of such shutdown. The management server judges whether or not there is other user who has selected the device connected to this PC. If there is the user who has selected the device connected to this PC or already started the processing by the device connected to this PC, a message "There is a user who has selected or uses the device connected to this computer. If you shut down this computer, the selection or use of such the device by that user is forcedly released or ended. Do you shut down this computer?" is transmitted to this PC. Thus, the shutdown of the PC from which the shutdown is demanded is temporarily reserved.

Thus, when the device connected to other PC has been selected, or when the processing by the device connected to other PC was already started, it is possible to prevent that, by the PC shutdown, the selection of such the device is released or the processing by such the device is forcedly ended. For example, in FIG. 33, even if the PC of the icon 302*j* connected with the scanner of the icon 303*c* notifies the management server of the shutdown through the network, the management server returns the above-described message to the PC of the icon 302*j* so as to cause this PC to temporarily reserve the shutdown at least until the current job ends.

[Fifth Embodiment]

Figure 34:
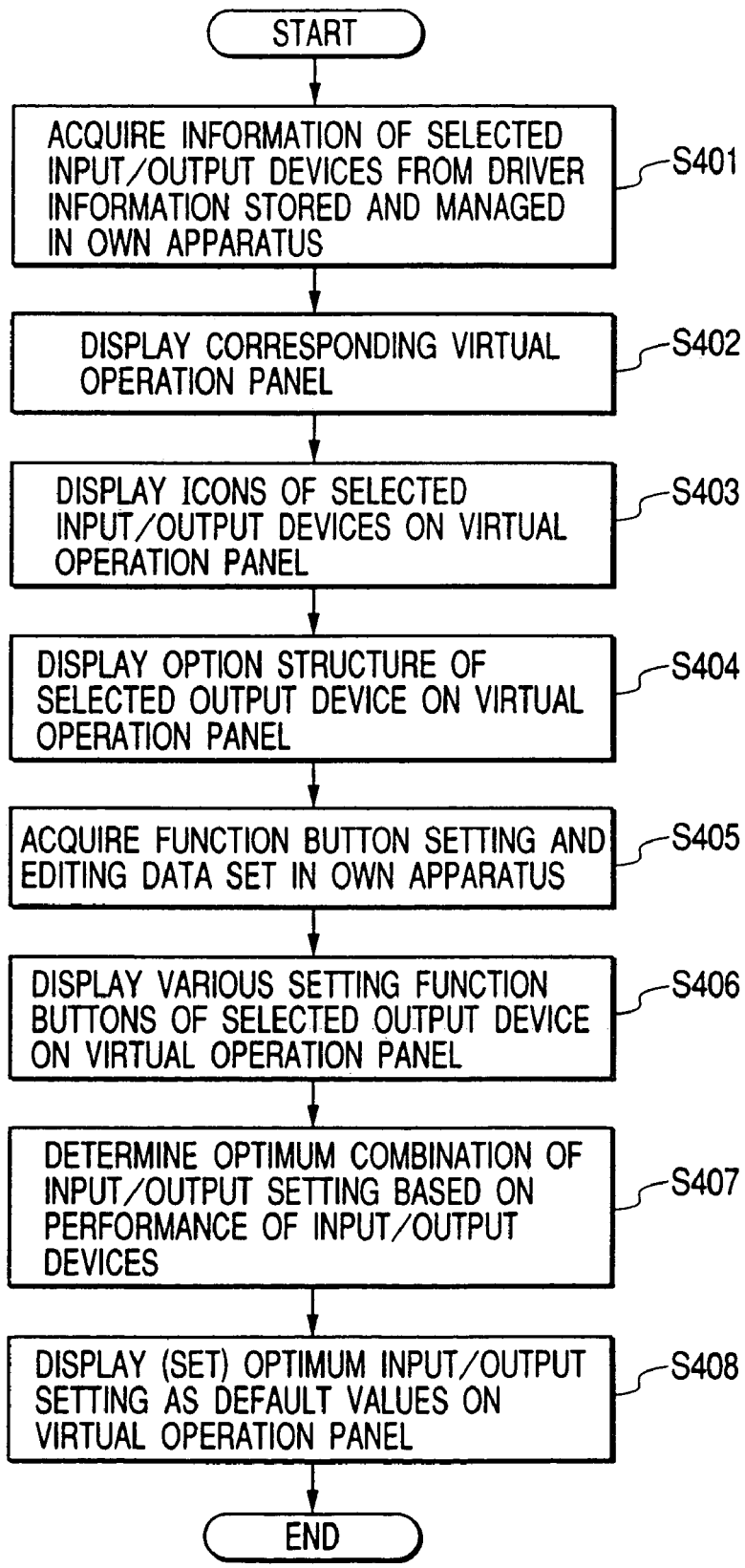
FIG. 34 is a flow chart showing an example of a third data processing procedure in the data processing apparatus according to the present invention.

FIG. 34 is a flow chart showing an example of a third data processing procedure in the data processing apparatus according to the present invention. The third data processing procedure corresponds to display processing procedure on the virtual operation panels shown in FIGS. 12 to 14. For example, when the scanner icon 303*c* is dragged and dropped on the digital copying machine icon 302*f* and thus the copying function is executed, the third data processing procedure is executed in the step S306 of FIG. 32.

First, in a step S401, the information of the selected input and output devices is acquired from the device driver information (e.g., the device driver information of FIG. 10) stored and managed in the user's own apparatus, the resource file of FIG. 18, and the like.

Concretely, on the basis of the device driver information of FIG. 10, the resource file of FIG. 18 and the like, the resource data (corresponding to the icons 403*a* and 404*a* respectively representing the input and output devices of FIGS. 12 to 14) of the inherent icons corresponding to the selected input and output devices (i.e., the icons (the icons representing the functions including monochrome and color information) extremely close to the appearances of the connected bodies) and the resource data (corresponding to the system image MFI of FIGS. 12 to 14) of the system image MFI (including each option device image) corresponding to the selected output device are acquired.

Next, the virtual operation panels shown in FIGS. 12 to 14 are displayed on the CRT 16 in a step S402, the icons 403*a* and 404*a* respectively representing the input and output devices corresponding to the selected input and output devices are displayed on the virtual operation panel in a step S403, and the system image MFI corresponding to the output device is displayed in a step S404. This system image MFI is the structure image which includes an expansion function capable of being set by the output device, i.e., the structure image of the output device which includes option devices (a finisher, a sorter, a paper deck, etc.) optionally installed in the output device. Here, in addition to the structure image concerning the output device, the structure image which includes an expansion function capable of being set by the input device, i.e., the structure image of the input device which includes an option device optionally installed in the input device (e.g., the ADF optionally installed in the scanner) may be displayed.

Next, in a step S405, the setting function button layout information which has been previously set on the editing window 850 of FIG. 19 and stored in the HD 10 or the like of FIG. 2 is acquired. Then, in a step S406, the selectable function buttons (the buttons B1 to B8 of FIGS. 12 to 14) are displayed on the virtual operation panel, on the basis of the setting function button layout information.

Next, in a step S407, on the basis of the input device performance and the output device performance, optimum input and output settings (monochrome/color, density, an image style (resolution), and a sheet size) is determined.

For example, when both the input and output devices can cope with color processing, the color is determined as the monochrome/color setting. Conversely, when either one of the input and output devices can cope with only monochrome processing, the monochrome is determined. Half the resolution of the resolution of the output device is determined as the resolution setting. The sheet size is determined based on, e.g., the image size and the sheet size capable of being managed by the selected scanner and printer (A4 size for both the input and output images in this case).

Next, in a step S408, the optimum input and output settings are displayed as default values on the virtual operation panel (the slider 409 for performing the density setting of FIGS. 12 to 14, the slider 410 for setting the image style, the color mode of the input image, and the sheet size are set and displayed in the area 406), and the processing ends. Although it is not displayed here (i.e., it is displayed according to the indications by the icons 403 and 404*a* of the input and output devices), the determine optimum input and output settings are set and displayed on the property screen 830 shown in FIG. 17.

By the above processing, since the icons highly close to the appearances of the bodies of the selected input and output devices and the function including the monochrome/color information and the like are displayed on the virtual operation panel, the user can visually recognize the kinds and functions of the selected input and output devices.

Further, since the optimum input and output settings of the selected input and output devices are displayed as default values, even the user who is unfamiliar with the input and output settings (the monochrome/color, the density, the image style (resolution), and the sheet size) can easily output the high-quality image suitable for the performances of the input and output devices.

Further, the user can perform the input and output settings in detail by using the detail setting screen (e.g., the property screen shown in FIG. 17) displayed according to the indications by the icons 403a and 404a respectively representing the input and output devices.

Further, since the system image which includes the option device installation status of the selected output device is displayed on the virtual operation panel, the user can visually recognize the option device installation statuses of the selected input and output devices. Thus, even the user who does not know the option device installation status of the selected output device can easily perform the option setting.

Further, since the function buttons (the buttons B1 to B8 of FIGS. 12 to 14) can be previously edited (i.e., arrangement order setting, and-display/non-display setting) on the editing window 850 of FIG. 19, thereby further improving operability for function setting.

Since the resource file and the resource data of the icon of each device shown in FIG. 18 are transmitted from the management server to each device through the network path every time the data is updated, the resource of the latest option can be always provided. Even if a new device (including an option device) is manufactured and added by a maker, it is possible by only installing the resource file into the management server, to display the icon (system image) corresponding to the new device (including the option device) on all client machines (PC's) on the network without performing complicated operations to install the resource file into all the client machines (PC's).

[Sixth Embodiment]

Figure 35:
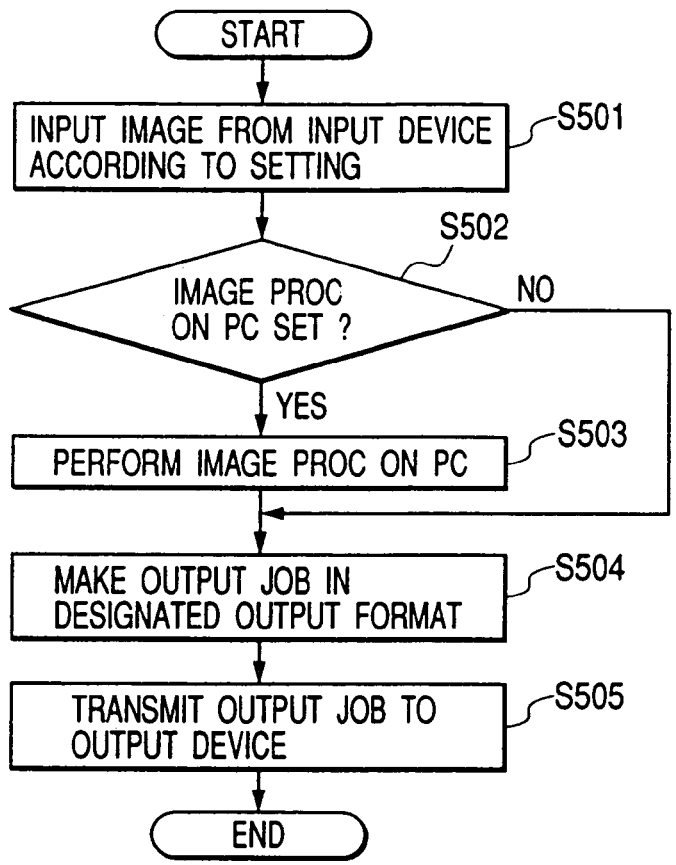
FIG. 35 is a flow chart showing an example of a fourth data processing procedure in the data processing apparatus according to the present invention.

FIG. 35 is a flow chart showing an example of a fourth data processing procedure in the data processing apparatus according to the present invention. The fourth data processing procedure corresponds to processing which is performed in the step S308 of FIG. 32, for example, when the scanner icon 303c is dragged and dropped on the digital copying machine icon 302f and thus the copying function is executed.

First, in a step S501, the image is input from the input device according to the setting on the virtual operation panels shown in FIGS. 12 to 14. In the present embodiment, the image is actually input from the scanner corresponding to the icon 303c.

Next, in a step S502, it is judged whether or not the image processing (i.e., two kinds of image processing (the effect processing and the stamp processing) called the amusement setting in the present embodiment) on the PC side has been set by the button B7 of FIGS. 12 to 14 and on the setting screen of FIGS. 15 and 16. If judged that the image processing on the PC side has been set, the flow advances to a step S503 to cause the PC to perform the image processing (the effect processing, the stamp processing, etc.) to the image input in the step S501 on the basis of the setting of FIGS. 15 and 16, and the flow advances to a step S504.

Conversely, if judged in the step S502 that the image processing on the PC side has been set by the button B7 of FIGS. 12 to 14 and on the setting screen of FIGS. 15 and 16, the flow advances to the step S504 as it is.

Next, in the step S504, an output job of output format (including processing page layout depending on the output device, two-face printing, stapling or the like) based on the input and output settings on the virtual operation panel is generated, and the generated output job is transmitted to the output device (the digital copying machine corresponding to the icon 302f in the present embodiment) in a step S505. In this case, the output job data (including the command to instruct the processing (the page layout, the two-face printing, the stapling, etc.) to be performed on the output device side) is transmitted together with the input image (or the image processed on the PC side when the image is processing on the PC side). Then the processing ends. It should be noted that the processing in the steps S502 to S505 is performed every time the data corresponding to output one page is input.

By the above processing, after the image input by using the input device is subjected to the image processing by the user on the basis of the application on the PC, the conventional complicated processing to output the processed image by using the function of the output device is unnecessary. Namely, after the input and output devices are selected by the drag and drop operations, the image subjected to the PC-side processing undependent on the output device in addition to the output-device-side image processing can be output from the output,device by simply setting the PC-side processing and the output-device-side processing on the virtual operation panel.

[Seventh Embodiment]

In the above embodiment, the case where the printing processing by the output device is performed based on the setting on the virtual operation panels shown in FIGS. 12 to 14 was explained. However, when the printing processing is performed, it is possible to acquire resource information (a sheet remaining quantity, a toner remaining quantity, a staple remaining quantity, etc.) of the output device to judge whether or not the printing processing can be performed, and notify the user of the judged result. Hereinafter, the seventh embodiment will be explained.

Figure 36:
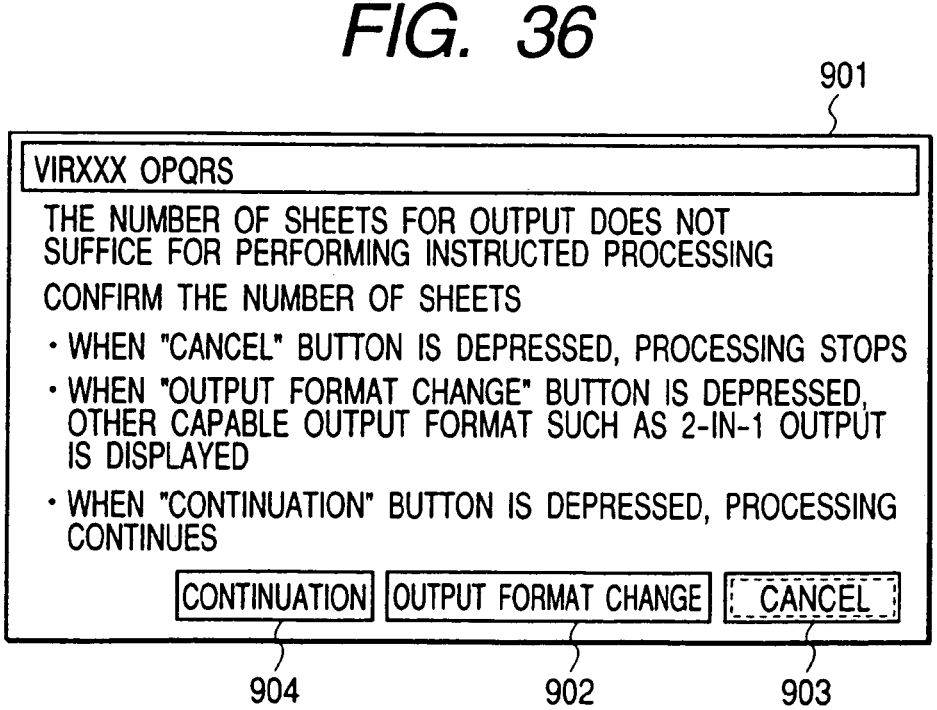
FIG. 36 is a view showing an example of a warning message displayed on the CRT shown in FIG. 2.

FIG. 36 is a view showing an example of a warning message displayed on the CRT 16 shown in FIG. 2. For example, in the case where the button 415 on the virtual operation panels of FIGS. 12 to 14 is depressed by the user to instruct the copying execution, when the number of sheets held in the output device is smaller than the number of sheets necessary for the instructed printing processing, the warning message is displayed before the printing processing is actually performed.

In FIG. 36, numeral 901 denotes the warning message. For example, in the case where the button 415 on the virtual operation panels of FIGS. 12 to 14 is depressed to instruct the copying execution, when it is anticipated that the number of sheets held in the output device is smaller than the number of sheets necessary for the instructed printing processing, the warning message 901 is displayed on the CRT 16 before the printing processing is actually performed.

Numeral 902 denotes a button. When the button 902 is depressed, the printing processing in the selected output format is stopped. Instead, a selection screen of other output format (i.e., a selection window of output format shown in later-described FIG. 37) which can output the image is displayed.

Numeral 903 denotes a cancel button. When the cancel button 903 is depressed, the printing processing is stopped, and the displayed content returns to the setting screen, e.g., the virtual operation panels shown in FIGS. 12 to 14.

Numeral 904 denotes a continuation button. When the continuation button 904 is depressed, the printing processing is continued (or forcedly performed).

Figure 37:
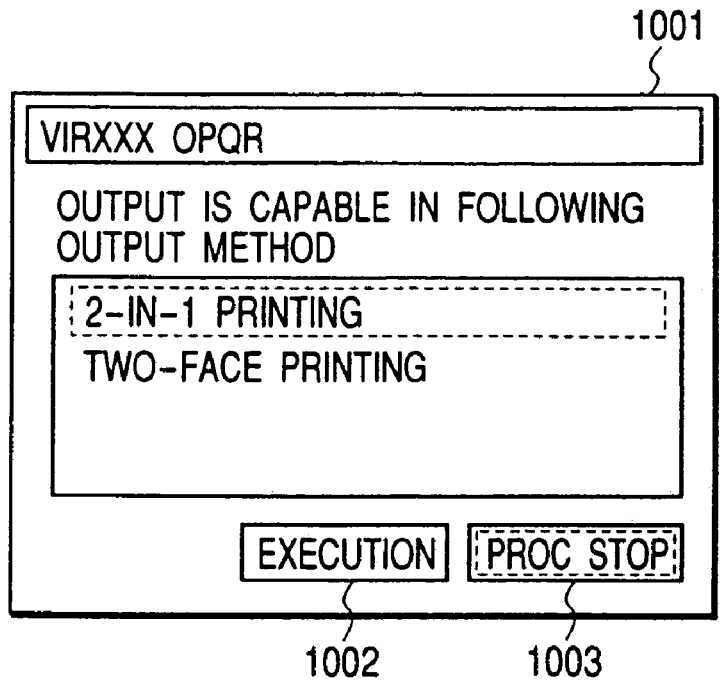
FIG. 37 is a view showing an example of an output format selection window displayed on the CRT shown in FIG. 2.

FIG. 37 is a view showing an example of an output format selection window displayed on the CRT 16 shown in FIG. 2.

In FIG. 37, numeral 1001 denotes the output format selection window which is displayed when the button 902 of FIG. 36 is depressed. In the window 1001, other output formats capable of performing image output (e.g., 2-in-1 printing, two-face printing, etc.) in the number of sheets held in the output device are listed and displayed in a selectable manner.

Numeral 1002 denotes an execution button. When the execution button 1002 is depressed, the printing processing is performed in the selected other output format. Numeral 1003 denotes a processing stop button. When the processing stop button 1003 is depressed, the displayed content returns to the setting screen, e.g., the virtual operation panels shown in FIGS. 12 to 14.

Figure 38:
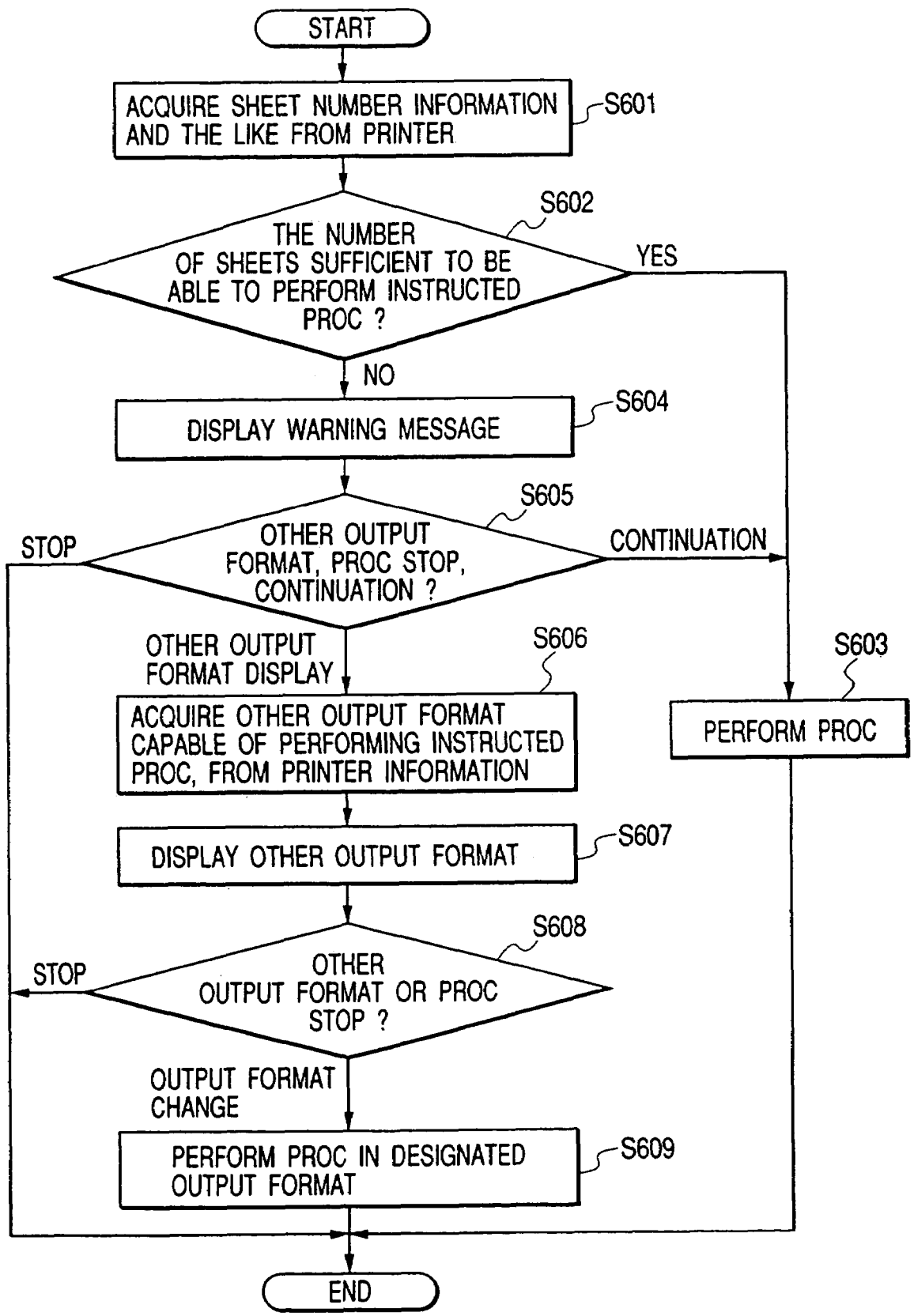
FIG. 38 is a flow chart showing an example of a fifth data processing procedure in the data processing apparatus according to the present invention.

FIG. 38 is a flow chart showing an example of a fifth data processing procedure in the data processing apparatus according to the present invention. The fifth data processing procedure is performed when the functions (the copying function, the printing function, etc.) to perform the printing processing by using the output device (i.e., the printer) is executed.

When it is judged that the printing processing is performed, sheet number information (representing the number of sheets) is acquired from the indicated printer in a step S601.

Next, in a step S602, it is judged based on the acquired sheet number information whether or not the number of sheets capable of performing the instructed (e.g., designated on the virtual operation panels of FIGS. 12 to 14) printing processing has been held in the printer (i.e., whether or not a processing condition is satisfied). If judged that the processing condition is satisfied, the flow advances to a step S603 to perform the printing processing.

Conversely, if judged in the step S602 that the number of sheets capable of performing the instructed (e.g., designated on the virtual operation panels of FIGS. 12 to 14) printing processing is not held in the printer (i.e., the processing condition is not satisfied), the flow advances to a step S604 to display the warning message 901 shown in FIG. 36.

Next, in a step S605, it is judged whether the user depresses the button 902 shown in FIG. 36 (i.e., instructs the display of other processible output format), depresses the cancel button 903 (i.e., instructs the printing processing stop), or depresses the continuation button 904 (i.e., instructs the continuation of the printing processing).

If judged that the user instructs the printing processing stop, the printing processing ends.

If judged in the step S605 that the user instructs the continuation of the printing processing, the flow advances to the step S603 to perform the printing processing.

Further, if judged in the step S605 that the user instructs the display of other processible output format, the flow advances to a step S606 to acquire other output format capable of performing the printing processing instructed from the virtual operation panel or the like, on the basis of printer information previously acquired from a printer driver, the sheet number information acquired in the step S601, and the like. Then, in a step S607, the output format selection window 1001 of FIG. 37 which shows other output format capable of performing the instructed printing processing is displayed.

Next, in a step S608, it is judged whether the user depresses the execution button 1002 shown in FIG. 37 (i.e., instructs the change of output format), or depresses the processing stop button 1003 (i.e., instructs the printing processing stop).

If judged that the user instructs the printing processing stop, the printing processing ends.

Conversely, if judged in the step S608 that the user instructs the change of output format, the flow advances to a step S609 to perform the printing processing in the instructed output format, i.e., the output format selected in the output format selection window 1001 of FIG. 37, and the processing ends.

By the above processing, when it is anticipated that the number of sheets becomes insufficient during the printing, the warning message is displayed. Thus, it is possible to prevent that the number of sheets becomes insufficient during the printing beforehand, whereby the user can refill the sheets to the output device before the actual processing is started.

In the present embodiment (especially the steps S601 and S602 of FIG. 38), the case where the sheet number information is acquired from the designated printer, and then it is judged based on the acquired sheet number information whether or not the sheets of which number is sufficient to perform the instructed printing processing have been held was explained. However, it is possible to acquire the sheet number information of the designated printer and the sheet number information used in the spooled job in the step S601 of FIG. 38, and to judge based on the acquired sheet number information whether or not the sheets of which number is sufficient to perform the instructed printing processing have been held in consideration of the sheet information used in the spooled job. In this case, a message "This sheet has been preserved for printing." can be additionally displayed.

Thus, it is possible to accurately anticipate that the sheets become insufficient during the printing processing, in consideration of the spooled job.

Further, it is possible to notify the user of other output format (e.g., the two-face printing, the 2-in-1 printing, or the like) capable of performing the printing processing designated by the user, and to perform the selection on the screen notified, whereby the complicated operation that the displayed content must return to the setting screen every time the output format is changed is unnecessary. Thus, even the user who is unfamiliar with the operation can easily change the output format to other output format. Besides, it is possible to perform the instructed printing processing (i.e., it is possible to perform substitute printing) without refilling sheets to the printer.

In the present embodiment, the case where, in case of performing the printing, the sheet remaining quantity in the output device is acquired and it is judged based on the acquired information whether or not the printing processing can be performed was explained. Besides, when stapling processing has been set to the designated printing processing, it is possible to acquire staple remaining information of the output device, judge based on the acquired information whether or not the printing processing can be performed, and notify the user of such a warning message as shown in FIG. 36 if the printing processing can not be performed.

Even in this case, the user can instruct the change of output format. Namely, in an output format selection window such as the window 1001 shown in FIG. 37, it is possible to select other output format (e.g., single-staple sort processing or non-staple sort processing by which the number of used staples can be reduced) capable of performing the instructed printing processing. Thus, the user can change the output format and perform the printing processing.

By the above processing, when it is anticipated that the number of staples becomes insufficient during the printing, the warning message is displayed., Thus, it is possible to prevent that the number of staples becomes insufficient during the printing beforehand, whereby the user can refill the staples to the output device before the actual processing is started.

Further, it is possible to notify the user of other output format (e.g., single-staple sort processing, two-face printing sort processing, 2-in-1 sort processing or non-staple sort processing by which the number of used staples can be reduced (i.e., by which stapling can be easily performed in later manual stapling)) capable of performing the staple-added printing processing, and to perform the selection on the screen notified, whereby the complicated operation that the displayed content must return to the setting screen every time the output format is changed is unnecessary. Thus, even the user who is unfamiliar with the operation can easily change the output format to other output format. Besides, it is possible to perform the instructed printing processing (i.e., it is possible to perform substitute processing) without refilling the staples to the printer.

Further, it is possible to acquire the staple information from the designated printer and the information of the staple used in the spooled job, and to judge based on the acquired staple information whether or not the staples of which number is sufficient to perform the instructed printing processing have been held in the printer, in consideration of the staples used in the spooled job.

Thus, it is possible to accurately anticipate that the staples become insufficient during the printing processing, in consideration of the spooled job.

[Eighth Embodiment]

In the above-seventh embodiment, the case where, in case of performing the printing, the resource information (i.e., the sheet remaining information, and the staple remaining information) or the like of the output device is acquired, it is judged based on the acquired information whether or not the printing processing can be performed, and the judged result is notified to the user was explained. Besides, in case of performing the printing, it is possible to acquire resource information (i.e., toner remaining information) or the like of the output device, judge based on the acquired information whether or not the printing processing can be performed, and notify the user of the judged result. Hereinafter, the eighth embodiment will be explained.

Figure 39:
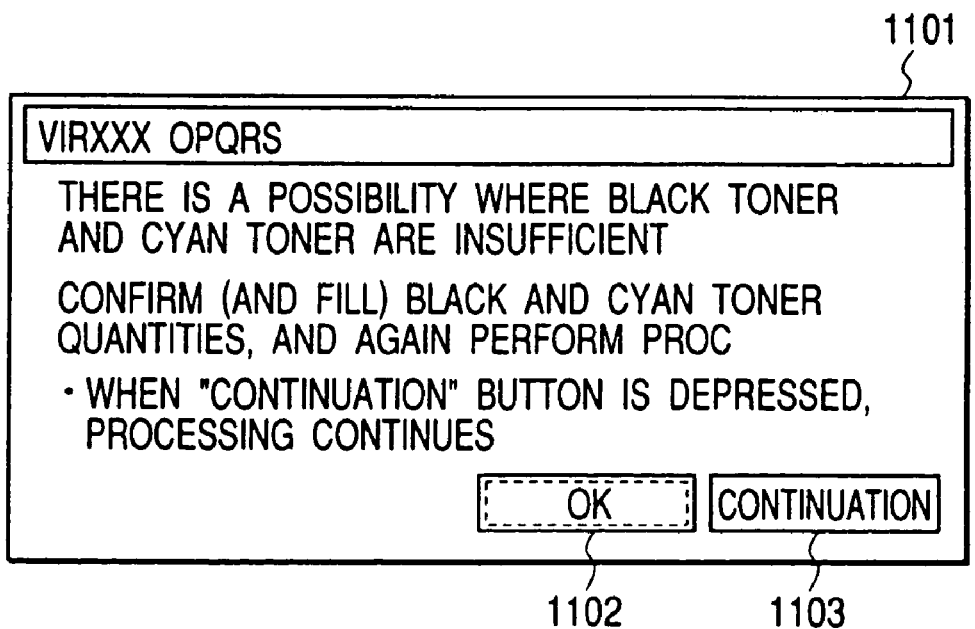
FIG. 39 is a view showing an example of the warning message displayed on the CRT shown in FIG. 2.

FIG. 39 is a view showing an example of the warning message displayed on the CRT 16 shown in FIG. 2. For example, in the case where the button 415 on the virtual operation panels of FIGS. 12 to 14 is depressed to instruct the copying execution, when the remaining quantity of the toner held in the output device is smaller than the toner quantity necessary for the instructed printing processing, the warning message is displayed before the printing processing is actually performed.

In FIG. 39, numeral 1101 denotes the warning message. For example, in the case where the button 415 on the virtual operation panels of FIGS. 12 to 14 is depressed to instruct the copying execution, when it is anticipated that the remaining quantity of the toner held in the output device is smaller than the toner quantity necessary for the instructed printing processing, the warning message 1101 is displayed before the printing processing is actually performed.

It should be noted that the warning message 1101 is displayed for the toners of all the colors to which insufficiency is anticipated. For example, when it is anticipated that black toner and cyan toner become insufficient, the message "There is a possibility where black toner and cyan toner are insufficient. "Confirm (and fill) black and cyan toner quantities, and again perform proc." is displayed.

Numeral 1102 denotes an OK button. When the OK button 1102 is depressed, the printing processing ends, and the displayed content returns to the setting screen, e.g., the virtual operation panels shown in FIGS. 12 to 14.

Numeral 1103 denotes a continuation button. When the continuation button 1103 is depressed, the printing processing is continued (or forcedly performed).

Figure 40:
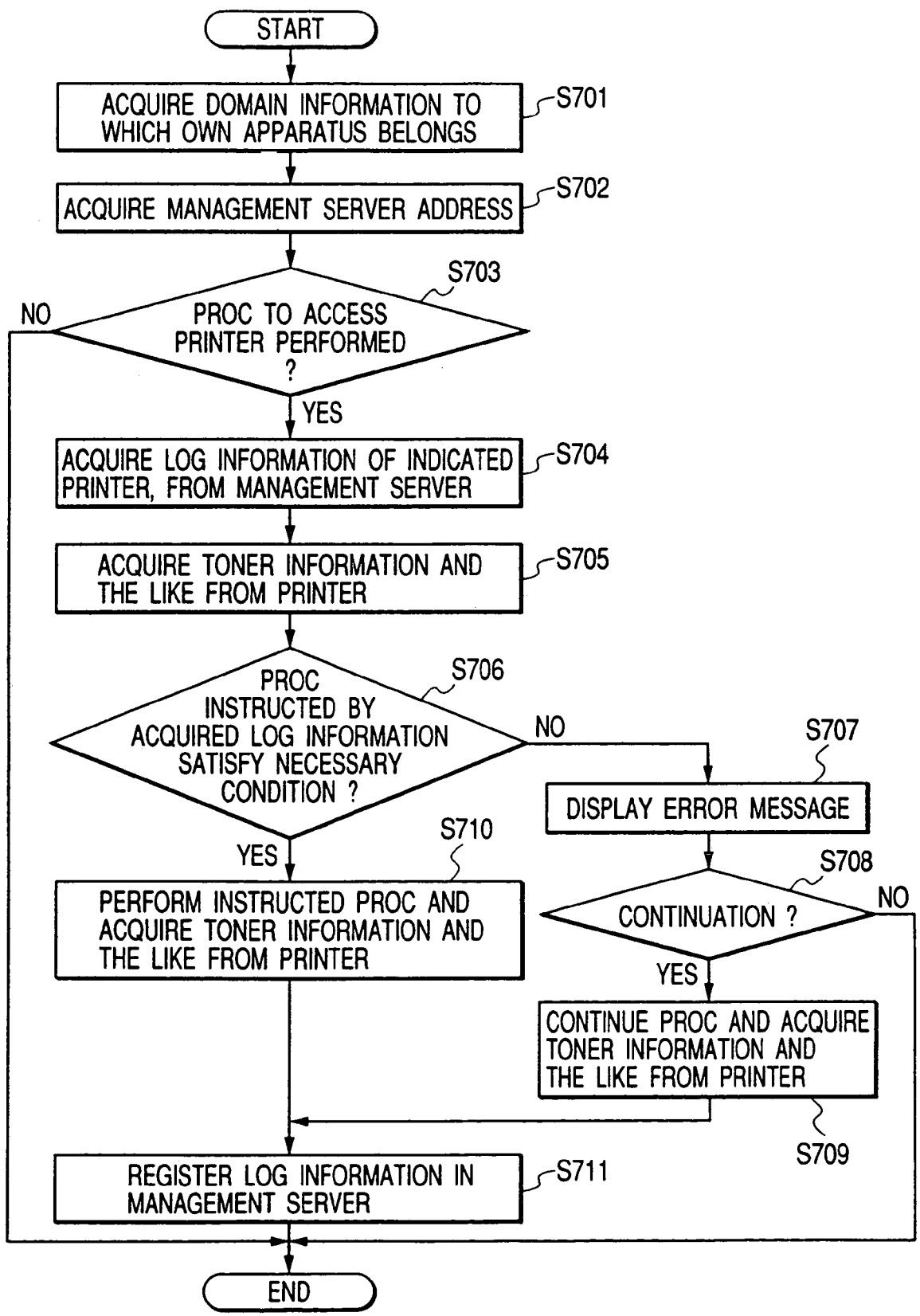
FIG. 40 is a flow chart showing an example of a sixth data processing procedure in the data processing apparatus according to the present invention.

FIG. 40 is a flow chart showing an example of a sixth data processing procedure in the data processing apparatus according to the present invention.

Initially, in a step S701, the domain information to which the user's own apparatus belongs is acquired. Next, in a step S702, the address of the management server (either of the PC's on the network shown in FIG. 1 is registered as the management server) is acquired.

Next, in a step S703, it is judged whether or not the processing (e.g., the copying processing, the printing processing or the like) to access the printer is performed. If judged that the processing to access the printer is not performed, the processing ends as it is.

Conversely, if judged in the step S703 that the processing to access the printer is performed, the flow advances to a step S704 to acquire the indicated printer log (either of the printer log information segments 872-1 to 872-M in the printer log management information shown in FIG. 21). Concretely, the information as to which printer the access is performed (i.e., the information as to the designated printer) is notified to the management server, and the management server returns to the client machine (PC) the printer log information segment (log information) of the corresponding printer selected from among the printer log information segments 872-1 to 872-M in the printer log management information shown in FIG. 21.

Next, in a step S705, the toner information (i.e., the toner remaining quantity) or the like is acquired from the designated printer.

Next, in a step S706, it is judged whether or not the instructed processing satisfies a necessary condition, on the basis of the log information acquired in the step S704 and the printer toner information acquired in the step S705. Concretely, the log information acquired from the management server is analyzed, the toner use quantity in case of performing processing same as the currently designated processing (i.e., the processing judged to be the same as the currently designated processing on the basis of a kind of application, a kind of scanner (high speed scanner, low speed scanner, color scanner, or monochrome scanner), the number of total printing pages, sheet size, color/monochrome, one face/two faces, etc.) is calculated (anticipated), and the anticipated toner user quantity is compared with the toner remaining quantity acquired from the printer, thereby judging whether or the not the instructed processing satisfies the necessary condition (i.e., judging whether or not the processing can be performed).

If judged in the step S706 that the instructed processing satisfies the necessary condition on the basis of the log information and the printer toner information, the flow advances to a step S710 to perform the instructed processing. Thus, the toner information is acquired from the printer, and the log information (printer name, input information, the number of total printing pages, sheet size, color/monochrome, one face/two faces, toner use quantity (for each color), etc.) is generated based on the acquired toner information.

Next, in a step S711, the generated toner information (printer name, input information, the number of total printing pages, sheet size, color/monochrome, one face/two faces, toner use quantity (for each color), etc.) is registered in the management server, and the processing ends.

Conversely, if judged in the step S706 that the instructed processing does not satisfy the necessary condition on the basis of the log information and the printer toner information, the flow advances to a step S707 to display the warning message shown in FIG. 39. Then, in a step S708, it is judged whether or not the processing is instructed to be continued as it is (i.e., it is judged whether or not the continuation button 1103 is depressed).

If judged in the step S708 that the processing is instructed to be continued as it is, the flow advances to a step S709 to continue the processing. Thus, the toner information is acquired from the printer, the log information (printer name, input information, the number of total printing pages, sheet size, color/monochrome, one face/two faces, toner use quantity (for each color), etc.) is generated based on the acquired toner information, and the flow then advances to the step S711.

Conversely, if judged in the step S708 that the processing is instructed not to be continued (i.e., judged that the OK button 1102 is depressed), the processing ends.

By the above processing, when it is anticipated that the toner becomes insufficient during the printing, the warning message is displayed. Thus, it is possible to prevent that the toner becomes insufficient during the printing beforehand, whereby the user can refill the toner to the output device before the actual processing is started.

Further, it is possible to notify the user of other output format (e.g., economy-mode printing of which toner use quantity is small, monochrome printing, 2-in-1 printing, etc.) capable of performing the instructed printing processing with use of the selection window same as the output format selection window 1001 shown in FIG. 37, and to perform the selection on the screen notified, whereby the complicated operation that the displayed content must return to the setting screen every time the output format is changed is unnecessary. Thus, even the user who is unfamiliar with the operation can easily change the output format to other output format. Besides, it is possible to perform the instructed printing processing (i.e., it is possible to perform substitute processing) without refilling the toner to the printer.

Further, if judged that the instructed processing does not satisfy the necessary condition, it is possible to notify the user of other printer capable of performing the user-instructed printing processing with use of the selection window same as the output format selection window 1001 shown in FIG. 37, and to perform the selection on the screen notified, whereby the complicated operation that the displayed content must return to the setting screen every time the output format is changed is unnecessary. Thus, even the user who is unfamiliar with the operation can easily change the used printer to other printer. Besides, it is possible to perform the instructed printing processing without refilling the toner to the printer.

Further, for example, when it must wait for one executable job for a long time to execute because of a spooled other job, it is possible to acquire an end anticipation time of the spooled other job from the printer when accessing this printer, and then notify the warning message as to the end anticipation time.

In the present embodiment, the case where, in case of performing the printing, the toner remaining quantity or the like of the output device is acquired, it is judged based on the acquired information whether or not the printing processing can be performed, and the judged result is notified to the user was explained. However, the checked target is not limited to the toner. Namely, ink, an ink ribbon or the like may be checked.

Further, in the present embodiment, the case where, in case of performing the printing processing, the printer log is acquired from the management server through the network and the resource information (the toner remaining quantity) is acquired from the printer, and it is judged based on the acquired information whether or not the printing processing can be performed was explained. However, in a case where a stand-alone PC ends the printing processing to the printer connected to the PC itself, it is possible to once store a printer log in the PC's own HD or the like, acquire the stored printer log and the printer resource information (the toner remaining quantity) from the connected printer, and judge based on the acquired information whether or not the printing processing can be performed.

Thus, even in the printer which is connected to the stand-alone PC, it is possible to prevent that the toner becomes insufficient during the printing beforehand, whereby the user can refill the toner to the output device before the actual processing is started.

[Ninth Embodiment]

In the above eighth embodiment, when printing processing is to be executed, the printer log is acquired from the management server and the printer resource information (residual toner quantity) or the like is acquired from the printer to judge whether the print operation is possible and notify this judgement to the user. In response to an instruction from a user of PC on the network, the log information of each processing (printing processing, fax transmission/reception processing, image reading processing and the like) managed by the management server may be acquired and displayed. Such an embodiment will be described hereinafter.

Figure 41:
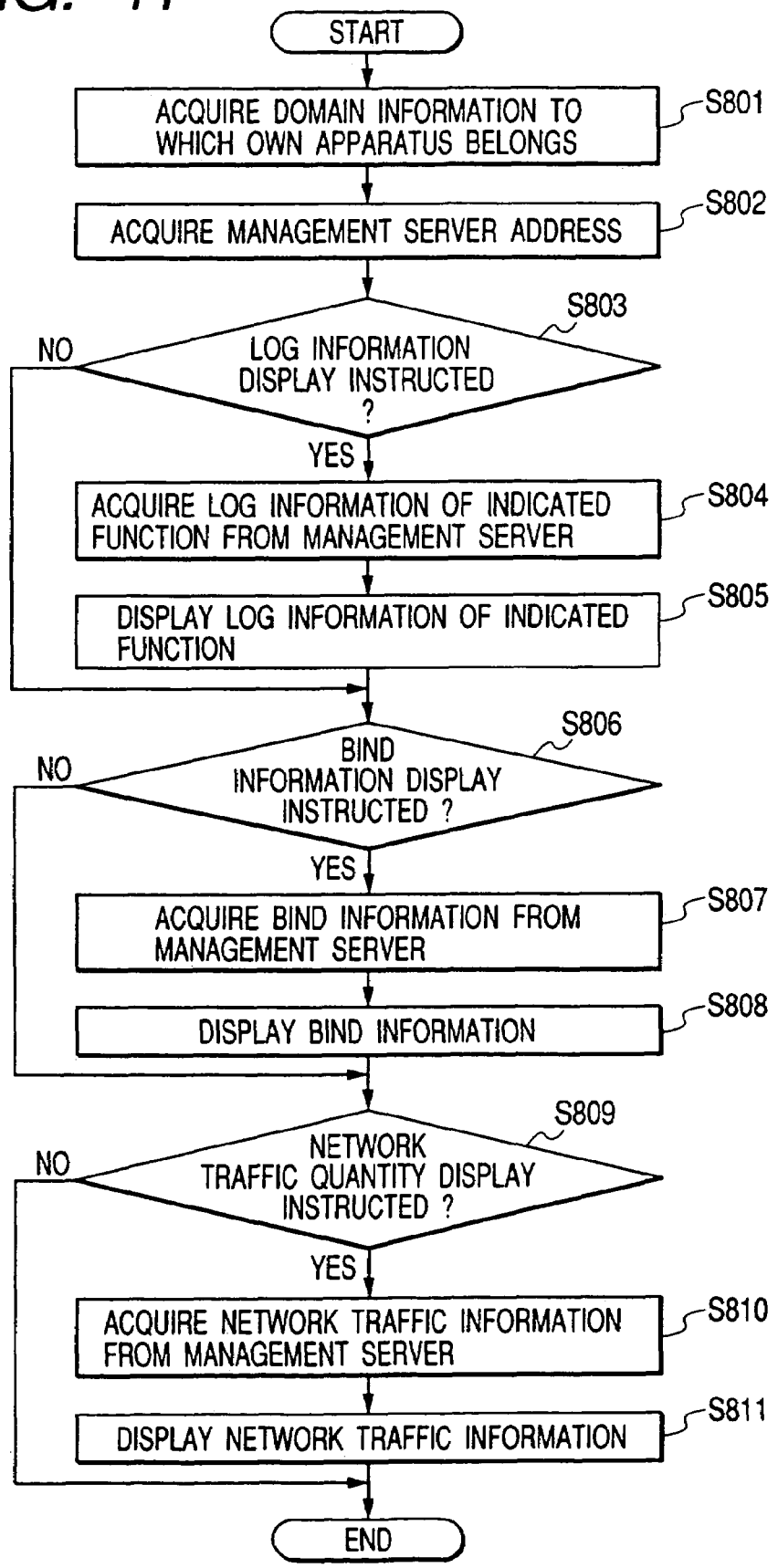
FIG. 41 is a flow chart showing an example of a seventh data processing procedure in the data processing apparatus according to the present invention.

FIG. 41 is a flow chart showing an example of a seventh data processing operation by the data processing apparatus of this invention.

First, at a step S801 domain information of its own apparatus is acquired. At a step S802, an address of the management server (one of PC's on the network shown in FIG. 1 is registered as the management server) is acquired.

Next, at a step S803 it is judged whether there is a log information display designation (capable of designating, for example, a print function, a facsimile transmission/reception function, or an image read function). If it is judged that there is no log information display designation, the flow advances to a step S806.

If it is judged at the step S803 that there is a log information display designation, then at a step S804 the log information (FIGS. 21 to 25) of the designated function is acquired from the management server, and at a step S805 this log information is displayed on the display screen of PC in a desired form (list form, graph form, and the like). This display form is designated when the log display designation is made.

Figure 47:
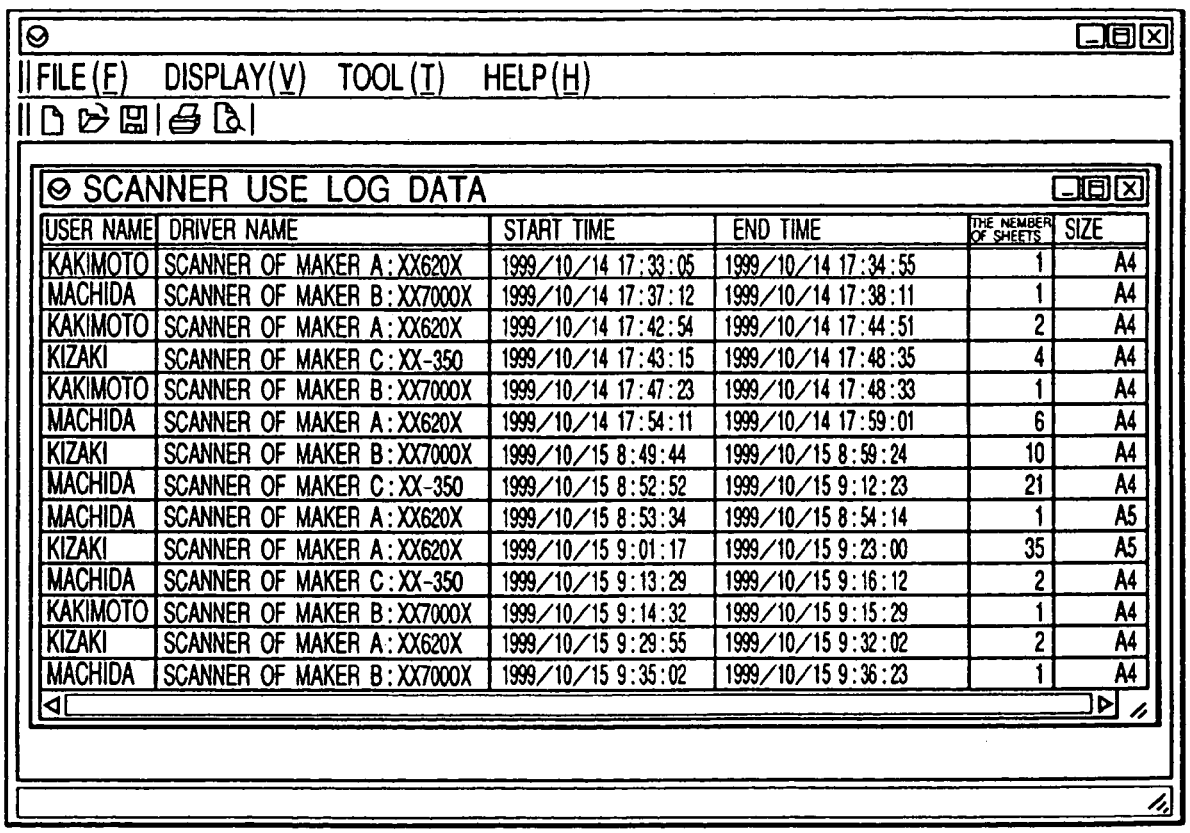
FIG. 47 is a view showing an example of a display screen of a CRT of the data processing apparatus.

For example, FIG. 47 shows an example of a display screen of PC displayed when a user selectively designates a display mode for each image read function on a display screen (not shown) for setting the log information display designation. This display screen shown in FIG. 47 shows scanner use log data including a user name, a driver name, a job start time, a job end time, the number of sheets, a sheet size and the like for each job.

Similar to the display example shown in FIG. 47, print log data, facsimile communication log data and the like can also be displayed when a user designates a desired mode on the display screen (not shown) for setting the log information display designation.

In the present embodiment, on the display screen (not shown) for setting the log information display designation, the details of the display form such as a list form of users and a list form of drivers can be set further. Therefore, the display form can be set differently for each function, for example, a function of sorting the display screen shown in FIG. 47 for each user.

Next, at the step S806 it is judged whether there is a bind information display designation (capable of designating, for example, a copy function or a facsimile transmission/reception function as the combination function). If it is judged that there is no bind information display designation, the flow advances to a step S809.

If it is judged at the step S806 that there is a bind information display designation, then at a step S807 the bind information (FIG. 20) of the designated function is acquired from the management server, and at a step S808 this bind information is displayed in a desired form (list form, graph form, and the like). This display form is designated when the bind display designation is made.

Figure 48A:
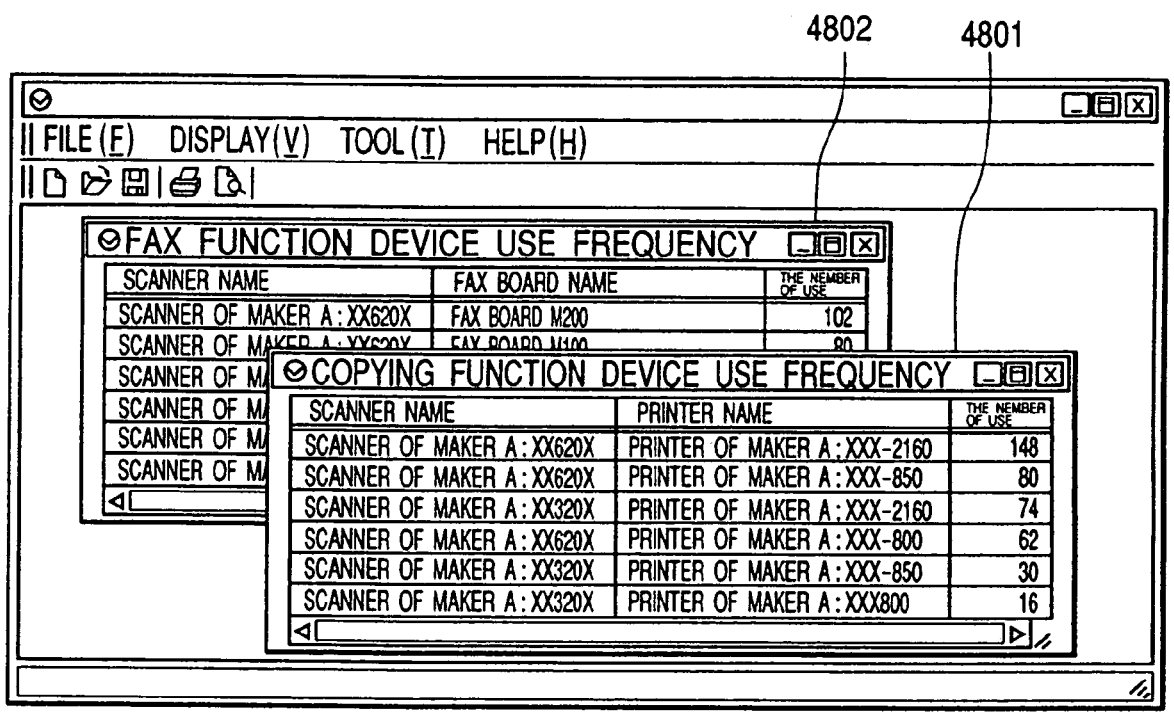
FIGS. 48A and 48B are views showing examples of a display screen of a CRT of the data processing apparatus.
Figure 48B:
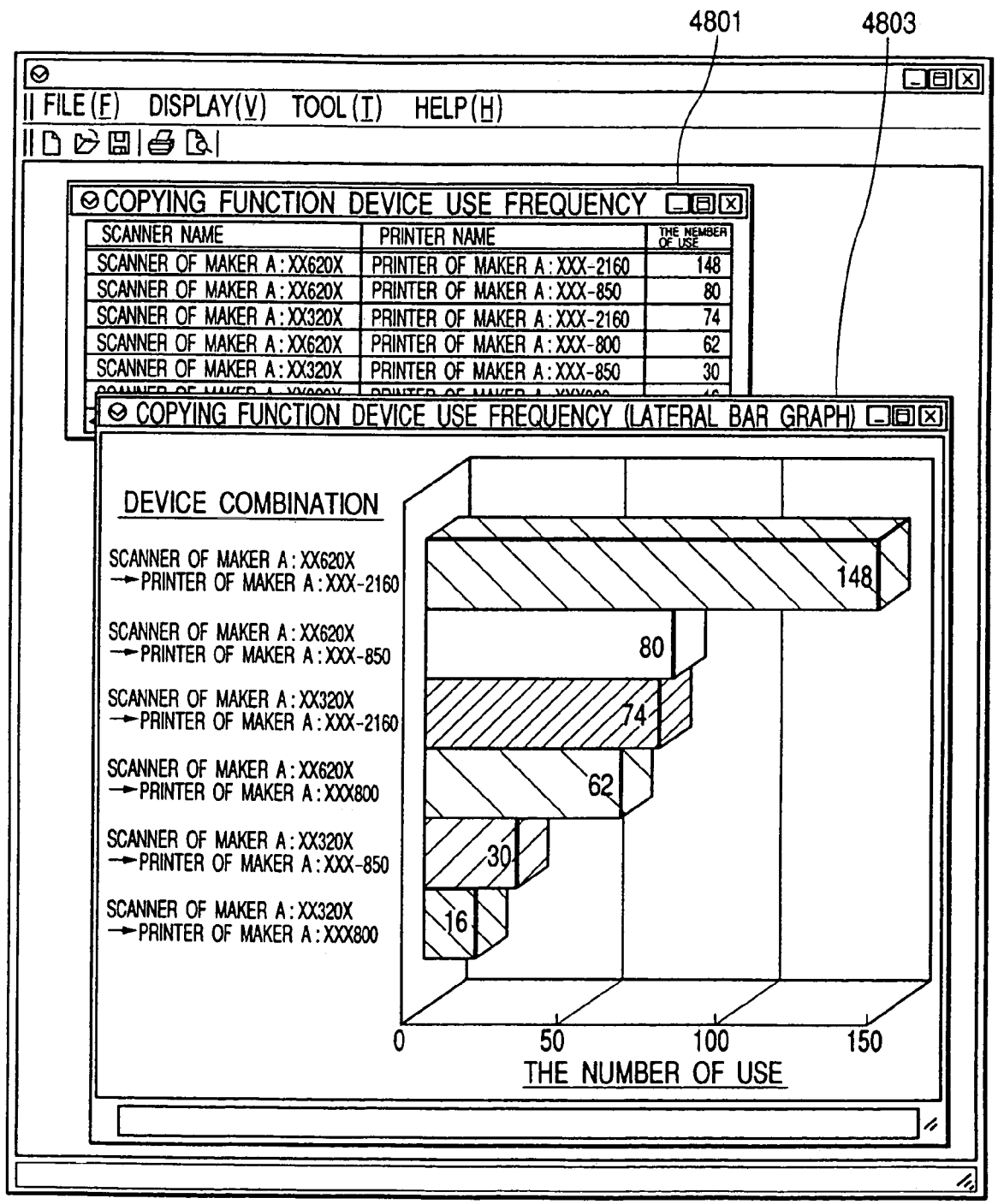

FIGS. 48A and 48B show examples of a display screen of PC when a user selects a bind information display designation mode on an unrepresented display screen.

FIG. 48A shows information 4802 on the facsimile function as a combination function and information 4801 on the copy function as a combination function. In this display screen, in order to discriminate a combination of devices on the network which combination executed the combination function, each combination (combination candidate) of two devices corresponding to icons subjected to a drag and drop operation on the screens or the like shown in FIGS. 5 and 11 is displayed in the list form of combination candidates (as shown in FIG. 48A, each device is given a maker name and a device type). The combination candidates are displayed in the list form in the order of larger use frequencies (from the upper row to the lower row) (ranking list display mode for each combination function).

Consider now the contents displayed in the display area 4801 shown in FIG. 48A. Six combination candidates used for executing the copy function are displayed in the order of larger use frequencies. A combination of the scanner having the name "scanner XX620X of maker A" and the printer having the name "printer XXX-2160 of maker A" was used most frequently in this system and the number of use frequencies is 148. A combination of the scanner having the name "scanner XX620X of maker A" and the printer having the name "printer XXX-850 of maker A" was used second most frequently and the number of use frequencies is 80. A combination of the scanner having the name "scanner XX320X of maker A" and the printer having the name "printer XXX-2160 of maker A" was used third most frequently and the number of use frequencies is 74. A combination of the scanner having the name "scanner XX620X of maker A" and the printer having the name "printer XXX-800 of maker A" was used fourth most frequently and the number of use frequencies is 62. A combination of the scanner having the name "scanner XX320X of maker A" and the printer having the name "printer XXX-850 of maker A" was used fifth most frequently and the number of use frequencies is 30. A combination of the scanner having the name "scanner XX320X of maker A" and the printer having the name "printer XXX-800 of maker A" was used sixth most frequently and the number of use frequencies is 16. These can be confirmed from the displayed contents.

If data desired by a user is to be output quickly, the user selects the sixth combination candidate having the lowest use frequency by dragging the icon corresponding to the name "scanner XX320X of maker A" and dropping it on the icon corresponding to the name "printer XXX-800 of maker A" on the display screen shown in FIGS. 5 and 11.

With reference to the displayed contents, the network supervisor managing the system may change the installation sites of the scanner having the name "scanner XX620X of maker A" and the printer having the name "printer XXX-2160 of maker A" to the sites near to each other, or may install a new digital copier having the functions of these devices in an office in order to reduce the network traffics and improve business efficiency. In this manner, the network management and operation become easy and the optimum network environment can be established.

Also in the bind information display designation mode, a user can display the bind information in a desired display form. For example, while the display area 4801 shown in FIG. 48A is effective, if a user designates a graph display mode of the displayed data, the display screen shown in FIG. 48B appears to display the data displayed in the display area 4801 in the list form, in the graph form (ranking graph display mode for each combination function) (refer to area 4803 in the display screen of FIG. 48B).

In the present embodiment, in the network environment managed by the management server, a plurality of devices are operated in combination. If the combination function is executable (such as executing the copy function by a combination of the scanner and printer), the information (e.g., management information shown in FIG. 20) on the combination function among the information managed by the management server (e.g., management information'shown in FIGS. 20 to 25 and the like) is output and can be displayed on the display screen of each user PC (including the subject apparatus and other apparatuses). If there are a plurality of combination functions (the example shown in FIGS. 48A and 48B includes at least the facsimile function and copy function), the detailed information of each combination function can be displayed in a display form desired by the user (in the example shown in FIGS. 48A and 48B, ranking list display, graph display and the like of the copy function) (refer to FIGS. 48A and 48B).

Next, at the step S809 it is judged whether there is a network traffic quantity display designation. If it is judged that there is no network traffic quantity display designation, the flow is terminated.

If it is judged at the step S809 that there is a network traffic quantity display designation, then at a step S810 the network traffic quantity information (not shown) is acquired from the management server, and at a step S811 this information is displayed in a display form desired by the user (list form, graph form, and the like). This display form is designated when the network traffic quantity display designation is made.

Examples of the display screen for displaying data regarding the network traffic quantity upon designation of the network traffic quantity display mode on an unrepresented display screen, are as follows. A data transfer amount per unit time along a path connecting each combination of a data sender and a data receiver is displayed in the order of larger data amount in the list form or graph form, or a path having a largest (or smallest) data transfer amount is displayed on the display screen such as shown in FIGS. 5 and 11 in a different display form from other paths, such as an emphasizing display form. In accordance with such information, the user can properly select optimum devices and data communication path in order to execute desired processing, or can output desired data during the time period not congested.

By the above processing, it is possible to easily confirm a combination of devices for each function, e.g., a combination of a scanner and a printer for the copy function, the number of use frequencies and the use time.

For the log information, information of each function processing is notified from a client to the management server each time the function processing is executed. The management server received such information properly updates the management information such as shown in FIGS. 20 to 25 and the like. When any one of clients (PC) on the network issues a request of acquiring the management information, the management server reads necessary information and transmits it to the requesting (sender) PC.

It is assumed that the network traffic quantity is supervised at any time by the management server.

[Tenth Embodiment]

In the above first to ninth embodiments, the case where the icons of the virtually displayed scanner and printer or the icons of the virtually displayed scanner and multifunctional device are dragged and dropped, and thus the function processing to print the image of one document input from one scanner with use of the printer, the multifunctional device and the like was explained. However, it is possible to combine the image of one document input from the scanner with the images of the documents of the data files stored in the user's own apparatus and other PC on the network, and output the combined images. Besides, it is possible to combine (i.e., bind) the image data of the plural documents input from the two scanners with others, and output the combined images. Hereinafter, the tenth embodiment will be explained.

Figure 42:
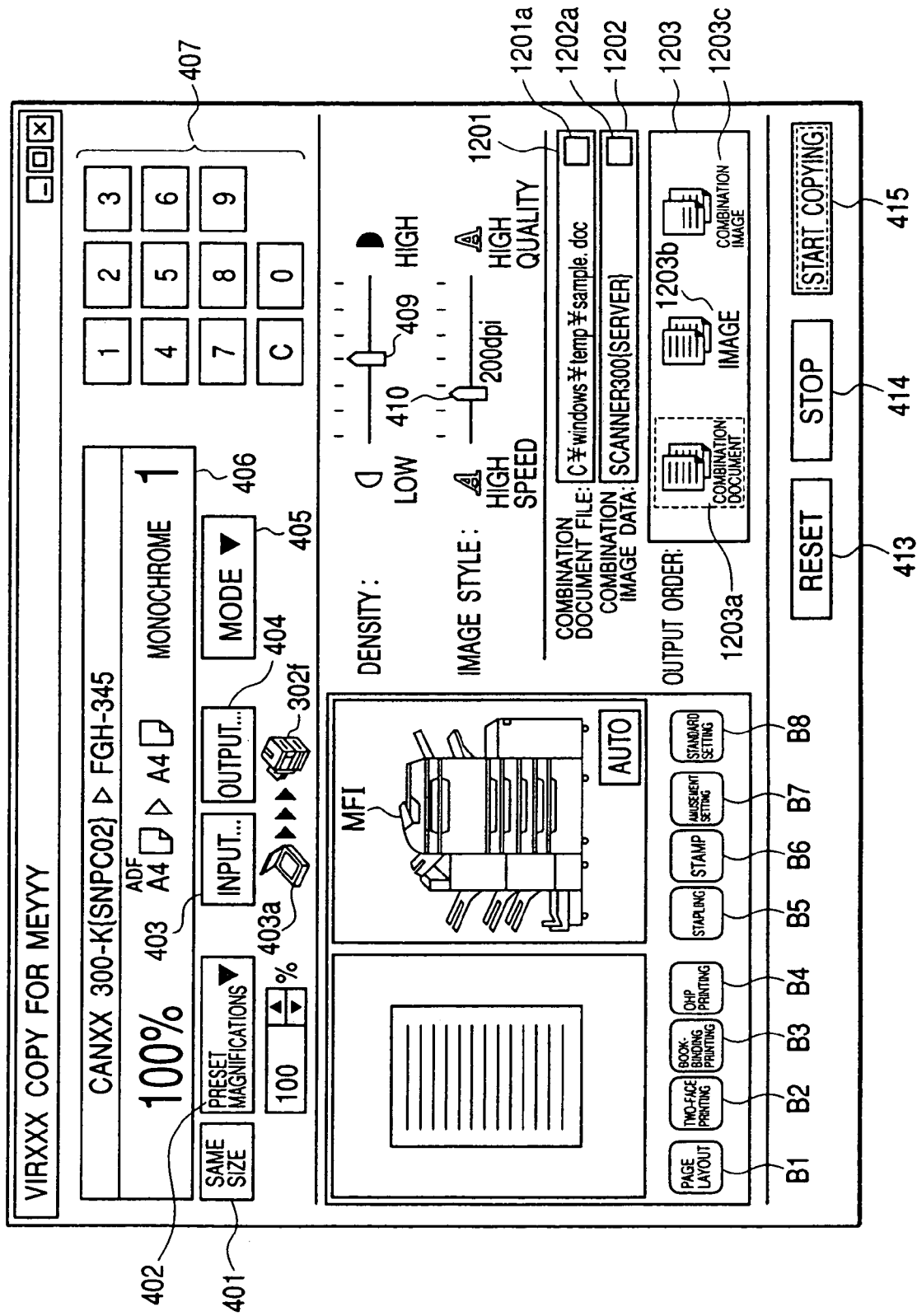
FIG. 42 is a view showing an example of a virtual operation panel displayed on the CRT of the data processing apparatus shown in FIG. 2.

FIG. 42 is a view showing an example of a virtual operation panel displayed on the CRT 16 of the data processing apparatus shown in FIG. 2. When the scanner icon dragged in the status that the icon 302f of FIG. 11 is effectively displayed is dropped on the icon 302f, the virtual operation panel is displayed on the CRT 16 as the image by which the digital copying machine 118 and the option devices connected thereto can be confirmed, by referring to the device driver information acquired from the digital copying machine 118 corresponding to the icon 302f and managed on the HD 10 or the PMEM 3. It should be noted that the same parts as those in FIG. 12 are added with same numerals and symbols, respectively.

Figure 43:
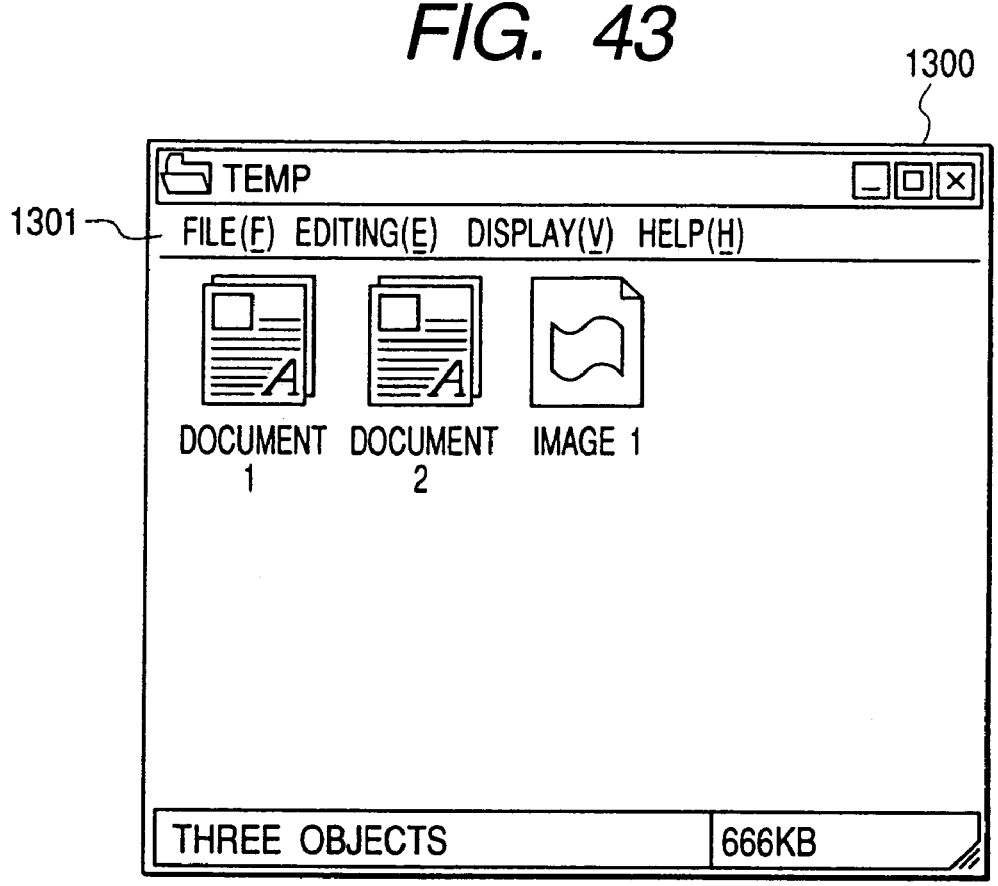
FIG. 43 is a view showing an example of a combination document selection window displayed according to icon instructions corresponding to buttons displayed on the virtual operation panel of the CRT of the data processing apparatus shown in FIG. 2.

In FIG. 42, numeral 1201 denotes a combination document file designation area in which the document file (a document file, an image file or the like stored as a shared file in the user's own apparatus or other PC) to be combined with the image of one document input from the input device corresponding to the icon 403a is designated. When there is no designation, a message "inone" is displayed in the combination document file designation area 1201, and the image input from the input device of the icon 403a and the file are not combined with each other. Numeral 1201a denotes a button. When the button 1201a is depressed, the combination document file selection window shown in later-described FIG. 43 is displayed.

Figure 44:
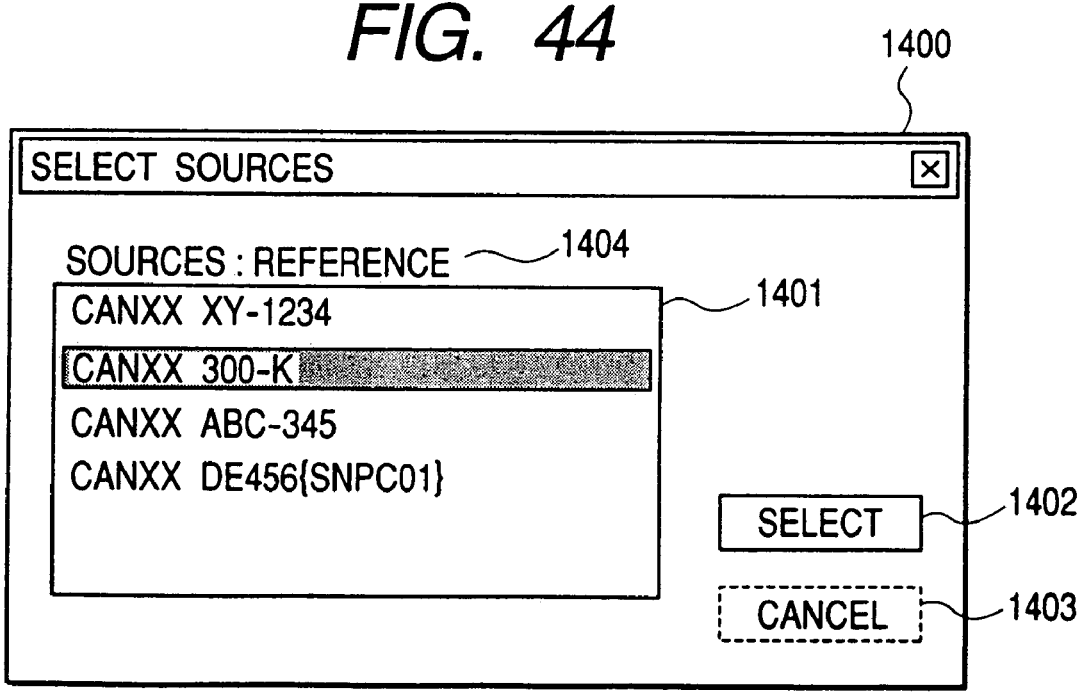
FIG. 44 is a view showing an example of a combination image data selection window displayed according to the icon instructions corresponding to the buttons displayed on the virtual operation panel of the CRT of the data processing apparatus shown in FIG. 2.

Numeral 1202 denotes a combination image data designation area in which other input device for inputting the image data to be combined with the image input from the input device corresponding to the icon 403a is designated. When there is no designation, a message "none" is displayed in the combination image data designation area 1202, and the image input from the input device of the icon 403a and the file are not combined with each other. Numeral 1202a denotes a button. When the button 1202a is depressed, the combination image data selection window shown in later-described FIG. 44 is displayed.

Numeral 1203 denotes an output order display area which includes an icon (a combination document 1203a) representing the file designated in the combination document file designation area 1201, an icon (an image 1203b) representing the image input from the input device corresponding to the icon 403a, and an icon (a combination image 1203c) representing the image input from the input device designated in the combination image data designation area 1202. The combination document 1203a, the image 1203b and the combination image 1203c are output in the displayed order (i.e., from the left in due order). Namely, the image input from the input device corresponding to the icon 403a is combined with the image of the file designated in the combination document file designation area 1201, and the image input from the input device designated in the combination image data designation area 1202 is serially combined with the above combined image, whereby the three documents are collected into one document and output.

The output order of the combination document 1203a, the image 1203b and the combination image 1203c in the output order display area 1203 can be changed by, e.g., the drag operation of the mouse 13 shown in FIG. 2.

The combination document 1203a and the combination image 1203c are not displayed when there is no designation in the combination document file designation area 1201 and the combination image data designation area 1202.

For example, when the scanner icon dragged in the status that the icon 302f of FIG. 11 is effectively displayed is dropped on the icon 302f, the virtual operation panel as shown in FIG. 42 is displayed. At this time, only the icon of the image 1203b (i.e., the icon representing the image input from the scanner corresponding to the dragged scanner icon) is displayed in the output order display area 1203. When the file is designated in the combination document file designation area 1201, the icon of the combination document 1203a is displayed at the right of the image 1203b. Subsequently, when the input device is designated in the combination image data designation area 1202, the icon of the combination image 1203c is displayed at the right of the icon of the combination document 1203a. Then, when the copying start button 415 is depressed, the documents corresponding to the icons displayed in the area 1203 are sequentially output and image formed as one document in the order, displayed in the area 1203 (i.e., in the order of the image 1203b, the combination document 1203a and the combination image 1203c in this case).

FIG. 43 is a view showing an example of the combination document selection window displayed according to icon instructions corresponding to the button 1201a displayed on the virtual operation panel of the CRT 16 of the data processing apparatus shown in FIG. 2.

In FIG. 43, numeral 1300 denotes a combination document selection window which displays files (a document 1, a document 2 and an image 1) in a directory preset as a combination document directory. Here, the documents 1 and 3 represent the document files, and the image 1 represents the image file. When the user selects either of the document 1, the document 2 and the image 1 by using the mouse 13 or the like, the combination document selection window 1300 is closed, and the full path of the selected file is displayed in the combination image data designation area 1201 of FIG. 42.

When, in a file 1301, a selectable item "change of combination document directory" in a not-shown menu displayed based on an instruction of the mouse 13 or the like is selected, the combination document directory can be changed. Further, in the file 1301, when a selectable item "reference to network" in the not-shown menu displayed based on an instruction of the mouse 13 or the like is selected, the system structure status screen of FIG. 11 is displayed, whereby it is possible to select the shared file on other PC.

FIG. 44 is a view showing an example of the combination image data selection window displayed according as the button 1202a displayed on the virtual operation panel of FIG. 42 is depressed.

In FIG. 44, numeral 1400 denotes the combination image data selection window. Input device names shared in the network are displayed in a selection display area 1401. Numeral 1402 denotes a selection button. When the selection button 1402 is depressed after either of the input devices displayed in the selection display area 1401 is indicated by using the mouse 13 or the like, the combination image data selection window 1400 is closed, and the name of the selected input device is displayed in the combination image data designation area 202 of FIG. 42. Numeral 1403 denotes a cancel button. When the cancel button 1403 is depressed, the selection in the selection display area 1401 is cancelled, and the combination image data selection window 1400 is then closed.

Numeral 1404 denotes a reference menu. When the reference menu 1404, is indicated by using the mouse 13 or the like, the system structure status screen shown in FIG. 11 is displayed, whereby it is possible to select the input device on this screen.

In the status that the system structure status screen shown in FIG. 11 is displayed, when predetermined keys, e.g., "CTRL" and "ALT" keys of the keyboard 12 are simultaneously depressed, the shape of the icon corresponding to the input device having the same function as that of the input device already selected (i.e., the input device corresponding to the icon 403*a* of FIG. 42) can be changed and displayed (e.g., winked).

Further, on the system structure status screen shown in FIG. 11, in order to prevent that the already-selected input device (i.e., the input device corresponding to the icon 403*a* of FIG. 42) is selected doubly, the icon of the already-selected input device may be displayed, e.g., in gray such that the user can not select such the device.

Figure 45:
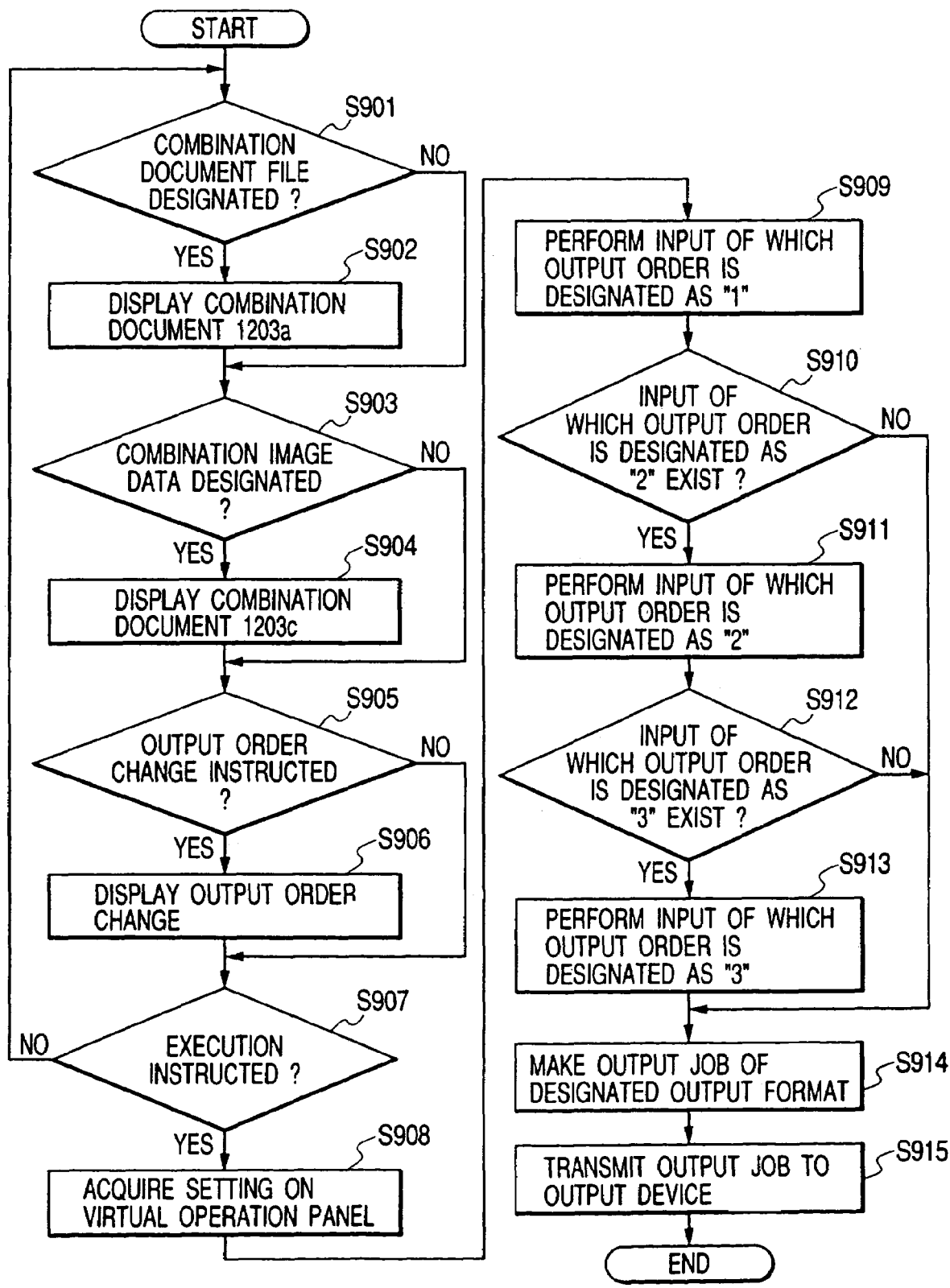
FIG. 45 is a flow chart showing an example of an eighth data processing procedure in the data processing apparatus according to the present invention.

FIG. 45 is a flow chart showing an example of an eighth data processing procedure in the data processing apparatus according to the present invention. The eighth data processing procedure corresponds to processing which is performed in the step S308 of FIG. 32, for example, when the scanner icon 303*c* is dragged and dropped on the digital copying machine icon 302*f* and thus the copying function is executed.

First, in a step S901, it is judged whether or not the combination document file is designated in the combination document file designation area 1201 on the virtual operation panel. If judged that the combination document file is not designated, the flow advances to a step S903 as it is. Conversely, if judged that the combination document file is designated, the flow advances to a step S902 to display the icon of the combination document 1203*a* in the output order display area 1203 (in left justify).

Next, in the step S903, it is judged whether or not the combination image is designated in the combination image data designation area 1202 on the virtual operation panel. If judged that the combination image is not designated, the flow advances to a step S905 as it is. Conversely, if judged that the combination image is designated, the flow advances to a step S904 to display the icon of the combination image 1203*c* in the output order display area 1203 (in left justify).

Next, in the step S905, it is judged whether or not the output order change is instructed in the output order display area 1203 on the virtual operation panel. If judged that the output order change is not instructed, the flow advances to a step S907 as it is. Conversely, if judged that the output order change is instructed, the flow advances to a step S906 to change the output order of the icons in the output order display area 1203 in accordance with the output order change instruction, and the display the icons in the changed output order.

Next, in the step S907, it is judged whether or not the copying start is instructed by using the copying start button 415 on the virtual operation panel. If judged that the copying start is not instructed, the flow returns to the step S901. Conversely, if judged that the copying start is instructed, the flow advances to a step S908 to acquire the setting on the virtual operation panel, and the flow further advances to a step S909 to perform the inputting firstly designated in the output order display area 1203 (i.e., the inputting corresponding to the icon displayed first from the left) in accordance with the acquired setting.

Next, in a step S910, it is judged whether or not the inputting secondarily displayed in the output order display area 1203 is designated (i.e., the icon displayed second from the left exists). If judged that the inputting secondarily displayed is not designated, the flow advances to a step S914. Conversely, if judged that the inputting secondarily displayed is designated, the flow advances to a step S911 to perform the inputting secondarily designated in the output order display area 1203 (i.e., the inputting corresponding to the icon displayed second from the left).

Next, in a step S912, it is judged whether or not the inputting thirdly displayed in the output order display area 1203 is designated (i.e., the icon displayed third from the left exists). If judged that the inputting thirdly displayed is not designated, the flow advances to the step S914. Conversely, if judged that the inputting thirdly displayed is designated, the flow advances to a step S913 to perform the inputting thirdly designated in the output order display area 1203 (i.e., the inputting corresponding to the icon displayed third from the left).

Next, in the step S914, the first inputting to the third inputting are sequentially combined with others, and an output job of output format (including processing page layout depending on the output device, two-face printing, stapling, etc.) based on the input and output settings on the virtual operation panel is generated. Then, in a step S915, the output job data and the images of the plural designated documents are transmitted in the designated order to the output device (the digital copying machine of the icon 302*f* in this case), and the processing ends. It should be noted that the job generation in the step S914 and the job transmission in the step S915 are performed every time the data of output one page is input. However, the job may be output after the data of plural pages is stored in a memory.

According to the above processing, by outputting the plural input sources and their output order designated on one operation screen, it is possible to combine the information input from the plural user-desired input sources in the user-desired order and then output the combination information from the output device selected by the user. Thus, for example, the image which is obtained by combining the document file, the image file and the like stored as the shared files in the user's own apparatus or other communicatable PC with the image read from the scanner can be output from the selected output device in the desired output format, e.g., two-face format, 2-in-1 format or the like.

Further, the image which is obtained by combining the image read from two different-function scanners (e.g., a color scanner and a monochrome high-speed scanner) with each other can be output from the selected output device in the desired output format, e.g., two-face format, 2-in-1 format or the like.

Further, in the case where the image obtained by combining the images respectively read from the two scanners having equivalent functions with each other is output from the selected output device in the desired output format, e.g., two-face format, 2-in-1 format or the like, for example, even if the scanner having an ADF or the like can not be used when two originals are read, it is possible by reading the originals one by one from the plural scanner to read the two original without troublesomely exchanging the originals. It should be noted that, although the two scanners are used in the present embodiment, three or more scanners may be used.

Further, when the information input from the plural input sources (although the three input sources are used in the present embodiment, four or more input sources may be used) are combined with others in the designated order and then output, it is possible to add page numbers throughout the sheets on which images are formed and then output these sheets from the output device in the desired output format, e.g., two-face format, 2-in-1 format or the like.

For example, the above operation will be explained with reference to the screen shown in FIG. 42 as follows. The document which corresponds to the icon 1203a displayed first from the left in the output order display area 1203 is the document which is generated based on the application program for the data processing apparatus (PC) and consists of five pages. The document corresponds to the second icon 1203b is the document which is to be input from the scanner corresponding to the icon 403a and consists of two pages. The third icon 1203c corresponds to the document which is input from other scanner on the network (a scanner 300 in FIG. 42) different from the scanner of the icon 403a and consists of three pages. In such display status of the output order display area 1203, according as the button 415 is depressed by the user, the three documents, i.e., the five-page image document corresponding to the icon 1203a read from the memory of the data processing apparatus, the two-page image document read from the scanner of the icon 403a, and the three-page image document read from the scanner 300 are transmitted to the digital copying machine of the icon 302f. The digital copying machine which received these three documents collects them into one document and performs the image formation. At this time, for example, page numbers (i.e., first to fifth pages) are formed together with the images respectively on the sheets (i.e., five sheets) to which the images of the document of the icon 1203a are to be formed, page numbers (i.e., sixth to seventh pages) are formed together with the images respectively on the sheets (i.e., two sheets) to which the images of the document of the icon 1203b are to be formed, and page numbers (i.e., eighth to tenth pages) are formed together with the images respectively on the sheets (i.e., three sheets) to which the images of the document of the icon 1203c are to be formed. Then, for example, when the stapling is set by using the button B5 of FIG. 42, the stapling is performed to one sheaf of these ten-page sheets. Further, for example, before the button 415 is depressed, when the user drags the icon 1203c and drops it between the icons 1203a and 1203b by using the mouse 13 of the data processing apparatus, the output order is changed to the order of the documents 1203a, 1203c and 1203b. Then, if the button 415 is depressed, the digital copying machine of the icon 302f which received these three documents forms the page numbers (i.e., first to fifth pages) together with the respective images on the sheets (i.e., five sheets) to which the images of the document of the icon 1203a are to be formed, forms the page numbers (i.e., sixth to eighth pages) together with the respective images on the sheets (i.e., three sheets) to which the images of the document of the icon 1203c are to be formed, and subsequently forms the page numbers (i.e., ninth to tenth pages) together with the respective images on the sheets (i.e., two sheets) to which the images of the document of the icon 1203b are to be formed. Thus, by operating and controlling the icons displayed on the output order display area 1203, it is possible to easily change the output order of the plural documents in the case where the plural documents from the plural image generation sources are collected and output.

Further, in the present embodiment, the case of combining the information input from the plural input sources and then outputting the combination information was explained. However, it is possible to set an application program of image processing started by the user's own apparatus, combine the information input from the plural input sources in the designated order, and embed the combination information in such the application program itself.

Thus, without performing the conventional complicated input operation of independently inputting the information from the plural input sources and then combining the input information, it is possible by only designating the input sources and the combination order to embed the combination information obtained by freely combining the information input from the plural input sources in the designated order, in the application program.

It should be noted that, in each of the above embodiments, the printer may be an electrophotographic-system printer, an inkjet-system printer, a sublimation-system printer or other-system printer, and the scanner may be a flatbed-system scanner or other-system scanner.

Further, it should be noted that the peripheral devices on the network are not limited to the printer, the scanner and the digital copying machine. Namely, a digital camera, a modem and other devices may be used as the peripheral devices. In this case, like the printer, the scanner and the digital copying machine, the peripheral devices such as the digital camera, the modem and the like can be displayed on the system structure screen of FIG. 11 by using the icons of which shapes are close to the respective appearances of these devices. Besides, like the printer, the scanner and the digital copying machine, the peripheral devices such as the digital camera, the modem and the like can be designated as the input and output devices, thereby executing the above various combination functions (multifunctions).

Hereinafter, the structure of the data processing program which is readable by the data processing apparatus according to the present invention will be explained with reference to a memory map shown in FIG. 46.

FIG. 46 is the view for explaining the memory map of a storage medium in which the various data processing programs readable by the data processing apparatus according to the present invention are stored.

Although the drawing is silent, information (e.g., version information, a programmer's name, etc.) for managing program groups stored in the storage medium is also stored in the storage medium. Further, information which depends on an OS (operating system) on the program reading side (e.g., an icon for discriminatingly displaying a program) is occasionally stored in the storage medium.

Further, data which depend on the various programs are also managed in the directory. When an installed program or data is compressed, a program for decompressing it is occasionally stored.

Further, each of the functions of the above embodiments shown in FIGS. 9, 32, 34, 35, 38, 40, 41 and 45 may be executed by a host computer in accordance with an externally installed program. In this case, the present invention is applicable to a case where an information group including the program is supplied from a storage medium such as a CD-ROM, a flash memory, an FD or the like or external storage medium through the network to the data processing apparatus.

As described above, it is needless to say that the object of the present invention can be achieved in a case where the storage medium storing the program codes of software for realizing the functions of the above embodiments is supplied to a system or an apparatus and then a computer (or CPU or MPU) in the system or the apparatus reads and executes the program codes stored in the memory medium.

In this case, the program codes themselves read from the storage medium realize the new functions of the present invention, and the storage medium storing such the program codes constitute the present invention.

The storage medium storing the program codes can be, e.g., a floppy disk, a hard disk, an optical disk, a magnetooptical disk, a CD-ROM, a CD-R, a magnetic tape, a nonvolatile memory card, a ROM, an EEPROM, or the like.

Further, it is needless to say that the present invention also includes not only the case where the functions of the embodiments are realized by executing the program codes read by the computer, but also a case where an OS (operating system) or the like functioning on the computer executes all the processing or a part thereof according to the instructions of the program codes, thereby realizing the functions of the above embodiments.

Further, it is needless to say that the present invention further includes a case where the program codes read from the storage medium are once stored in a memory provided in a function expansion board inserted in the computer or a function expansion unit connected to the computer, and a CPU or the like provided in the function expansion board or the function expansion unit executes all the processing or a part thereof according to the instructions of such program codes, thereby realizing the functions of the above embodiments.

Further, the present invention is applicable to a system composed of plural devices or to an apparatus including a single device. Further, it is needless to say that the present invention is applicable to a case where a program is supplied to a system or an apparatus to realize the functions of the above embodiments. In this case, when the storage medium storing the program represented by software for realizing the present invention is read by the system or the apparatus, such the system or the apparatus can derive the effects of the present invention.

Further, when the program represented by software for realizing the present invention is downloaded and read from a database on the network by a communication program, such the system or the apparatus can derive the effects of the present invention.

As described above, in the above embodiments, the data processing apparatus capable of data communications with the various devices connected to the LAN's 100 and 120 and the like shown in FIG. 1, sequentially acquires the information of each function of each device notified from another data processing apparatus (PC), when each device is to be operated in accordance with the function set by other data processing apparatus. The management server of the data processing apparatus sequentially stores the acquired information of each function (e.g., information shown in FIGS. 20 to 25 and the like) and manages it. In response to a request for management information of each function from the other data processing apparatus, the management information of each function stored and managed by the management server is notified to the partner apparatus (the management information such as shown in FIGS. 20 to 25 and the like other than the information requested by the partner apparatus may be notified at the same time). The data processing apparatus received the management information analyzes the received management information and generates display data in the display form designated by a user of the data processing apparatus (the management server may generate such display data in advance). The data is displayed on a display unit in the display form desired by the user (e.g., refer to FIG. 47, FIGS. 48A and 48B and the like).

Needs of the user who desires to verify the detailed log information necessary for executing various function processing by utilizing each device constituting the system, can be met flexibly. Each user can properly confirm and verify the detailed state, from various viewpoints and in wide field, of the whole network connecting various devices, on the display unit of its own apparatus in a desired display form. Therefore, flexible system management and operation can be realized and the network system can be configured freely and easily.

What is claimed is:

1. An information processing apparatus comprising:
   display means for displaying a first device and a second device;
   indication means for indicating the first device and the second device displayed by said display means so as to execute a combined image formation process by the indicated first and second devices;
   specifying means for specifying an image formation process to be executed by a set of the first device and the second device indicated by said indication means; and
   obtaining means for obtaining log information showing the number of executions of the image formation process specified by said specifying means.

2. An apparatus according to claim 1, wherein
   said display means displays the first device and the second device by using icons, and
   said obtaining means obtains the log information in response to that said indication means selects and indicates the first device and the second device.

3. An apparatus according to claim 2, wherein in said indication means the first device and the second device are selected by executing a drag-and-drop process to the displayed icon.

4. An apparatus according to claim 1, wherein the first device is an image output device, the second device is an image input device, and the image formation process specified by said specifying means is an image copying process.

5. An information processing method comprising:
   a display step of displaying a first device and a second device;
   an indication step of indicating the first device and the second device displayed in said display step so as to execute a combined image formation process by the indicated first and second devices;
   a specifying step of specifying an image formation process to be executed by a set of the first device and the second device indicated in said indication step; and
   an obtaining step of obtaining log information showing the number of executions of the image formation process specified in said specifying step.

6. A method according to claim 5, wherein
   in said display step, the first device and the second device are displayed by using icons, and
   in said obtaining step, the log information is obtained in response to that the first device and the second device are selected and indicated in said indication step.

7. A method according to claim 6, wherein in said indication step the first device and the second device are selected by executing a drag-and-drop process to the displayed icon.

8. A method according to claim 5, wherein the first device is an image output device, the second device is an image input device, and the image formation process specified in said specifying step is an image copying process.

9. A computer-readable storage medium which stores a program to execute an information processing method comprising:

a display step of displaying a first device and a second device;

an indication step of indicating the first device and the second device displayed in said display step so as to execute a combined image formation process by the indicated first and second devices;

a specifying step of specifying an image formation process to be executed by a set of the first device and the second device indicated in said indication step; and an obtaining step of obtaining log information showing the number of executions of the image formation process specified in said specifying step.

* * * * *

UNITED STATES PATENT AND TRADEMARK OFFICE
CERTIFICATE OF CORRECTION

| | | |
|---|---|---|
| PATENT NO. | : 7,412,498 B2 | |
| APPLICATION NO. | : 10/767626 | |
| DATED | : August 12, 2008 | |
| INVENTOR(S) | : Haruo Machida | |

It is certified that error appears in the above-identified patent and that said Letters Patent is hereby corrected as shown below:

SHEET 25:

Fig. 26, "2. INFORMATION" (second occurrence) should read --4. INFORMATION--.

SHEET 28:

Fig. 29A, "DOES NOT BE" should read --IS NOT-- and "TOPICS" should read --TOPIC--.

SHEET 43:

Fig. 47, "NEMBER" should read --NUMBER--.

COLUMN 6:

Line 9, "In an" should read --An--; and
    Line 64, "later" should read --laser--.

COLUMN 9:

Line 40, "etc." should read --etc.,--; and
    Line 43, "FIG. 1.," should read --FIG 1.--.

COLUMN 10:

Line 8, "representing" should read --representing the user's--.

COLUMN 11:

Line 11, "button 401,is" should read --button 401 is--;
    Line 26, "are" should be deleted; and
    Line 44, "a" should read --an--.

UNITED STATES PATENT AND TRADEMARK OFFICE
CERTIFICATE OF CORRECTION

| | | |
|---|---|---|
| PATENT NO. | : 7,412,498 B2 | |
| APPLICATION NO. | : 10/767626 | |
| DATED | : August 12, 2008 | |
| INVENTOR(S) | : Haruo Machida | |

It is certified that error appears in the above-identified patent and that said Letters Patent is hereby corrected as shown below:

COLUMN 12:

Line 38, "perform," should read --perform--.

COLUMN 14:

Line 34, "icons," (second occurrence) should read --icons--.

COLUMN 15:

Line 58, "function" should read --function as--.

COLUMN 17:

Line 22, "direction;" should read --direction,--.

COLUMN 19:

Line 15, "of PC's" should read --of the PC's--;
    Line 20, "from" should read --from the--; and
    Line 67, "from PC" should read --from the PC that--.

COLUMN 23:

Line 28, "of" (first occurrence) should read --as--; and
    Line 46, "other PC" should read --other PC's--.

COLUMN 24:

Line 14, "a" should read --an--.

UNITED STATES PATENT AND TRADEMARK OFFICE
CERTIFICATE OF CORRECTION

PATENT NO. : 7,412,498 B2
APPLICATION NO. : 10/767626
DATED : August 12, 2008
INVENTOR(S) : Haruo Machida It is certified that error appears in the above-identified patent and that said Letters Patent is hereby corrected as shown below:

COLUMN 26:

Line 3, "other" should read --another--;
    Line 4, "interposed is" should read --is interposed--;
    Line 5, "other" should read --another--;
    Line 13, "to the" should be deleted; and
    Line 59, "emphasis" should read --emphasize--.

COLUMN 27:

Line 3, "other" should read --another--; and
    Line 27, "other" should read --another--.

COLUMN 28:

Line 38, "is" should read --are--; and
    Line 57, "determine" should read --determined--.

COLUMN 29:

Line 20, "and-display/non-display" should read --and display/non-display"--; and
    Line 61, "has" should read --has not--.

COLUMN 30:

Line 8, "processing" should read --processed--; and
    Line 21, "output,device" should read --output device--.

COLUMN 32:

Line 60, "displayed.," should read --displayed.--.

COLUMN 33:

Line 26, "above-seventh" should read --above seventh--; and
    Line 61, ""Confirm" should read --Confirm--.

UNITED STATES PATENT AND TRADEMARK OFFICE
CERTIFICATE OF CORRECTION

PATENT NO. : 7,412,498 B2
APPLICATION NO. : 10/767626
DATED : August 12, 2008
INVENTOR(S) : Haruo Machida It is certified that error appears in the above-identified patent and that said Letters Patent is hereby corrected as shown below:

COLUMN 35:

Line 24, "format" should read --formats--.

COLUMN 38:

Line 23, "information'" should read --information--.

COLUMN 39:

Line 17, "other PC" should read --other PC's--; and
    Line 41, ""inone"" should read --"none"--.

COLUMN 40:

Line 34, "order," should read --order--;
    Line 46, "and 3" should read --and 2--; and
    Line 61, "other PC." should read --other PC's.--.

COLUMN 41:

Line 8, "area 202" should read --area 1202--;
    Line 14, "menu 1404,is" should read --menu 1404 is--; and
    Line 64, "the display the" should read --display the--.

COLUMN 43:

Line 2, "scanner" should read --scanners--; and
          "original" should read --originals--;
    Line 21, "document" should read --document that--; and
    Line 25, "other" should read --another--.

UNITED STATES PATENT AND TRADEMARK OFFICE
CERTIFICATE OF CORRECTION

PATENT NO. : 7,412,498 B2
APPLICATION NO. : 10/767626
DATED : August 12, 2008
INVENTOR(S) : Haruo Machida It is certified that error appears in the above-identified patent and that said Letters Patent is hereby corrected as shown below:

COLUMN 45:

Line 1, "the." should read --the--;
    Line 13, "magnetoop-" should read --magneto-op- --; and
    Line 66, "received" should read --receives--; and
        "information" should read --information,--.

COLUMN 46:

Line 67, "information" should read --information,--.

Signed and Sealed this

Tenth Day of March, 2009

JOHN DOLL
*Acting Director of the United States Patent and Trademark Office*